US006476821B2

(12) United States Patent
Sawada et al.

(10) Patent No.: US 6,476,821 B2
(45) Date of Patent: Nov. 5, 2002

(54) IMAGE DISPLAYING SYSTEM AND INFORMATION PROCESSING APPARATUS

(75) Inventors: Hideo Sawada, Hadano; Ikuya Arai, Yokohama; Nobuaki Kabuto, Kunitachi; Kouji Kitou, Hiratsuka; Kazufumi Kikuchi; Kazunori Iwabuchi, both of Yokohama; Kenichi Saitou, Setagaya-ku, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/016,799

(22) Filed: Jan. 30, 1998

(65) Prior Publication Data

US 2002/0000995 A1 Jan. 3, 2002

(30) Foreign Application Priority Data

Jan. 31, 1997 (JP) ............................................ 9-018229
Mar. 21, 1997 (JP) ............................................ 9-068692
Mar. 21, 1997 (JP) ............................................ 9-068693
Mar. 21, 1997 (JP) ............................................ 9-068694
Mar. 21, 1997 (JP) ............................................ 9-068695

(51) Int. Cl.[7] .......................... G09G 5/00; G06T 11/00; G06T 15/30

(52) U.S. Cl. ........................ 345/620; 345/619; 345/764

(58) Field of Search ......................... 345/146, 211–213, 345/619, 660, 581, 605, 764, 781, 788, 800, 810, 815; 348/554, 476; 380/20

(56) References Cited

U.S. PATENT DOCUMENTS 5,276,458 A 1/1994 Swandon
5,321,750 A * 6/1994 Nadan ......................... 380/20
5,483,260 A 1/1996 Parks et al.
5,499,040 A 3/1996 McLaughlin et al.
5,570,108 A * 10/1996 McLaughlin et al. ....... 345/146

FOREIGN PATENT DOCUMENTS

EP 0645750 A1 3/1995
JP 7-225575 A 8/1995
JP 08251503 9/1996
JP 8-251503 A 9/1996
WO WO96/17338 6/1996

OTHER PUBLICATIONS

"Self–Identification Protocol Initialization", IBM Technical Disclosure Bulletin, vol. 33, No. 10A, Mar. 1999, pp. 406–407.

* cited by examiner

*Primary Examiner*—Matthew Luu
*Assistant Examiner*—Chante' Harrison
(74) *Attorney, Agent, or Firm*—Mattingly, Stanger & Malur, P.C.

(57) ABSTRACT

In an image displaying system, the distribution of functions among the image displaying apparatus, the information processing apparatus, and an operating system controlling the operations of the information processing apparatus are clarified, and the capability of the image displaying apparatus to display an image with a display attribute varying from area to area on the display screen of the image displaying apparatus is determined. The image displaying system includes an image displaying apparatus having such a capability, and an information processing apparatus that can generate an image signal and transmit the image signal to the image displaying apparatus. The system can communicate according to USB standards, or according to DDC standards. The information processing apparatus transmits area-attribute information for changing a display attribute of a specific area on the display screen to the image displaying apparatus.

83 Claims, 52 Drawing Sheets

| | | |
|---|---|---|
| START ADRESS | END ADDRESS | CONTRAST LEVEL |
FIG. 24(a)
| | | |
|---|---|---|
| START ADRESS | HORIZONTAL/ VERTICAL WIDTHS | CONTRAST LEVEL |
FIG. 24(b)
| | | |
|---|---|---|
| END ADRESS | HORIZONTAL/ VERTICAL WIDTHS | CONTRAST LEVEL |
FIG. 24(c)
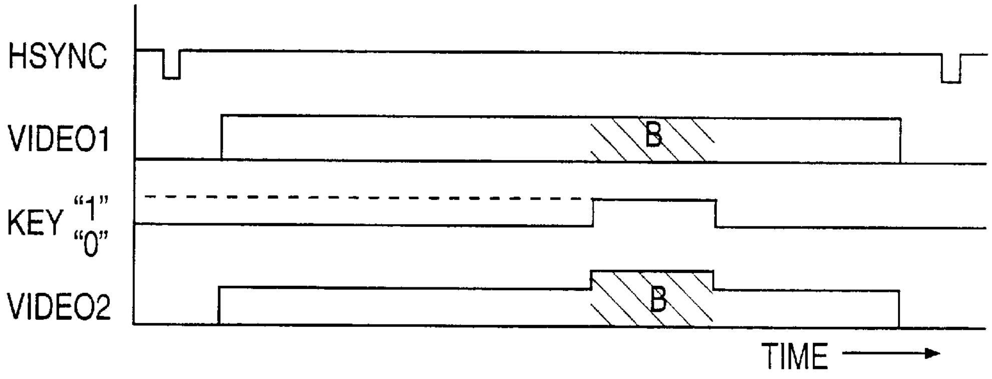
FIG. 25(a)
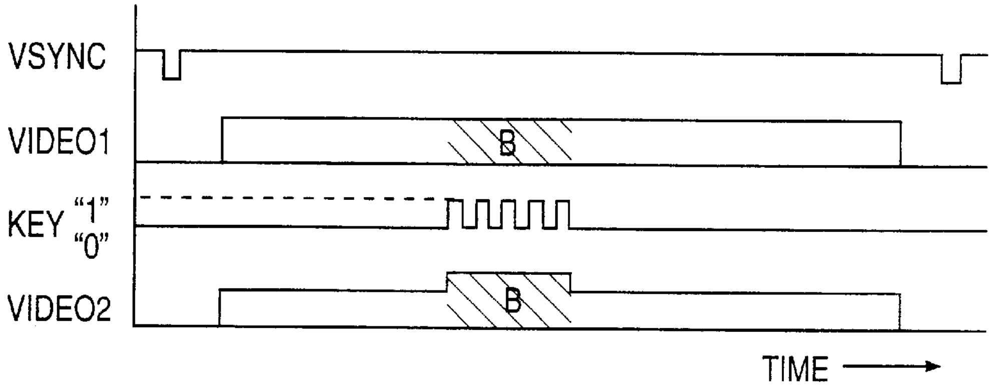
FIG. 25(b)

(X IS A NUMBER IN THE RANGE 0 TO 3)

| CCX1 | CCX0 | CONTROL DESCRIPTION |
|---|---|---|
| 0 | 0 | NORMAL (CONTROL OFF) |
| 0 | 1 | NORMAL X 2 (CONTROL ON) |
| 1 | 0 | NORMAL X 3 (CONTROL ON) |
| 1 | 1 | NORMAL X 4 (CONTROL ON) |

IMAGE DISPLAYING SYSTEM AND INFORMATION PROCESSING APPARATUS

BACKGROUND OF THE INVENTION

1. Field of the Invention

In general, the present invention relates to an image displaying system for displaying an image signal by modifying a display attribute of the image signal. In particular, the present invention relates to an effective technology applied to an image displaying system for displaying an image signal, such as text data and dynamic-image data output by an information processing apparatus, on a display screen of an image displaying apparatus, whereby the contrast of the image signal is modified in accordance with the type of the data to be displayed.

2. Description of the Related Art

In recent years, the performance of computers, and in particular, the performance of personal computers (PCs) has exhibited rapid progress, becoming capable of handling not only static images but also dynamic images. In addition, multimedia services such as video on demand (VOD), which allows the user to watch a desired program at any convenient time; an electronic encyclopedia using a CD-ROM; and the generation of dynamic images using a DVD (digital video (or versatile) disk) are becoming popular.

In such a multimedia service, dynamic-image data (such as a television image) may be displayed on a display screen of an image displaying apparatus for displaying computer text and graphics. The display screen of a CRT (cathode ray tube) display unit or an LCD (liquid-crystal display) unit, which is connected to a computer and used as an image displaying apparatus for displaying an image signal output by the computer, has good precision, but in general has its display contrast set at a low value in comparison with a television receiver.

For example, let us compare the value of the peak contrast of a television receiver with that of an image displaying apparatus. The value of the peak contrast of a television receiver is normally at least 300 cd/$m^2$. On the other hand, the value of the peak contrast of an image displaying apparatus for displaying an image based on an image signal output by a computer is about 150 cd/$m^2$, a low value which is about half that of the peak contrast of a television receiver.

Such a contrast value is good in that it does not cause fatigue to the eyes of the user who spends a long period of time on the composition of a text or work such as CAD (Computer Aided Design) by using a computer. For displaying a dynamic image described above, however, the contrast value of the screen of the image displaying apparatus provides an appearance inferior to a television receiver, becoming a negative factor in the image display.

In order to solve the problem described above, an image displaying apparatus has been proposed, which has an additional switching means for manually increasing the display contrast of the entire image displaying apparatus employed in the conventional computer over the entire display screen (for example, in a case of displaying a dynamic image thereon).

The conventional control of display brightness, an item of adjustment like the one described above, includes adjustment of contrast, adjustment of brightness, and control of the amplitudes of a variety of color image signals, such as the red, blue, and green color signals. The adjustment of contrast, the adjustment of brightness, and the control of amplitudes can all be controlled for the entire display screen. However, the control of contrast on only part of the display screen for a dynamic-image portion or the like has not been prescribed.

In addition, window-luminance adjusting systems capable of individually adjusting the luminance of a specified window are disclosed in Japanese Patent Laid-open Nos. Sho 61-248083, Sho 63-158587, Hei 4-220691, Hei 7225575 and Hei 8-251503. In each of these window-luminance adjusting systems, however, the distribution of functions between the image displaying apparatus and the information processing apparatus for generating an image signal is not clarified.

SUMMARY OF THE INVENTION

When displaying a computer image as a window on the conventional image displaying apparatus, as is the general practice with the contemporary computer, dynamic images are displayed only on some windows of the display screen while the remaining windows are used for doing work such as composition of a text. Since the contrast of the entire display screen is controlled, even in such a case, the entire display screen becomes bright. As a result, in a state where a dynamic image is displayed while the user is doing work such as composition of a text, the amount of fatigue caused to the eyes of the user may increase.

In order to solve the problems described above, the present invention provides a technology that clarifies the distribution of functions among the image displaying apparatus, the information processing apparatus, and an operating system controlling the operations of the information processing apparatus. The present invention is capable of displaying data with a display attribute varying from area to area on the display screen of the image displaying apparatus.

In an image displaying system wherein an image signal is transmitted from an information processing apparatus to an image displaying apparatus to be displayed on the image displaying apparatus, the invention generates area-attribute information for modifying a display attribute of a specific area on a display screen of the image displaying apparatus. The area-attribute information generated in the information processing apparatus is transmitted from the information processing apparatus to the image displaying apparatus through a communication means. The display attribute of the specific area on the display screen of the image displaying apparatus is modified in accordance with the area-attribute information received by the image displaying apparatus, and the data is displayed on the display screen.

In the image displaying system described above, display attributes for special-type data, such as dynamic-image data, and for a special display element, such as an active window, are prepared in advance. Area-attribute information is generated, which comprises area information indicating a specific area on a display screen of the image displaying apparatus in which the data is to be displayed, and information on the display attributes prepared in advance is generated.

Then, a specific-area-display-attribute changing means changes a display attribute of data to be displayed in a specific area indicated by the area information of the generated area-attribute information, and the data is displayed in the specific area of the display screen of the image displaying apparatus.

As described above, according to the image displaying system provided by the present invention, area-attribute information is generated by the information processing apparatus for data to be displayed on the image displaying apparatus, and the data is displayed in a specific area of the display screen of the image displaying apparatus indicated by the area-attribute information by modifying a display attribute of the specific area in accordance with the area-attribute information.

As a result, in the image displaying system, the distribution of functions among the image displaying apparatus, the information processing apparatus, and an operating system controlling the operations of the information processing apparatus is clarified. In addition, the image displaying system is capable of displaying data with a display attribute varying from area to area on the display screen of the image displaying apparatus.

BRIEF DESCRIPTION OF THE DRAWINGS

FIGS. 24(*a*) to 24(*b*) are diagrams schematically showing different formats of area-attribute information used in the first embodiment;

FIGS. 25(*a*) and 25(*b*) are timing charts each schematically showing a relation between the levels of the timing signal Key and the image signal in the first embodiment;

DETAILED DESCRIPTION OF THE PREFERRED EMBODIMENTS

The present invention will become more apparent from a study of the following detailed description, with reference to the accompanying diagrams.

First Embodiment

The following is a description of an image displaying system implemented by a first embodiment of the invention. In this first embodiment, a display attribute of a specific display area can be changed in accordance with area-attribute information transmitted from an information processing apparatus to an image displaying apparatus on which the specific area is displayed.

Figure 1:
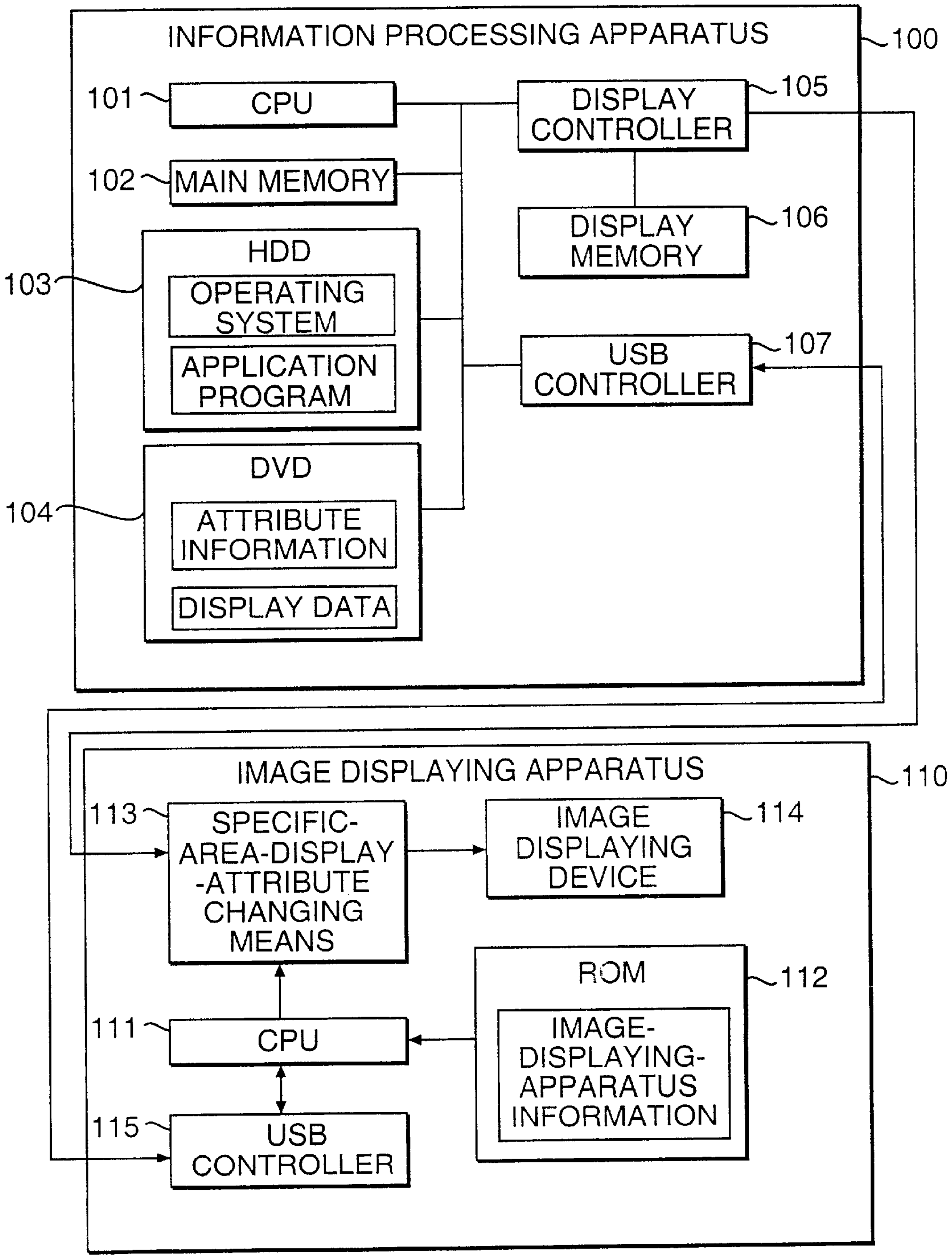
FIG. 1 is a diagram schematically showing a configuration of an image displaying system implemented by a first embodiment of the invention.

FIG. 1 is a diagram that shows a configuration of the image displaying system implemented by the present embodiment. As shown in the figure, the image displaying system comprises an information processing apparatus 100 and an image displaying apparatus 110. The information processing apparatus 100 receives information concerning the image displaying apparatus 110 from the image displaying apparatus 110, and transmits an image signal and information concerning area attributes to the image displaying apparatus 110. The image displaying apparatus 110 displays the image signal on a specific area of a display screen by modifying the display attribute of the specific area on the display screen in accordance with the area-attribute information received from the information processing apparatus.

The information processing apparatus 100 comprises a CPU 101 and a main memory unit 102. The CPU 101 is a processor for carrying out total control of the information processing apparatus 100. More specifically, the CPU 101 controls the information processing apparatus 100 by actually interpreting and executing application programs, an operating system, and a group of programs such as a USB (Universal Serial Bus) device driver and an image displaying device driver, which are loaded into the main memory unit 102.

In addition, the information processing apparatus 100 also includes an HDD (Hard Disk Drive) 103, which is a storage device for storing software such as the application programs, the operating system, a GUI (Graphical User Interface) program, an API (Application Program Interface) program, the USB device driver and the image displaying device driver. The information processing apparatus 100 is also provided with a DVD 104, which is another storage device for storing text data and display data of static and dynamic images to be displayed on the image displaying apparatus 110.

Further, the information processing apparatus 100 also has a display controller 105 and a display memory unit 106. The display controller 105 controls write operations for writing data to be displayed on the image displaying apparatus 110 into the display memory unit 106, and controls read operations for reading out the data from the display memory unit 106 as an image signal to be transmitted to the image displaying apparatus 110.

Finally, the information processing apparatus 100 of the present embodiment is also provided with a USB controller 107, which is a communication means for transmitting an inquiry signal to the image displaying apparatus 110 and receiving a report signal, a response to the inquiry signal, from the image displaying apparatus 110. The inquiry signal is used for making an inquiry about the ability of the image displaying apparatus 110 to display an image on a specific area on the screen thereof by changing a display attribute of the specific area in accordance with USB standards. In other words, the inquiry signal asks whether the image displaying apparatus 110 can accommodate multiple images at once, one of which has a changing display attribute that modifies the actual display of the image in a specific area of the display screen while the other image or images on the display screen are not so modified. The USB controller 107 is also used for supplying the image displaying apparatus 110 with the information on area attributes for changing the display attribute of the specific area on the display screen of the image displaying apparatus 110.

On the other hand, the image displaying apparatus 110 comprises a CPU 111 and a ROM unit 112. The CPU 111 is a processor for controlling the image displaying apparatus 110 as a whole by interpretation and execution of a control program stored in a storage area of the ROM 112. It should be noted that the control program itself is not shown in the figure.

The ROM 112 employed in the image displaying apparatus 110 stores information in the image displaying apparatus 110. Such information indicates whether or not the image displaying apparatus 110 has a specific-area-display-attribute changing means 113, that is, whether or not the image displaying apparatus 110 has the capability of displaying an image on a specific area on the screen thereof by changing a display attribute of the specific area. The specific-area-display-attribute changing means 113 changes the display attribute of a specific area on an image displaying device 114 employed in the image displaying apparatus 110.

In addition, the image displaying apparatus 110 also employs a USB controller 115, which serves as a counterpart of the USB controller 107 employed in the information processing apparatus 100. More specifically, the USB controller 115 receives an inquiry signal from the information processing apparatus 100 and transmits a report signal, in response to the inquiry signal, to the information processing apparatus 100. The inquiry signal is used for making an inquiry about the ability of the image displaying apparatus 110 to display an image on a specific area on the screen thereof by changing a display attribute of the specific area in accordance with USB standards.

Figure 2:
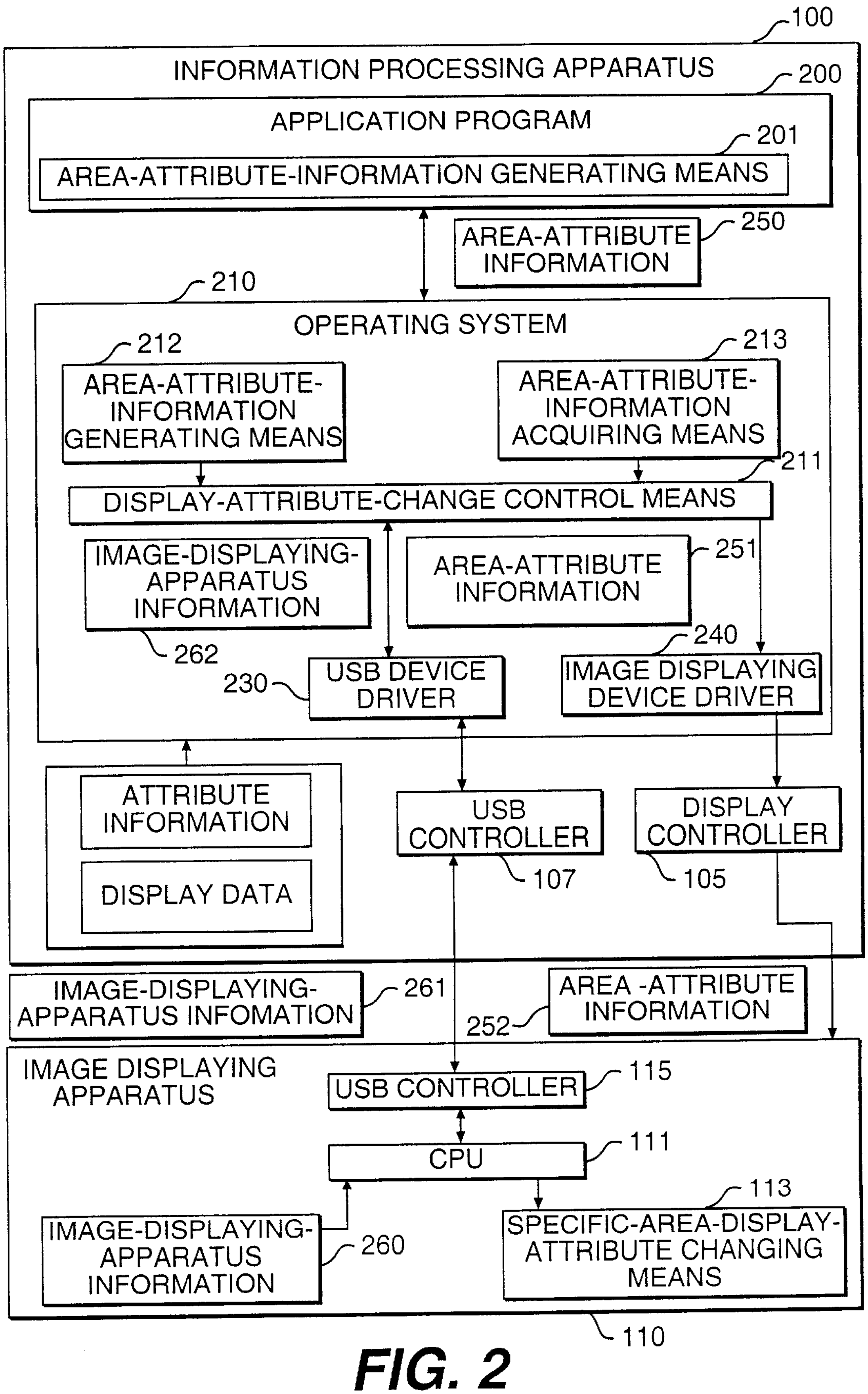
FIG. 2 is a diagram showing an outline of processing carried out by the image displaying system implemented by the first embodiment.

FIG. 2 is a diagram showing an outline of processing carried out by the image displaying system implemented by the present embodiment. As shown in the figure, the image displaying system has an application program 200, an operating system 210, a USB device driver 230, and an image displaying device driver 240 in the information processing apparatus 100, in addition to image-displaying-apparatus information 260 in the image displaying apparatus 110.

The application program 200 in the information processing apparatus 100 comprises a GUI, which includes a portion that is visible to the operator who operates the information processing apparatus 100, and which also serves as an interface with the operating system 210.

The operating system 210 in the information processing apparatus 100 is a basic program serving as the nucleus of the image displaying system. More specifically, the operating system 210 connects the application program 200 with program members that directly control hardware, such as the USB device driver 230 and the image displaying device driver 240.

The image displaying device driver 240 in the information processing apparatus 100 is positioned between the operating system 210 and hardware members such as the device controller 105 and the display memory unit 106. More specifically, the image displaying device driver 240 is a program which implements a draw instruction issued by the operating system 210 by reading out and writing information from and into internal registers of the display controller 105 and the display memory unit 106. It should be noted that the internal registers themselves are not shown in the figure.

The application program 200 in the information processing apparatus 100 is provided with an area-attribute-information generating means 201. When there is detected a need to change a display attribute of a specific area on the display screen of the image displaying apparatus 110, area-attribute information 250 for changing the display attribute of the specific area on the display screen of the image displaying apparatus 110 is generated in the application program 200 and passed to the operating system 210 by the area-attribute-information generating means 201.

The operating system 210 in the information processing apparatus 100 comprises a display-attribute-change control means 211, an area-attribute-information generating means 212, and an area-attribute-information acquiring means 213. The display-attribute-change control means 211 controls the entire display-attribute-change processing of the information processing apparatus 100 by making an inquiry about an ability of the image displaying apparatus 110 to display an image on a specific area on the display screen thereof by changing a display attribute of the specific area and receiving a response to the inquiry. The area-attribute-information generating means 212 generates area-attribute information 251 in the operating system 210 when there is detected a need to change a display attribute of a specific area on the display screen of the image displaying apparatus 110. The area-attribute-information acquiring means 213 acquires the area-attribute information 250 generated by the area-attribute-information generating means 201 of the application program 200.

In addition, the USB device driver 230 and the image displaying device driver 240 are included in the operating system 210. The USB device driver 230 converts the area-attribute information 251 and image-displaying-apparatus information 262 into USB data packets and vice versa in accordance with USB standards, and exchanges area-attribute information 252 and image-displaying-apparatus information 261 between the information processing apparatus 100 and the image displaying apparatus 110. The image displaying device driver 240 stores data to be displayed in the display-memory unit 106.

The USB controller 107 is controlled by the USB device driver 230 so that an inquiry about an ability of the image displaying apparatus 110 to display an image on a specific area on the display screen thereof by changing a display attribute of the specific area is transmitted from the USB controller 107 to the image displaying apparatus 110. The report indicating such a capability in response to the inquiry is received by the USB controller 107. Controlled by the USB device driver 230, the USB controller 107 also carries out processing to transmit the area-attribute information 251 passed from the display-attribute-change control means 211.

Receiving the area-attribute information 251 passed from the display-attribute-change control means 211, the USB device driver 230 assembles a packet comprising the contents of the area-attribute information 251 in a format matching a USB protocol, and transfers the packet to the USB controller 107. The USB controller 107 converts the packet transferred thereto into an electrical signal, transmitting the signal conveying the information to the image displaying apparatus 110 connected to the USB controller 107.

The USB controller 115 employed in the image displaying apparatus 110 connected to the USB controller 107 receives the packet destined therefor, extracting area information and attribute information from the area-attribute information 252. The display attribute of a specific area on the display screen of the image displaying apparatus 110 is then changed by a specific-area-display-attribute changing means 113.

Figure 3:
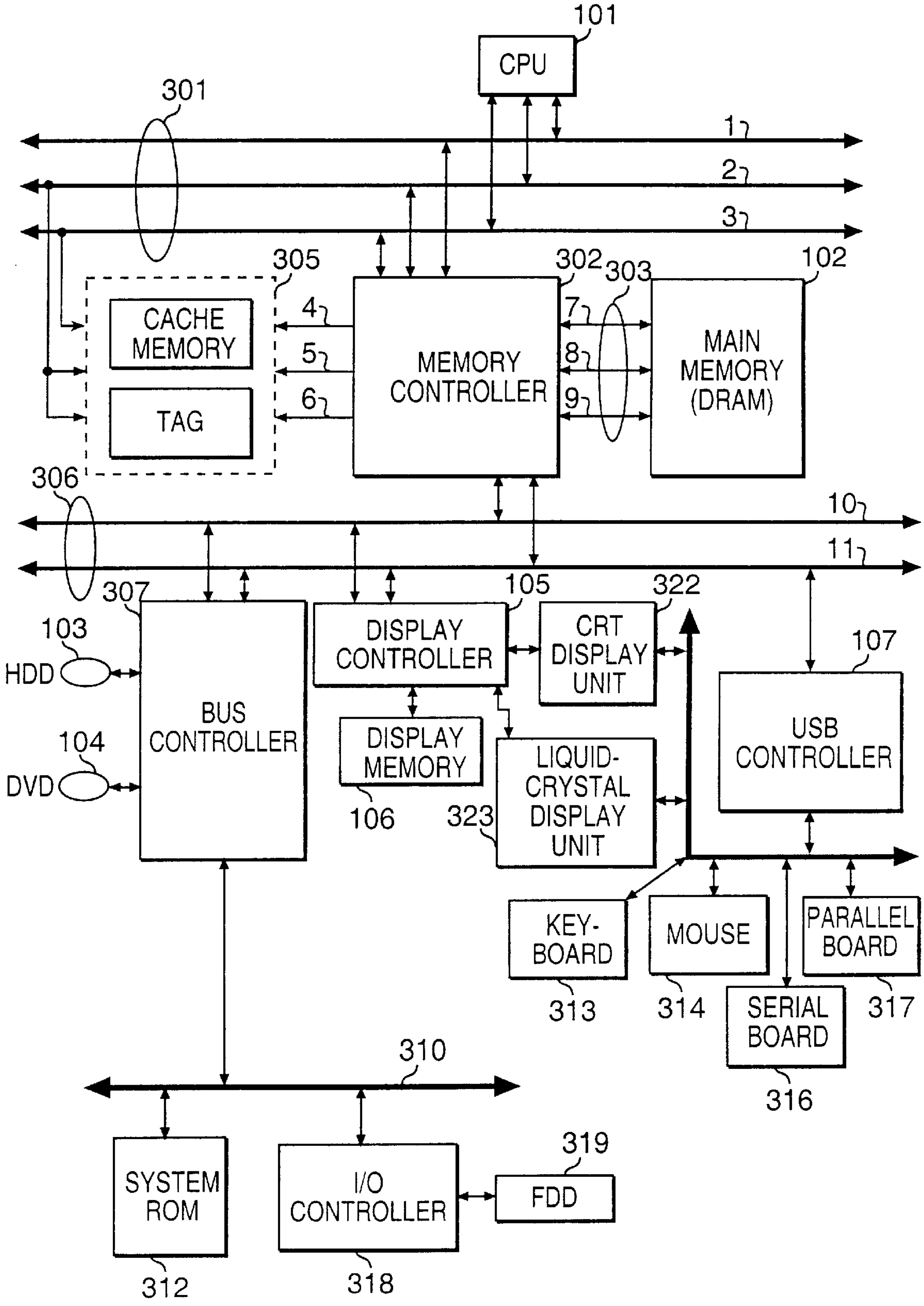
FIG. 3 is a diagram showing a preferred implementation of an information processing apparatus provided by the first embodiment.

FIG. 3 is a diagram showing a preferred implementation of the information processing apparatus 100 provided by the present embodiment. As shown in the figure, in the information processing apparatus 100, a CPU 101, a secondary cache memory unit 305, and a memory controller 302 for controlling access to the main memory unit 102 are connected to a host bus 301, including control line 1, address line 2, and data line 3. A bus controller 307 for controlling access to the HDD 103 and the DVD 104, the display controller 105, and the USB controller 107 are connected to a system bus 306. Finally, a system ROM 312 and an I/O controller 318 are connected to an I/O bus 310.

The memory controller 302 controls the secondary cache memory unit 305 via cache control line 4, tag control line 5, and tag address line 6. The memory controller 302 further controls access to the main memory unit 102 through a memory bus 303, over which addresses are transmitted on address line 7, control signals on control line 8, and data on data line 9, and also controls connection between the host bus 301 and the system bus 306. The bus controller 307 controls connection between the system bus 306 and the I/O bus 310, and also controls the HDD 103 and the DVD 104.

The system bus 306 is a bus to which high-speed devices and high-speed controllers are connected via control line 10 and address/data line 11 thereof. In the implementation shown in FIG. 3, the system bus 306 is implemented by a PCI (Peripheral Component Interface) bus, wherein data and an address are multiplexed. It should be noted that the system bus 306 can also be implemented by a bus wherein the address and data buses are separated from each other as is the case with the host bus 301. Low/medium-speed devices and low/medium-speed controllers are connected from the system bus 306 to the I/O bus 310 through the bus controller 307.

Connected to the system bus 306, the display controller 105 controls write operations for writing display data from the CPU 101 into the display memory unit 106, and display operations for displaying the display data stored in the display memory unit 106 on a CRT display unit 322 or a liquid-crystal display unit 323, either of which serves as the image displaying apparatus 110.

Connected to the USB controller 107 are a USB-oriented keyboard 313, a mouse 314, a serial port 316, a parallel port 317, and the CRT display unit 322 or the liquid-crystal display unit 323.

Like the display controller 105, the USB controller 107 is connected to the system bus 306 in the information processing apparatus 100 as shown in FIG. 3. The USB controller 107 is used for controlling output units and input units such as the keyboard 313 and the mouse 314. In the image displaying system implemented by the present embodiment, the output unit controlled by the USB controller 107 is the CRT display unit 322 or the liquid-crystal display unit 323.

A packet assembled by the USB bus driver 230 to contain the contents of the area-attribute information 251 is transferred from the CPU 101 to the system bus 306 by way of the memory controller 302 before being supplied to the USB controller 107. The packet received by the USB controller 107 is then output to the CRT display unit 322 or the liquid-crystal display unit 323.

It should be noted that the display controller 105 and the USB controller 107 can be connected to one image displaying apparatus 110 or to a plurality of image displaying apparatus, which are implemented by CRT display units 322 and/or liquid-crystal display units 323.

The system ROM 312 connected to the I/O bus 310 is used for storing software and data such as an IPL (Initial Program Loader) executed at power-on, a BIOS (Basic Input/Output System), a display control program, and display fonts. The I/O controller 318 controls access to an FDD 319.

The communication means for exchanging the area-attribute information 252 and the image-displaying-apparatus information 261 between the information processing apparatus 100 and the image displaying apparatus 110 can be implemented by a non-USB device such as a DDC (Display Data Channel, a trademark) controller.

Figure 4:
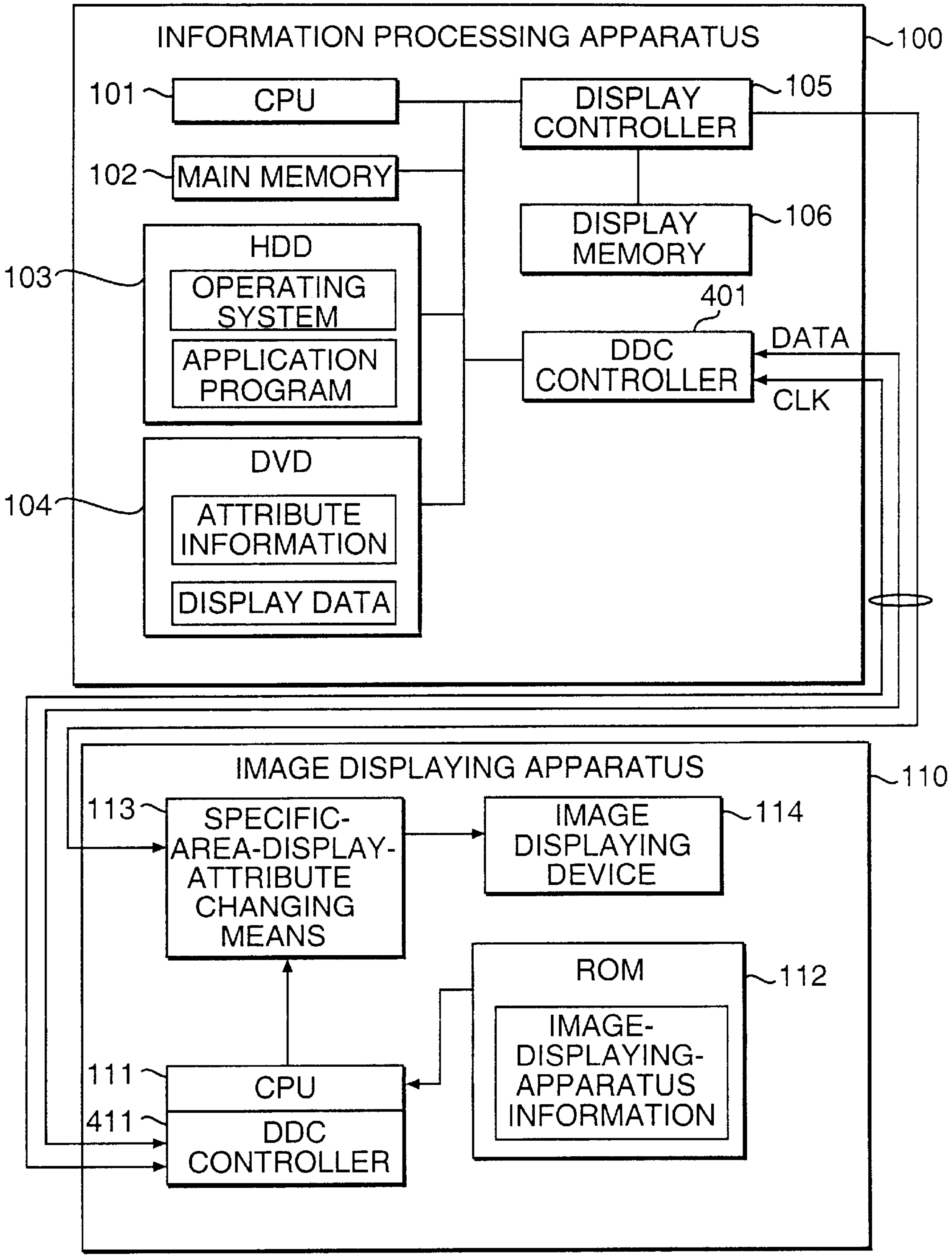
FIG. 4 is a diagram schematically showing the configuration of the image displaying system implemented by the first embodiment, wherein DDC controllers are employed.

FIG. 4 is a diagram showing the configuration of an image displaying system implemented by the present embodiment, wherein DDC controllers are employed. As shown in the figure, a DDC controller 401 is provided in the information processing apparatus 100 for receiving image-displaying-apparatus information from the image displaying apparatus 110, and for transmitting an image signal and area-attribute information to the image displaying apparatus 110. A DDC controller 411 is provided in the image displaying apparatus 110 for receiving the image signal and the area-attribute information from the information processing apparatus 100, and for displaying an image on a specific area on the display screen of the image displaying apparatus 110 by changing a display attribute of the specific area.

The CPU 101 employed in the information processing apparatus 100 is a processor for controlling the entire information processing apparatus 100. More specifically, the CPU 101 controls the information processing apparatus 100 as a whole by actually interpreting and executing an application program 200, an operating system 210, and a group of programs such as a DDC device driver and an image displaying device driver 240 which are loaded into the main memory unit 102.

In addition, the information processing apparatus 100 also includes an HDD 103 for storing software such as the application program 200, the operating system 210, a GUI program, an API program, the DDC device driver, and the image displaying device driver 240. The information processing apparatus 100 is also provided with a DVD 104 for storing text as well as display data of static and dynamic images to be displayed on the image displaying apparatus 110.

Further, the information processing apparatus 100 has a display controller 105 and a display memory unit 106. The display controller 105 controls write operations for writing data to be displayed on the image displaying apparatus 110 into the display memory unit 106, and controls read operations for reading out the data from the display memory unit 106 as an image signal to be transmitted to the image displaying apparatus 110.

The DDC controller 401 transmits an inquiry signal to the image displaying apparatus 110 and receives a report signal, in response to the inquiry signal, from the image displaying apparatus 110. The inquiry signal is used for making an inquiry about the ability of the image displaying apparatus 110 to display an image on a specific area on the screen thereof by changing a display attribute of the specific area in accordance with DDC standards. The DDC controller 401 is also used for supplying the image displaying apparatus 110 with information on area attributes for changing a display attribute of a specific area on the display screen of the image displaying apparatus 110.

On the other hand, the image displaying apparatus 110 comprises a CPU 111 and a ROM unit 112. The CPU 111 is a processor for controlling the image displaying apparatus 110 as a whole by interpretation and execution of a control program stored in a storage area of the ROM unit 112. It should be noted that the control program itself is not shown in the figure.

The ROM unit 112 employed in the image displaying apparatus 110 is a recording medium for storing information on the image displaying apparatus 110. Such information indicates whether or not the image displaying apparatus 110 has a specific-area-display-attribute changing means 113, that is, indicates whether or not the image displaying apparatus 110 has a capability of displaying an image on a specific area on the screen thereof by changing a display attribute of the specific area. The specific-area-display-attribute changing means 113 is a means for changing a display attribute of a specific area on an image displaying device 114 employed in the image displaying apparatus 110.

In addition, the image displaying apparatus 110 also employs a DDC controller 411, a communication means serving as a counterpart of the DDC controller 401 employed in the information processing apparatus 100. More specifically, the DDC controller 411 receives an inquiry signal from the information processing apparatus 100 and transmits a report signal, a response to the inquiry signal, to the information processing apparatus 100. The inquiry signal is used for making an inquiry about the ability of the image displaying apparatus 110 to display an image on a specific area on the screen thereof by changing a display attribute of the specific area in accordance with DDC standards.

In the interface which conforms to the DDC standards, bi-directional data and clock lines are used. A source that transmits data carries out a multi-master operation to generate a clock signal. In addition, in the DDC interface, the data and clock lines are implemented by wires in the same cable as an image-signal line between the information processing apparatus 100 and the image displaying apparatus 110.

Figure 5:
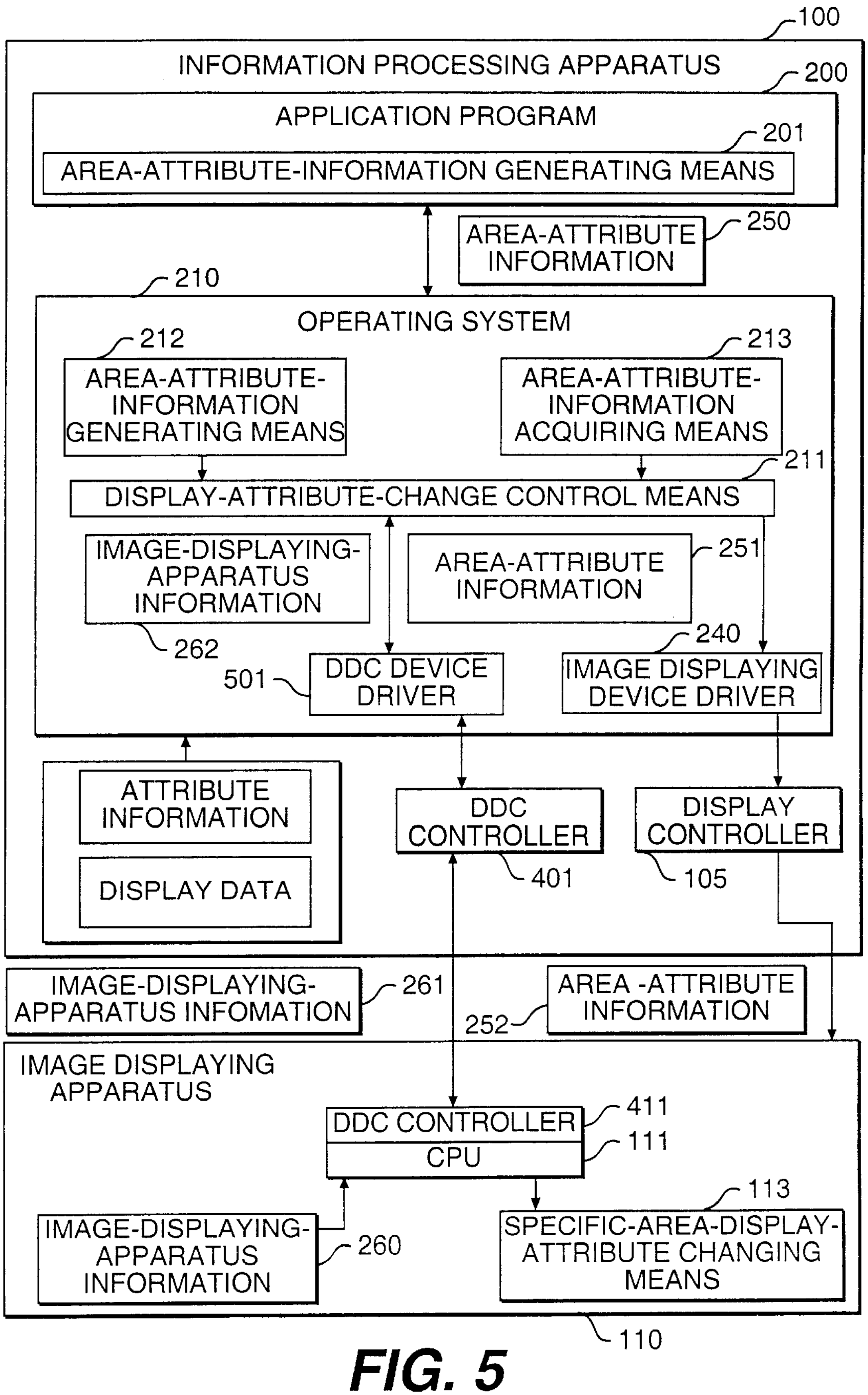
FIG. 5 is a diagram showing an outline of processing carried out by the image displaying system implemented by the first embodiment wherein DDC controllers are employed.

FIG. 5 is a diagram showing an outline of processing carried out by the image displaying system implemented by the present embodiment, in which DDC controllers are employed. As shown in the figure, the image displaying system has an application program 200, an operating system 210, a DDC device driver 501, and an image displaying device driver 240 in the information processing apparatus 100.

The application program 200 in the information processing apparatus 100 comprises a GUI, which includes a portion that is visible to the operator who operates the information processing apparatus 100, and which also serves as an interface with the operating system 210.

The operating system 210 in the information processing apparatus 100 is a basic program serving as the nucleus of the image displaying system. More specifically, the operating system 210 connects the application program 200 with program members that directly control hardware, such as the DDC device driver 501 and the image displaying device driver 240.

The image displaying device driver 240 in the information processing apparatus 100 is positioned between the operating system 210 and hardware members such as the device controller 105 and the display memory unit 106. More specifically, the image displaying device driver 240 is a program which implements a draw instruction issued by the operating system 210 by reading out and writing information from and into internal registers of the display controller 105 and the display memory unit 106. It should be noted that the internal registers themselves are not shown in the figure.

The operating system 210 converts the DDC-signal transmission format of the area-attribute information 251 to that of the image-displaying-apparatus information 260 and vice versa in accordance with DDC standards. The operating system 210 is provided with the DDC device driver 501 for transmitting area-attribute information 252 from the information processing apparatus 100 to the image displaying apparatus 110 and image-displaying-apparatus information 261 from the image displaying apparatus 110 to the information processing apparatus 100.

The DDC controller 401 is controlled by the DDC device driver 501 to transmit an inquiry to the image displaying apparatus 110 about an ability of the image displaying apparatus 110 to display an image on a specific area on the display screen thereof by changing a display attribute of the specific area. In response to the inquiry, the DDC controller 401 receives a report from the image displaying apparatus 110 indicating the capability of the image displaying apparatus 110 to display such an image on a specific area on its display screen. Controlled by the DDC device driver 501, the DDC controller 401 also carries out processing to transmit the area-attribute information 251 passed from a display-attribute-change control means 211.

After receiving the area-attribute information 251 passed from the display-attribute-change control means 211, the DDC device driver 501 assembles data comprising the contents of the area-attribute information 251 in a format matching a DDC protocol and transfers the data to the DDC controller 401. The DDC controller 401 converts the data transferred thereto into an electrical signal, and transmits the signal conveying the information to the image displaying apparatus 110 connected to the DDC controller 401.

The image displaying apparatus 110 receives the data from the DDC controller 401, and extracts area information and attribute information from the area-attribute information 252. The display attribute of the specific area is then changed by a specific-area-display-attribute changing means 113.

Figure 6:
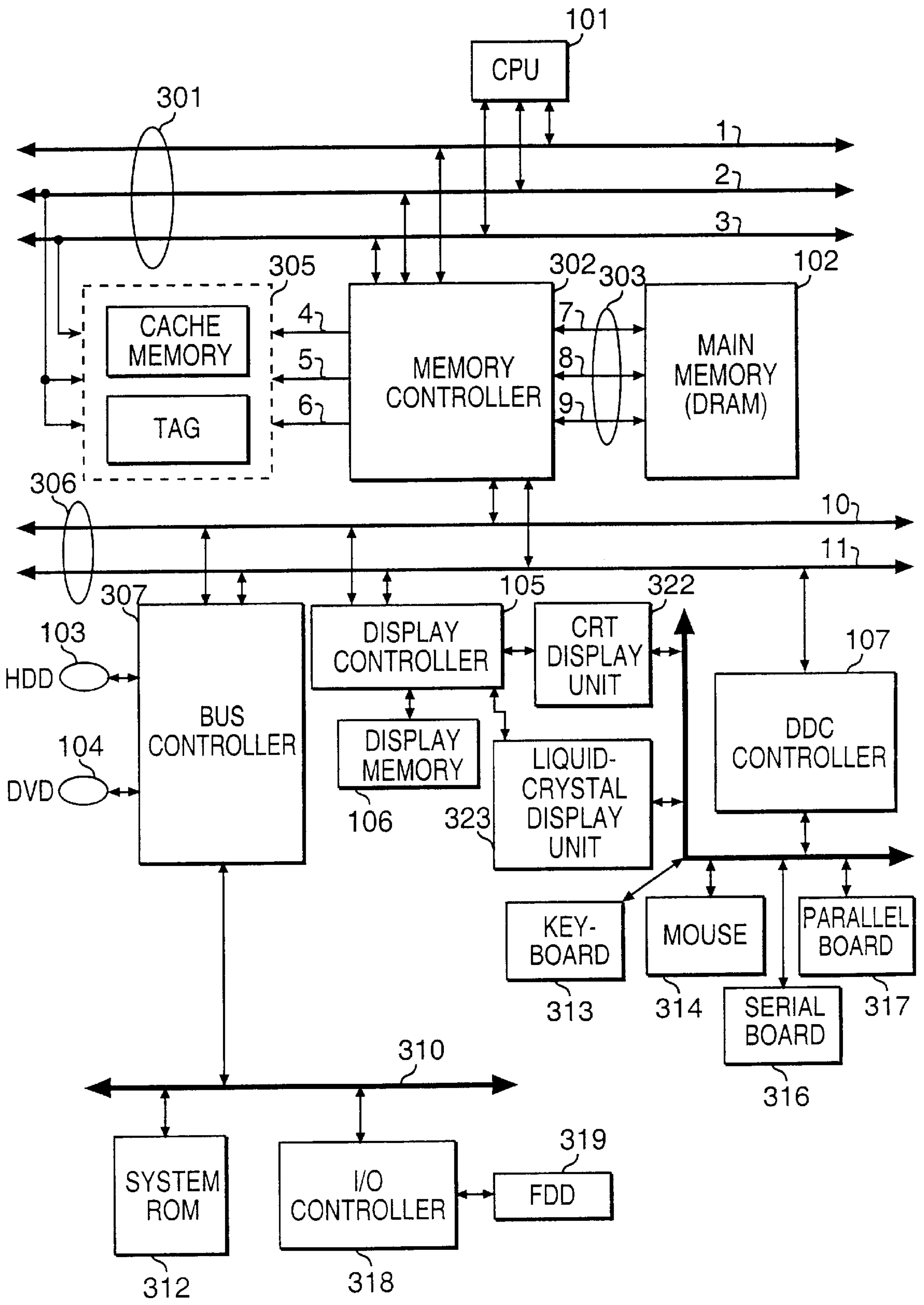
FIG. 6 is a diagram showing a preferred implementation of the information processing apparatus employing a DDC controller as implemented by the first embodiment.

FIG. 6 is a diagram showing a preferred embodiment of the information processing apparatus 100 employing a DDC controller as implemented by the present embodiment. As shown in the figure, the information processing apparatus 100 employs a DDC controller 401 connected to a system bus 306. Connected to the DDC controller 401 are a DDC oriented keyboard 313, a mouse 314, a serial port 316, a parallel port 317 and the CRT display unit 322 or the liquid-crystal display unit 323.

Like the display controller 105, the DDC controller 401 is connected to the system bus 306 in the information processing apparatus 100 as shown in FIG. 6. The DDC controller 401 is used for controlling output units and input units such as the keyboard 313 and the mouse 314. In the image displaying system implemented by the present embodiment, the output unit controlled by the DDC controller 401 is the CRT display unit 322 or the liquid-crystal display unit 323, either of which may serve as the image displaying apparatus 110.

A packet assembled by the DDC device driver 501 to comprise the contents of the area-attribute information 251 is transferred from the CPU 101 to the system bus 306 by way of the memory controller 302 before being supplied to the DDC controller 401. The packet received by the DDC controller 401 is then output to the CRT display unit 322 or the liquid-crystal display unit 323.

As described above, in the image displaying system implemented by the present embodiment, the communication means for exchanging the area-attribute information 252 and the image-displaying-apparatus information 261 between the information processing apparatus 100 and the image displaying apparatus 110 can be implemented by a non-USB device such as a DDC controller. In the following description, mainly, cases in which a USB device is employed are explained.

A BIOS program stored in a system ROM 312, as well as software such as the operating system 210, the GUI program, the API program, the USB device driver 230, and the image displaying device driver 240 stored in the HDD 103, are loaded into the main memory unit 102 at power on, remaining in the main memory unit 102 as resident programs thereafter.

Figure 7:
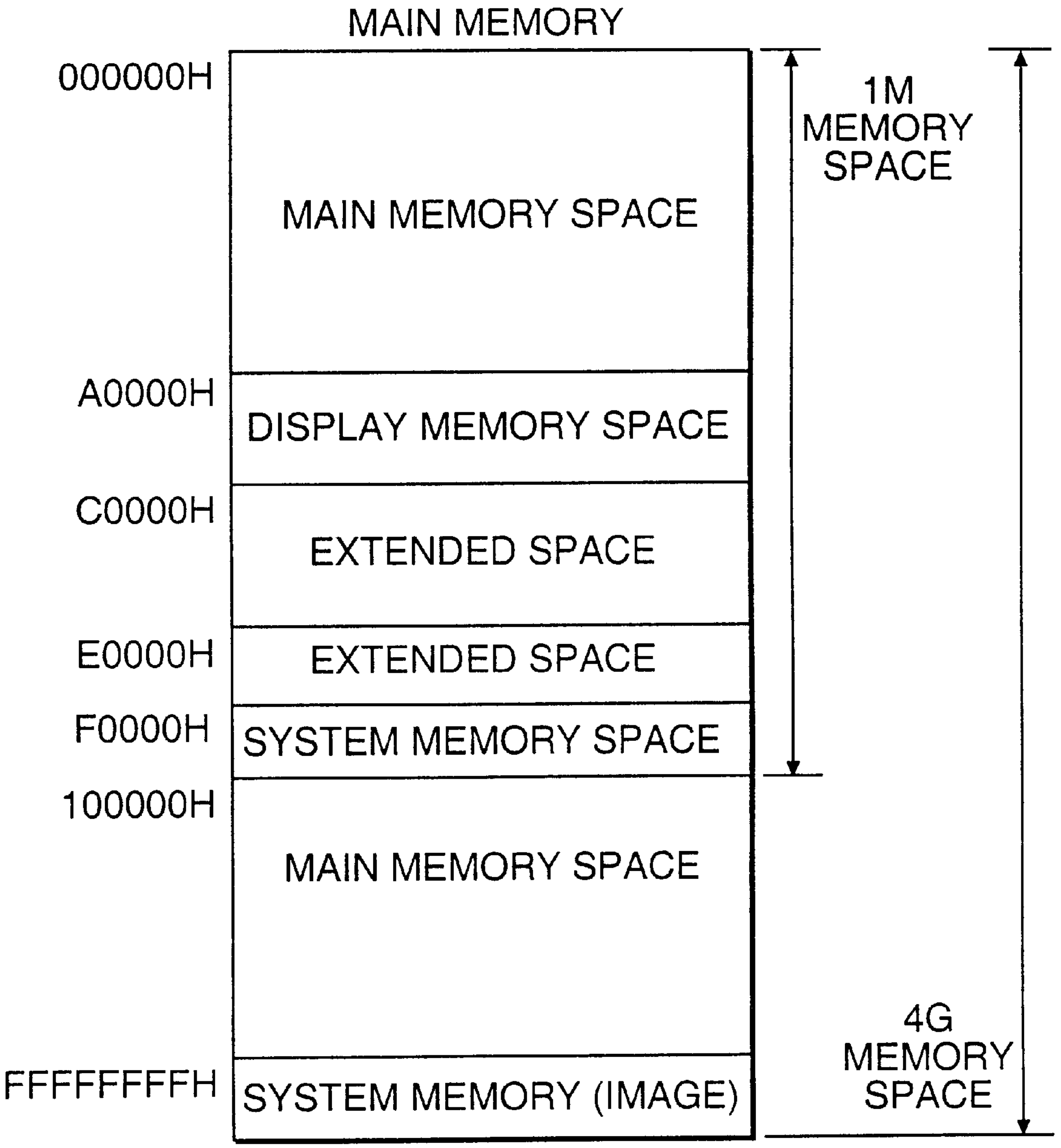
FIG. 7 is a diagram showing an example of a memory space in the first embodiment.

FIG. 7 is a diagram showing an example of a memory space in the present embodiment. As shown in the figure, a memory space from OOOOOH to 9FFFFH is allocated to the main memory unit 102 and a memory space from COOOOH to EFFFFH is extended space allocated as a specific memory (for example, a display control program area in the system ROM 312) and to the main memory unit 102 etc. A memory space FOOOOH to FFFFFH is a system memory space allocated to a BIOS area in the system ROM 312.

The lowest 1M memory space in the 4G memory space is allocated as an image space that includes the main memory space from OOOOOH to 9FFFFH and the system memory space from FOOOOH to FFFFFH described above. A memory space from AOOOOH to BFFFFH is a display memory space allocated to the display memory unit 106.

The following is description of the area-attribute information 250 which is generated by the application program 200 or the operating system 210 of the image displaying system when a display attribute of a specific area is changed.

When the information processing apparatus operates to display data with attribute information set in advance, the area-attribute-information generating means 201 or the area-attribute-information generating means 212 generates area-attribute information 250, which is used for modifying a display attribute of the specific area in which the data is to be displayed.

The area-attribute information 250 generated by the area-attribute-information generating means 201 or the area-attribute-information generating means 212 comprises area information specifying the location of the specific area for displaying the data, and attribute information specifying a display attribute at which the data is to be displayed. The attribute information of the area-attribute information 250 includes the contrast, the brightness, the chromaticity and the $\gamma$ characteristic. The attribute information is set for each type of data to be displayed and for each specific unit such as a display element.

For example, the data types for which the attribute information is set include text data, static-image data, and dynamic-image data. As an alternative, attribute information may also be set for each display element, such as a window, a box, a cursor, a button, and an icon. As another alternative, attribute information may also be set for an arbitrary unit specified by the user, such as a string of specific characters, a graphic, or a portion or a specific display area of a display element.

In addition, the attribute information of the area-attribute information 250 is set in advance as a run-time parameter of the application program 200 for displaying specific data, such as dynamic-image data. As an alternative, the attribute information can also be set typically for each window in a database to be referenced by the operating system 210 which displays a screen element, such as a window for a dynamic image.

Further, the attribute information can also be set for a specific state of data to be displayed, such as an active-window state resulting from connection of an input/output unit to a specific window, or a state resulting after the lapse of a specific period of time since the last input operation.

In the event of a need to modify a display attribute of a specific area on the display screen, accompanying specific processing for data to be displayed with attribute information set in advance as described above, the area-attribute-information generating means 201 or the area-attribute-information generating means 212 generates area-attribute information 250, which is used for modifying the display attribute of the specific area in which the data is to be displayed.

A display attribute of a specific area on a display screen of the image displaying apparatus 110 needs to be modified in the event of the start or the end of processing to display data with attribute information set as described above, in the event of an operation to move or copy an area with a modified display attribute for displaying data with attribute information set as described above, in the event of an operation to enlarge or shrink such an area with a modified display attribute, in the event of a change in overlapping state occurring in such an area with a modified display attribute, and in the event of execution of an operation to generate a state of a modified display attribute, by way of nonlimiting example.

The area-attribute-information generating means 201 of the application program 200 generates area-attribute information 250 in the event of any of the aforementioned occurrences happening to data to be displayed under the control of the application program 200.

Figure 8:
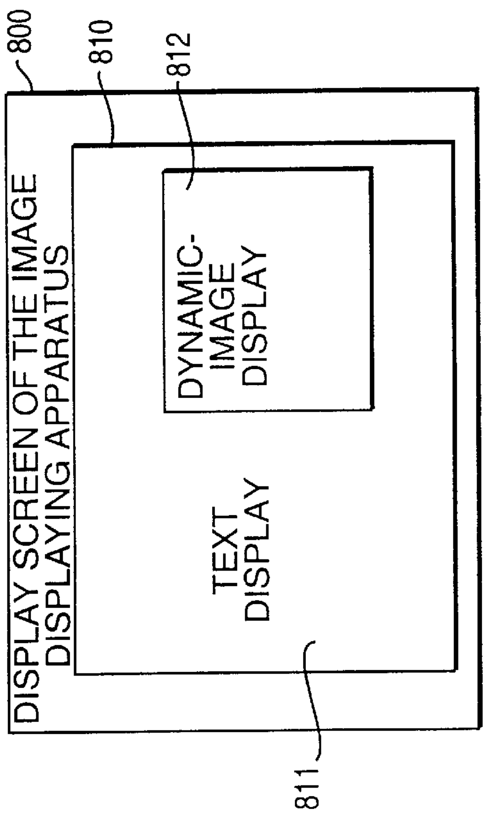
FIG. 8 is a diagram showing an example of processing to generate area-attribute information carried out by an application program in the first embodiment.

FIG. 8 is a diagram showing an example of processing that is performed by the application program 200 to generate area-attribute information, according to the present embodiment. As shown in the figure, the application program 200 generates a text display 811 and a dynamic-image display 812 which has a higher contrast than that of the text display 811, on a display window 810 of the application program 200.

In order to display dynamic-image data having a high contrast on the text display 811, the area-attribute-information generating means 201 of the application program 200 generates area-attribute information 250 comprising area information indicating the location of a display area on which the dynamic-image data is to appear, and attribute information indicating the contrast of the dynamic-image data.

Preferably, the area-attribute-information generating means 201 first acquires attribute information indicating the contrast value used in displaying the dynamic-image data by referencing a parameter set in advance in the application program 200.

Then, the area-attribute-information generating means 201 acquires the area information of the dynamic-image display 812 on which the dynamic-image data is to be displayed. Even though it is possible to provide the display area for displaying the dynamic-image data from another source, in this example, the application program 200 itself sets the display area and displays the dynamic-image data in the display area. Thus, a display area set in advance is acquired as area information, a display attribute of which is to be modified.

The application program 200 then transfers the area-attribute information 250 to the image displaying apparatus 110 through the operating system 210. The specific-area-display-attribute changing means 113 of the image displaying apparatus 110 sets the display attribute of the dynamic-image display 812 at a high contrast and displays the dynamic-image data.

The following is description of some possible expression formats for the area information of the area-attribute information 250 generated as described above.

Figure 9:
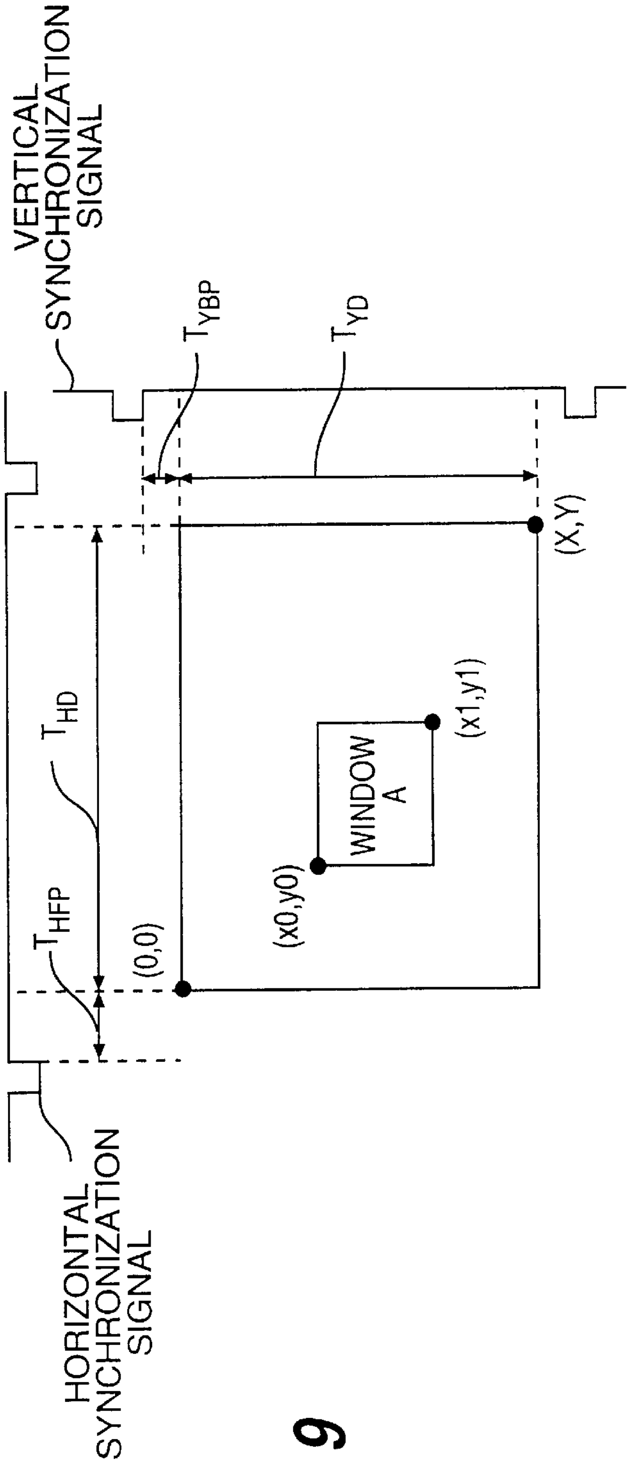
FIG. 9 is a diagram schematically showing area information of a single display area in the first embodiment.

FIG. 9 is a diagram that shows typical area information of a single display area in the present embodiment. As shown in the figure, the area information of a single display area illustrates a relation between a window A, displayed on the image displaying apparatus 110 by changing a display attribute of the window A, and input synchronization signals. In general, in an image signal output by the information processing apparatus 100, an image display is started at a point lagging the trailing edges of a horizontal synchronization-signal pulse and a vertical synchronization-signal pulse by predetermined periods of time known as back-porch periods. In the case of the example shown in the figure, the start point lags the trailing edges of a horizontal synchronization-signal pulse and a vertical synchronization-signal pulse by periods THFP and TVFP, respectively. The display periods, that is, THD and TVD shown in the figure, are determined by the display resolution.

In the case of an image signal conforming to VGA (Video Graphic Adapter) standards, for example, the horizontal width is 640 dots and the vertical height is 480 lines. Therefore, the maximum values on the coordinate axes (X, Y) of the display screen shown in FIG. 9 are (640 dots, 480 lines), where one dot is the period of the clock signal (that is, the so-called "dot clock"), used in the information processing apparatus 100 for generating the image signal.

It is thus clear from the above description that, in order to obtain accurate information on the start position (x0, y0) and the end position (x1, y1) of the rectangular window A in the image displaying apparatus 110, it is necessary for the information processing apparatus 100 to transfer at least information on the horizontal and vertical back-porch periods, information on the display resolution, the frequency of the period of the dot clock, and coordinates of the start and end positions of the window, to the image displaying apparatus 110.

So far, transmission of absolute area information of the rectangular window A has been described. Similarly, the position of the window A can also be specified by the start position (x0, y0), the number of dots in the window period in the horizontal direction, and the number of lines in the window period in the vertical direction.

As another alternative, the area information of the window can also be specified by taking the intersection of lines passing through the trailing edges of the horizontal synchronization-signal pulse and the vertical synchronization-signal pulse as a reference origin (0, 0) of a two-dimensional X-Y coordinate system. Then, the start position of the window A can be expressed in terms of dots and lines from the origin (0, 0) to the start position. Other information can then be specified in the same way.

Instead of expressing information in terms of dots and lines as described above, ratios with respect to one horizontal scanning period and one vertical scanning period can also be used. For example, the width of the window can be expressed by a range from a start position corresponding to x1% of one horizontal scanning period to an end point corresponding to x2% of one horizontal scanning period, with the trailing period of the horizontal synchronization-signal pulse taken as a reference. Similarly, the height of the window can be expressed by a range from a start position corresponding to y1% of one vertical scanning period to an end point corresponding to y2% of one vertical scanning period, with the trailing period of the vertical synchronization-signal pulse taken as a reference. By expressing area information on the window in terms of ratios with respect to one horizontal scanning period and one vertical scanning period, it becomes no longer necessary in particular to know information on the frequency or the period of the dot clock in the image displaying apparatus 110.

FIG. 9 is a diagram showing window-area information used for locating a single display area, a display attribute of which is to be modified. It should be noted, however, that display attributes of a plurality of windows can also be modified.

Figure 10:
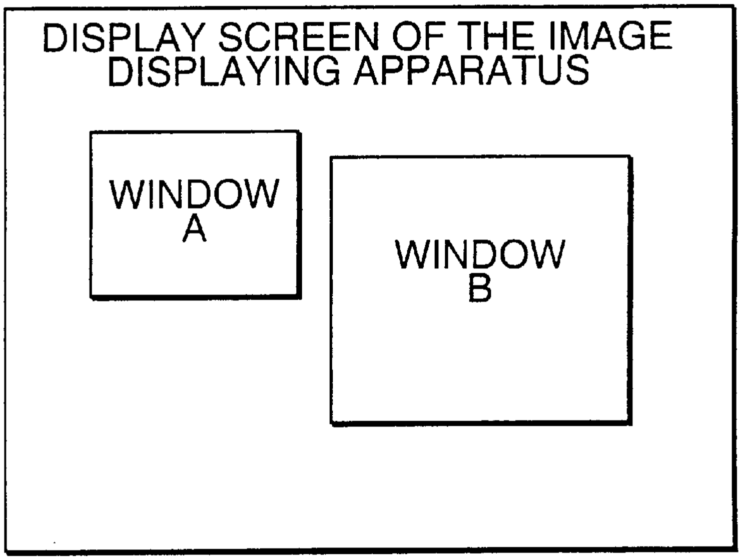
FIG. 10 is a diagram schematically showing area information of a plurality of display areas in the first embodiment.

FIG. 10 is a diagram showing typical area information of a plurality of display areas in the present embodiment. As shown in the figure, the area information of a plurality of display areas is used to illustrate an example of changing the display attributes of windows A and B which do not overlap each other. In this case, by transfer-ring area information of the window B to the image displaying apparatus 110 in addition to the area information of the window A shown in FIG. 9, display attributes of both display areas can be modified.

In this way, with regard to area information of a plurality of windows which do not overlap each other in the image displaying system implemented by the present embodiment, area information of the additional windows is just prescribed. To be more specific, by merely providing the image displaying apparatus 110 with as many pieces of area information as there are windows that require a change in display attribute, display attributes of a plurality of windows can be modified.

Figure 11:
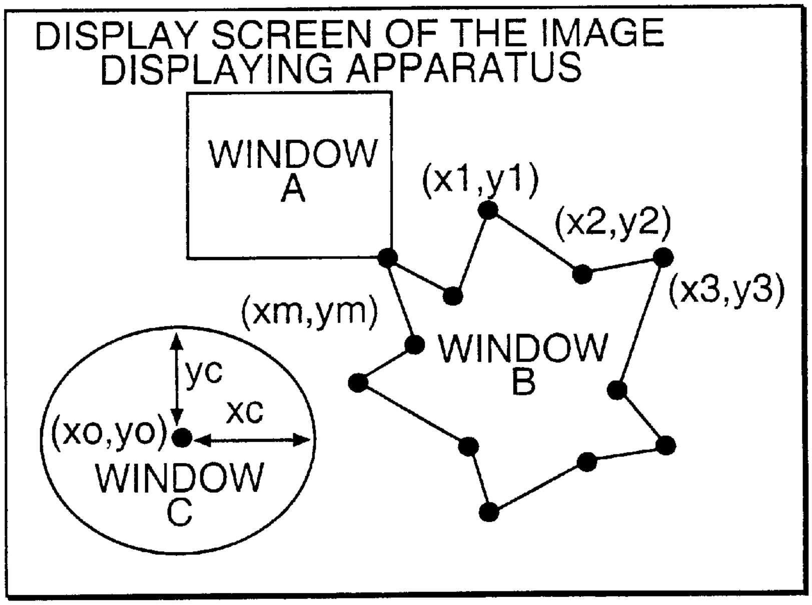
FIG. 11 is a diagram schematically showing preferred area information of an area having a shape other than a rectangle in the first embodiment.

FIG. 11 is a diagram showing typical area information of an area having a shape other than a rectangle in the present embodiment. As shown in the figure, the area information of an area having a shape other than a rectangle is used to illustrate how to prescribe area information when changing the display attribute of a window area having a such a shape. The area information in this case is described as follows.

First, information on salient points of the polygonal area like a window B is prescribed. More specifically, coordinates of the n salient points of an n-angle polygon are prescribed. That is to say, in the case of the window B shown in the figure, the information on the salient points of the polygonal area is constituted by coordinates (x1, y1), (x2, y2), ---, (xm, ym), for m points.

In the case of an ellipse or an elliptical area like a window C, information on the coordinates of its center (x0, y0), the horizontal-direction radius xc, and the vertical-direction radius yc is prescribed. In addition, shape information which indicates what shape the area information is associated with is also prescribed prior to the prescription of the area information.

Figure 12:
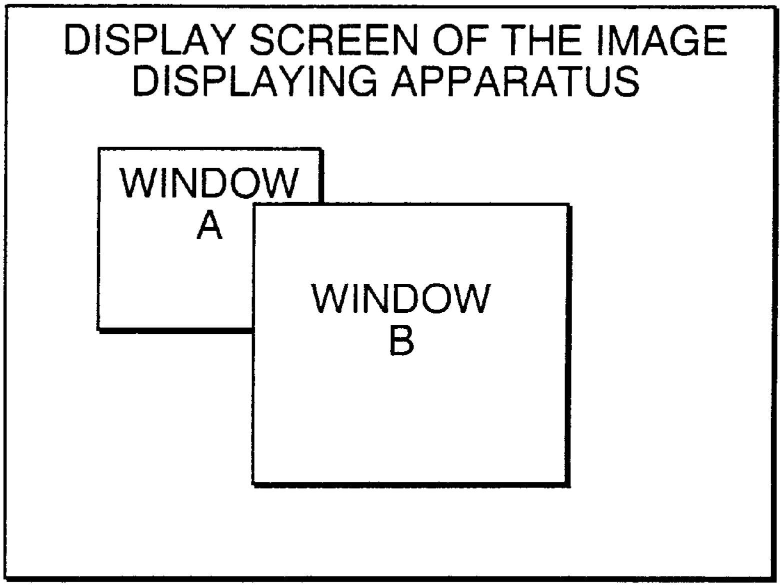
FIGS. 12(*a*) and 12(*b*) are diagrams schematically showing typical area information of a plurality of display areas which overlap each other in the first embodiment.
Figure 12:
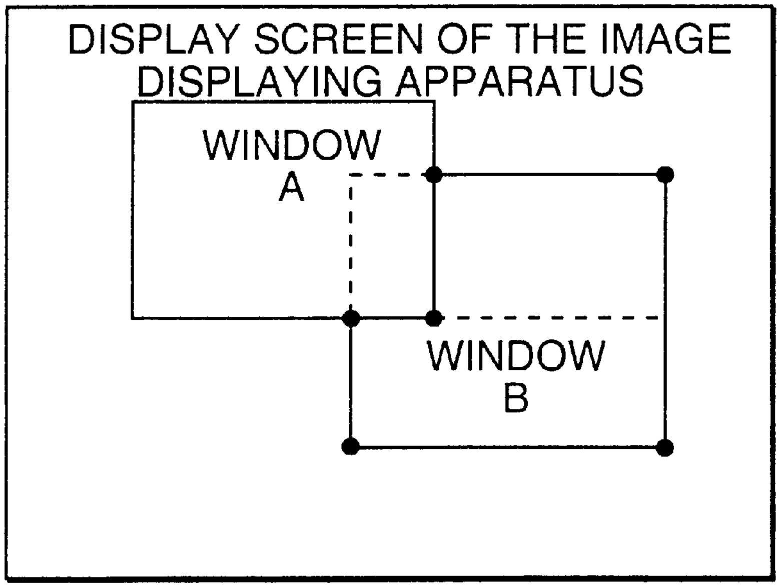

FIG. 12 is a diagram that shows typical area information of a plurality of display areas which overlap each other in the present embodiment. As shown in the figure, the area information of a plurality of display areas is used to illustrate how to change the display attributes of a plurality of windows which overlap each other. As will be described later, it is possible to change the display attributes of a plurality of windows which overlap each other.

FIG. 12(*a*) is a diagram showing a case in which a window B is displayed at a position closer to the viewer than a window A. FIG. 12(*b*) is a diagram showing a case in which a portion of the window B is concealed behind the window A. For the sake of simplifying the explanation, the following describes a problem of how to properly display the window B on a screen with a display attribute thereof changed to one different from that of the corresponding display attribute of the window A, which is assumed to be a window with ordinary display attributes.

In the case of the windows A and B shown in FIG. 12(*a*), the processing described earlier for the rectangular window can be applied since the entire information of the window B is visible. In the case of the windows A and B shown in FIG. 12(*b*), on the other hand, the window B can be displayed properly by treating information on the display area of the window B as information on a polygonal shape (FIG. 11) or by dividing the display area of the window B into a plurality of rectangular shapes.

When prescribing the area information as polygonal information, coordinate information of each of the black circles shown in FIG. 12(*b*) is generated. When prescribing the area information as information on a plurality of rectangular windows, on the other hand, area information is generated by dividing the visible display area of the window B typically into an upper rectangular window sub-area and a lower rectangular window sub-area as shown in FIG. 12(*b*). It should be noted that such division is no more than an example. The visible display area of the window B can be divided in other ways.

If the window A shown in FIG. 12(*a*) is also a window with a display attribute thereof to be changed as is the case with the window B, the window A can be displayed properly by prescribing information on the display area of the window A as a partially concealed area in the same way as the window B shown in FIG. 12(*b*) is treated. As an alternative to the techniques to treat a display area as a partially concealed area, information on a relation between a concealed sub-area and a concealing sub-area on the display screen of the image displaying apparatus 110 can further be added to the area information of each window, to form three-dimensional area information for each window. That is to say, Z-axis information in a direction perpendicular to the two-dimensional X-Y coordinate system of the area information described so far is added to make area information of each window three dimensional.

When three-dimensional area information is received by the image displaying apparatus 110, the specific-area-display-attribute changing means 113 employed in the image displaying apparatus 110 identifies a relation among concealed and concealing windows, changing the display attribute of the area of the window at the uppermost layer.

The following is a description of various kinds of information transferred from the information processing apparatus 100 to the image displaying apparatus 110 in the image displaying system implemented by the present embodiment.

TABLE 1

| | Contents |
|---|---|
| Image-signal information | Video dot clock frequency<br>Total number of horizontally arranged dots<br>Total number of vertically arranged lines (dots)<br>Number of dots in a horizontal back-porch period<br>Number of dots in a vertical back-porch period<br>Number of horizontal-display dots<br>Number of vertical-display lines |

TABLE 2

| | Contents |
|---|---|
| Area information and its level | Level 0: No window<br>Level 1: A single rectangular window<br>Window start-position information (x0, y0) and window end-position information (x1, y1)<br>Level 2: A plurality of pieces of Level-1 information<br>Number of display windows: n<br>Start-position information (x0, y0) and end-position information (x1, y1) of window W1<br>Start-position information (x0, y0) and end-position information (x1, y1) of window W2<br>.<br>.<br>.<br>Start-position information (x0, y0) and end-position information (x1, y1) of window Wn<br>Level 3: A single deformed-shape window<br>Circular window information m = 2<br>Circle-center information = (x0, y0)<br>X-axis and Y-axis radii = (xc, yc)<br>Polygonal-shape information ≧ 3 (m is the number of salient points)<br>Information on salient points<br>(x1, y1) . . . (xm, ym)<br>Level 4: A plurality of deformed windows<br>The number of display windows: n<br>Window number (Number of salient points, x-y coordinates)<br>W1 (Number of points: m, (x0, y0), (x1, y1), . . . (xm, ym))<br>W2 (Number of points: m, (x0, y0), (x1, y1), . . . (xm, ym))<br>.<br>.<br>.<br>Wn (Number of points: m, (x0, y0), (x1, y1), . . . (xm, ym))<br>Level 5:<br>Three-dimensional version of Level 1<br>(x0, y0, z0), (x1, y1, z1)<br>Level 6:<br>Three-dimensional version of Level 2<br>Level 7:<br>Three-dimensional version of Level 3 |

TABLE 3

| | Contents |
|---|---|
| Attribute Information | Relevant-level switching<br>Display attribute change control on/off<br>Entire screen attribute change/window attribute change switching<br>Entire screen contrast control<br>Number of controlled-contrast windows<br>Specification of the numbers of windows to be controlled<br>Window portion contrast control<br>Entire screen brightness control<br>Window portion brightness control<br>ABL control system switch<br>ABL control level specification<br>Entire screen chromaticity control<br>Window portion chromaticity control<br>Window portion R/G/B gain control<br>Entire screen γ value setting<br>Window portion γ value setting<br>Display attribute change portion edge trimming on/off<br>Edge trimming color setting<br>Display attribute change portion enlargement/shrinking |

Table 1 is a table of typical image signal information transferred to the image displaying apparatus 110 for modifying display attributes prior to the area information. Table 2 is a table of typical area information required for modifying display attributes. Relevant tables shown in Table 2 are parameters each indicating the number, the shape and the overlapping state of a window. For example, Level 1 shown in the table represents area information of a single rectangular window indicating the start and end points of the window. Level 2 in the same table indicates a plurality of pieces of Level-1 information.

Table 3 is a table of typical attribute information transferred from the information processing apparatus 100 to the image displaying apparatus 110 after area information. The table includes information on display attributes such as contrast and brightness of a specific area specified by area information transferred from the information processing apparatus 100 to the image displaying apparatus 110 prior to the attribute information.

The "relevant-level switching" shown in Table 3 is switching information for determining what level an image is to be displayed by the image displaying apparatus 110 whenever a level shown in Table 2 is applicable. The "display attribute change control on/off" is information on whether or not the display attribute change control is allowed in the image displaying apparatus 110.

The "entire screen attribute change/window attribute change switching" is switching information for determining whether the display attribute of the entire display screen appearing on the image displaying apparatus 110 or the display attribute of only an area indicated by the area information is to be changed. Using this information, either the display attribute of the entire display screen appearing on the image displaying apparatus 110 or the display attribute of only an area indicated by the area information is changed.

The "entire screen contrast control" is control information for controlling the contrast of the entire display screen of the image displaying apparatus 110. The "number of controlled-contrast windows" is information on how many display areas indicated by area information will be subject to contrast control.

The "specification of the numbers of windows to be controlled" is numbers assigned to display areas (windows) which have changeable attribute information in case there are a plurality of such display areas. The "specification of the numbers of windows to be controlled" is thus specification information for clarifying objects to be controlled. The "window portion contrast control" is contrast control information of a specified display area.

The "entire screen brightness control" is the brightness control information for the entire screen, while the "window portion brightness control" is the brightness control information for a specified display area.

The "ABL (Average Brightness Level) control system switching" is switching information for selecting whether the average luminance of the entire display screen or the average luminance of display areas except a specific display area is to be made fixed. The "ABL control level specification" is information for specifying a maximum luminance level of a portion subject to luminance control by a selected ABL control system. A "maximum luminance level" is a level at which the beam current is suppressed so as not to exceed a specification value of the CRT display unit 322.

The "entire screen chromaticity control" is information on setting the chromaticity (a white color containing some red or blue color) of a white-color display of the entire screen. The "window portion chromaticity control" is information on setting the chromaticity of a specific display area.

The "window portion R/G/B gain control" is video gain control information of RGB colors of a specific display area. The "entire screen r value setting" is information for correcting the γ characteristics (the video voltage amplitude and display luminance characteristics) of the entire display screen, while the "window portion γ value setting" is information for correcting the γ characteristics of a characteristic area.

The "display attribute change portion edge trimming on/off" is switching information for determining whether or not edge trimming is to be carried out for a specific area, the display attribute of which is to be changed. The "edge trimming color setting" is information which is used for setting an edge-trimming color when the edge trimming described above is carried out. The "display attribute change portion enlargement/shrinking" is control information on whether a portion with a display attribute thereof changed is to be enlarged or shrunk.

It should be noted that the pieces of control information shown in Table 3 do not have to be all transferred to the image displaying apparatus 110. That is to say, only required pieces of control information are transferred from the information processing apparatus 100 to the image displaying apparatus 110.

In addition, in the image displaying system implemented by the present embodiment, a display attribute can be set for a three-dimensional display area and a display area having any arbitrary shape such as a cursor, as follows.

Figure 13:
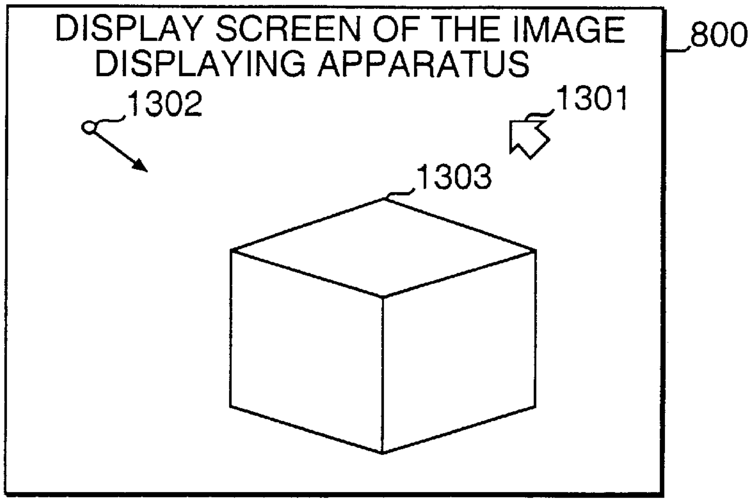
FIG. 13 is a diagram schematically showing graphical information of a three-dimensional display area, and display areas each having any arbitrary shape in the first embodiment.

FIG. 13 is a diagram showing, graphical information of display areas having various, arbitrary shapes, including one display area having a three-dimensional shape, in the present embodiment. As shown in the figure, the graphical information is constituted by a cube 1303 that reflects light emitted by both an arrow-shaped cursor 1301 and a light source 1302. When changing a display attribute of a display area having an arbitrary shape such as the cursor 1301, area information comprising a bit pattern showing the shape thereof and a start address are generated.

In the case of the cube 1303, the display attributes vary from plane to plane. In addition, if the display attributes of even the same plane of the cube 1303 vary in dependence upon the distance to the light source 1302, area-attribute information 250 can be generated by setting not only the area information for each plane of the cube 1303, but also by setting the display attributes of each plane which vary depending upon the coordinates of the position on the plane.

It should be noted that the area-attribute information 250 of an arbitrary shape such as the cursor 1301 and of a three-dimensional shape such as the cube 1303 can be expressed by developing attribute information for each picture element of display data stored in the display memory unit 106, as will be described later.

The following is a description of segments of the processing carried out by the application program 200 and the operating system 210 in the image displaying system implemented by the present embodiment, when a display attribute of a specific area is changed.

Figure 14:
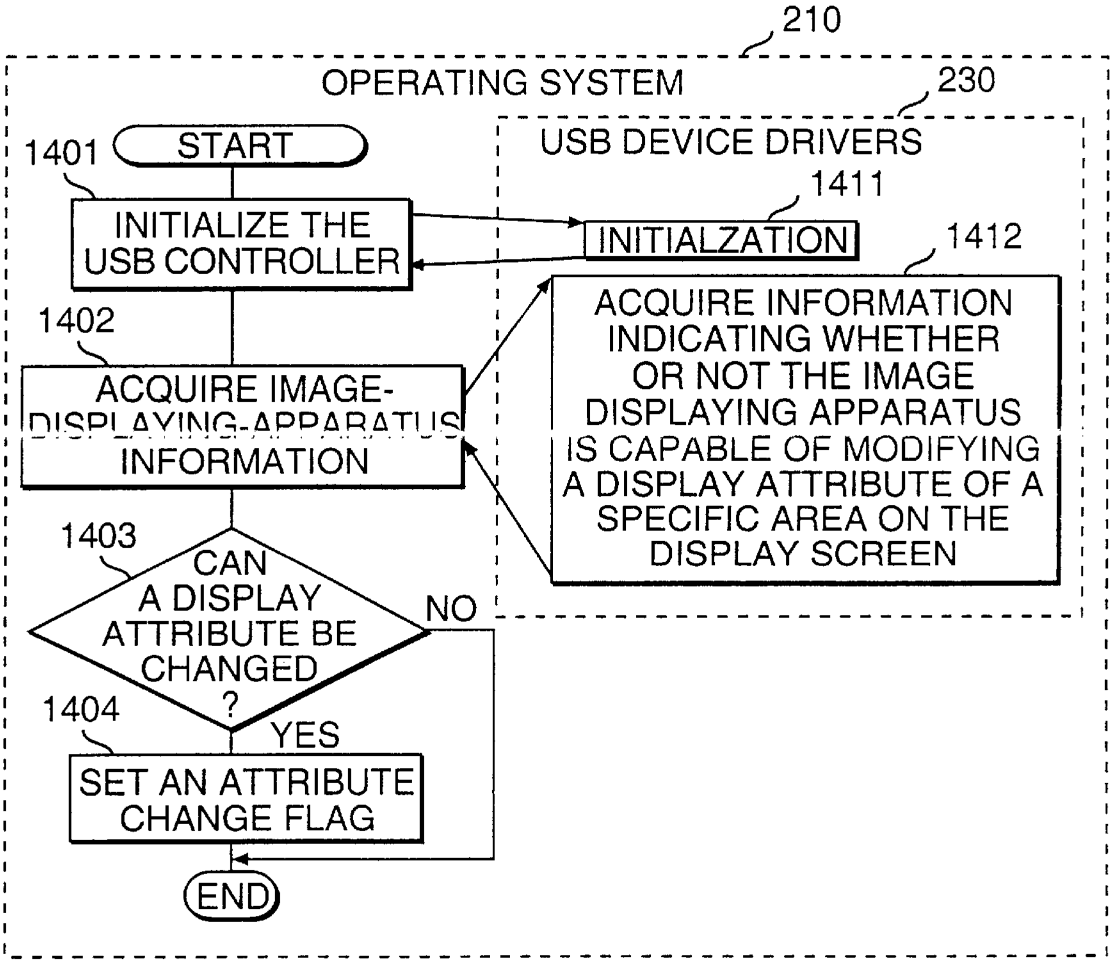
FIG. 14 is a flowchart showing a procedure of initialization processing carried out by the operating system in the first embodiment.

FIG. 14 is a flowchart showing a procedure of initialization processing carried out by the operating system 210 in the present embodiment. The initialization processing carried out by the operating system 210 is preparatory to modifying a display attribute carried out by the operating system 210, as shown in the figure. The initialization begins with a step 1401 at which the power supply of the information processing apparatus 100 is turned on. As the power supply is turned on, in processing carried out at a step 1411, the USB device driver 230 initializes the USB controller 107.

The flow then proceeds to a step 1402 at which the display-attribute-change control means 211 of the operating system 210 makes an inquiry to the image displaying apparatus through the USB driver 230, into the ability of the image displaying apparatus 110 to modify a display attribute. The inquiry concerns, among other things, whether a specific-area-display-attribute changing means 113 is provided in the image displaying apparatus 110, so as to display an image in a specific area on the display screen by modifying a display attribute of the specific area.

Receiving the inquiry, the USB driver 230 creates a packet containing the inquiry, and sends the inquiry packet to the image displaying apparatus 110 by way of the USB controller 107 as an inquiry signal in processing carried out at a step 1412.

The image displaying apparatus 110 receives the inquiry signal transmitted by the information processing apparatus 100 by way of the USB controller 115, creating a packet containing image-displaying-apparatus information 261 to indicate that a specific-area-display-attribute changing means 113 is provided in the image displaying apparatus 110. The packet is sent to the information processing apparatus 100 by way of the USB controller 115 as a report signal in response to the inquiry packet.

The information processing apparatus 100 receives the report signal transmitted by the image displaying apparatus 110, which report signal indicates whether a specific-area-display-attribute changing means 113 is provided in the image displaying apparatus 110, by way of the USB controller 107. In the processing carried out at the step 1412, the USB device driver 230 of the information processing apparatus 100 receives the image-displaying-apparatus information 261 transmitted by the image displaying apparatus 110 by way of the USB controller 107, passing on the image-displaying-apparatus information 261 to the display-attribute-change control means 211 as image-displaying-apparatus information 262.

In processing carried out at a step 1403, the display-attribute-change control means 211 references the image-displaying-apparatus information 262 received in the processing carried out at the step 1402 to find out whether or not the image displaying apparatus 110 is capable of modifying a display attribute of a specific area on its display screen. If the image displaying apparatus 110 is found to have such a capability, the flow goes on to a step 1404 at which an attribute change flag is set to indicate that a display attribute of a specific area on the display screen of the image displaying apparatus 110 can be changed.

If, on the other hand, the result of the examination of the image displaying-apparatus information 262 carried out in the processing of the step 1403 indicates that the image displaying apparatus 110 is not capable of modifying a display attribute of a specific area on its display screen, or if no image-displaying-apparatus information 262 is transmitted from the image displaying apparatus 110, a display attribute of a specific area is considered to be unchangeable and the initialization processing is ended without setting the attribute change flag cited above.

An example of the image-displaying-apparatus information 260 acquired in the processing carried out at the step 1402 is shown in Table 4.

| | Contents |
|---|---|
| Information on the image displaying apparatus (Initial values) | Relevant level<br>Peak luminance<br>Average luminance<br>Window-controllable items<br>(Contrast, brightness, ABL, chromaticity, γ, RGB level)<br>Standard set value (entire screen)<br>Standard set value (window)<br>Recommended display resolution<br>Input video signal amplitude |

The "relevant level" in Table 4 is the level shown in Table 2 that is associated with information required for modifying display attributes. The "peak luminance" is the maximum luminance level that can be displayed on the image displaying apparatus 110. The "average luminance" is the luminance level of a white display on the entire display screen of the image displaying apparatus 110.

The "window-controllable item" is a changeable item of the attribute information shown in Table 3. Examples of a window-controllable item are the contrast indicating the amplitude level of an image signal, the brightness indicating the direct-current level of an image signal, the ABL (Average Brightness Level) indicating the average value of the current waveform of an electron gun limited by a limiter, the chromaticity, the γ characteristic, and the RGB level, to name a few. These window-controllable items are all controllable.

The "standard set values (entire screen)" are default values of controllable items for the entire screen shown in Table 3. The "standard set values (window)" are default values of controllable items for a specific area shown in Table 3.

The "recommended display resolution" is a recommended display resolution that allows a display attribute to be changed effectively. An example of the recommended display resolution is 1,024 dots×768 lines. The "input video signal amplitude" is the amplitude of the input video signal that allows a display attribute to be changed effectively. An example of the input video signal amplitude is 0.7 V.

The following is description of processing carried out by the application program 200 to modify a display attribute so as to reproduce dynamic-image data at a high contrast, in a case in which the image displaying apparatus 110 is determined to be an apparatus capable of modifying a display attribute of a specific area on a display screen thereof.

Figure 15:
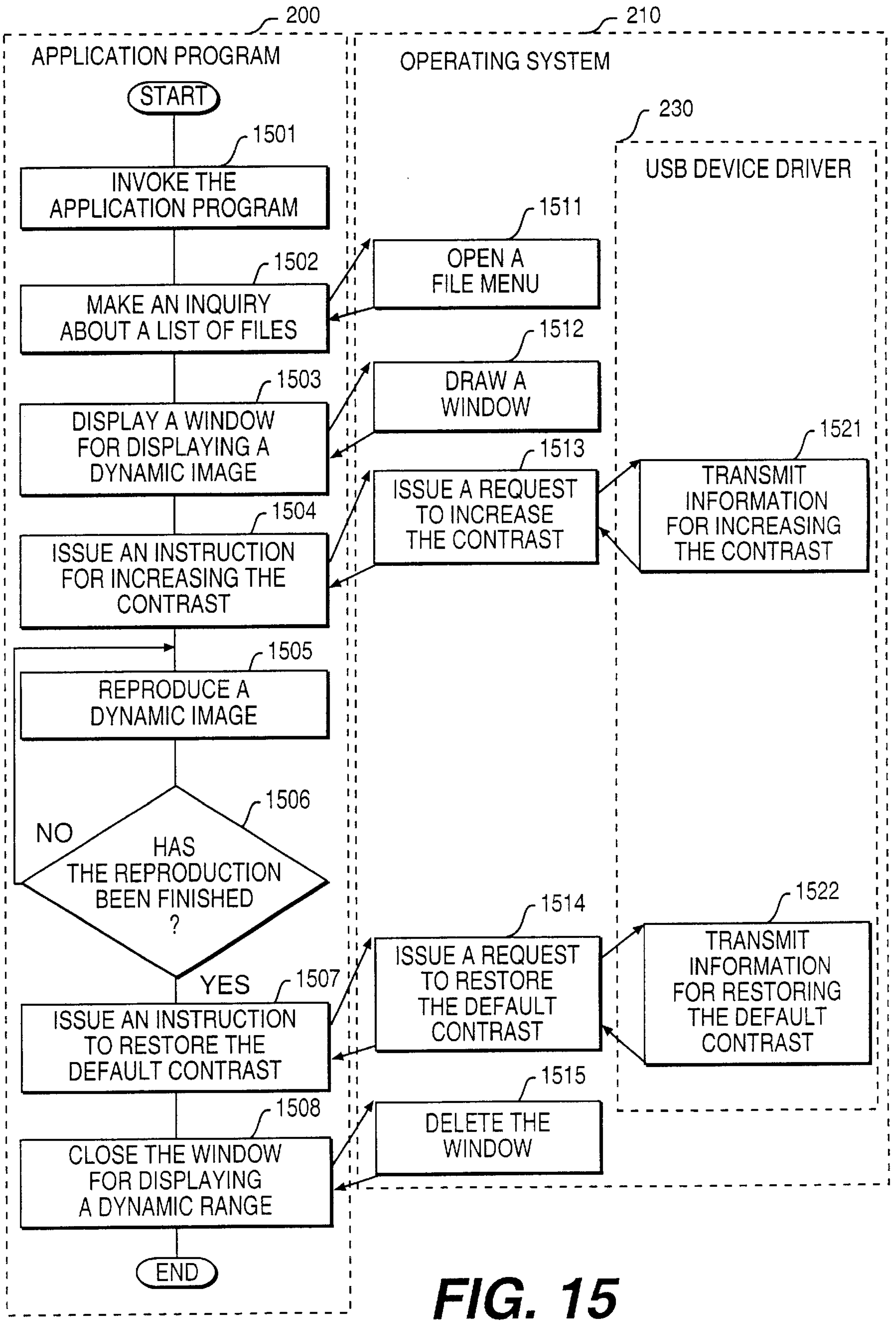
FIG. 15 is a flowchart showing a procedure carried out by the application program to modify a display attribute in the first embodiment.

FIG. 15 is a flowchart showing a processing procedure carried out by the application program 200 to modify a display attribute in the present embodiment. The procedure is a series of operations which are carried out by the application program 200 to modify a display attribute so as to display a window for reproducing dynamic-image data at a high contrast, as shown in the figure.

The flowchart begins with a step 1501 at which the user invokes the application program 200 for reproducing dynamic-image data. The flow then goes on to a step 1502 at which the application program 200 makes an inquiry about a list of files in a storage (such as the DVD 104) for storing dynamic-image data to the operating system 210.

In response to the inquiry, the operating system 210 references files on the DVD 104 through a file system driver and a DVD interface in order to open a file menu in processing carried out at a step 1511.

As the list of files storing dynamic-image data is displayed, the user selects a file storing dynamic-image data from the list of files which are displayed in response to the inquiry made in the processing carried out at the step 1502.

The flow then goes on to a step 1503 at which the application program 200 issues a draw instruction to the operating system 210, to display a window for displaying a dynamic image corresponding to the selected dynamic-image data. At the request made by the application program 200, the operating system 210 requests the image displaying device driver 240 to display the window for displaying the dynamic image by using area information specified in the draw instruction in processing carried out at a step 1512. As a result, the window for displaying the dynamic image is displayed on the image displaying apparatus 110 by way of the display controller 105.

The flow then proceeds to a step 1504 at which the area-attribute-information generating means 201 of the application program 200 issues a contrast-increasing instruction to the operating system 210, requesting the operating system 210 to increase the contrast of the window in which the dynamic image is to be displayed. More specifically, the area-attribute-information generating means 201 transfers, to the image displaying apparatus 110 via the operating system 210, the area-attribute information 250 comprising area information specified when displaying the window for displaying the dynamic image and attribute information showing a contrast value of the dynamic data specified in advance as a run-time parameter, in order to increase the contrast of the window in which the dynamic image is to be displayed.

At a step 1513, the display-attribute-change control means 211 of the operating system 210 receives the contrast-increasing instruction from the application program 200 by way of the area-attribute-information acquiring means 213. Receiving the instruction, the area-attribute-information acquiring means 213 references the attribute change flag set at initialization and, if the image displaying apparatus 110 is capable of changing a display attribute of a specific area on its display screen, area-attribute information 251 is supplied to the USB device driver 230, making a request to increase the contrast of the window in which the dynamic image is to be displayed.

At the request described above, the USB device driver 230 assembles an instruction packet containing the area-attribute information 251 to increase the contrast of the window in which the dynamic image is to be displayed, in conformity with a USB protocol, sending the packet to the USB controller 107 at a step 1521.

The USB controller 107 converts the instruction packet supplied thereto into an electrical signal and outputs the electrical signal conveying the area-attribute information 252 to the image displaying apparatus 110 connected to the USB controller 107. The image displaying apparatus 110 receives the instruction packet through the USB controller 115, extracting area information and contrast information from the area-attribute information 252. The contrast of the specified window containing the dynamic image is then changed accordingly.

The flow then continues to processing of a step 1505 at which the application program 200 reads out dynamic-image data from the selected dynamic-image file through the file system driver and the DVD interface, transferring the dynamic-image data to the main memory unit 102. The dynamic-image data transferred to the main memory unit 102 is then sent to the image displaying apparatus 110 by way of the image displaying device driver 240 and the device controller 105 to be reproduced on the specified window, the display attribute of which has been changed to a high contrast value for dynamic-image data.

The flow then goes on to a step 1506 at which the application program 200 examines whether the dynamic-image data have all been reproduced. If any dynamic-image data remains to be reproduced, the flow returns to step 1505. If the dynamic-image data have all been reproduced, on the other hand, the flow proceeds to a step 1507.

At the step 1507, the area-attribute-information generating means 201 of the application program 200 generates area-attribute information 250 for returning to the default value the display attribute of the window containing the dynamic image, issuing a default-contrast restoring instruction to the operating system 210.

At a step 1514, the display-attribute-change control means 211 of the operating system 210 receives the default-contrast restoring instruction from the application program 200 by way of the area-attribute-information acquiring means 213. Receiving the instruction, area-attribute information 251 for restoring the display attribute to the default contrast is supplied to the USB device driver 230, making a request to the USB device driver 230 to carry out restoration of the display attribute to the default value (that is, to restore the display attribute of the window containing the dynamic image to the default contrast).

At the request described above, the USB device driver 230 assembles an instruction packet containing the area-attribute information 251 to restore the display attribute of the window having the dynamic image to the default contrast in conformity with the USB protocol, sending the instruction packet to the USB controller 107 in order to restore the contrast of the specified window to the default value at a step 1522.

The flow then goes on to a step 1508 at which the application program 200 sends an instruction to the operating system 210 to close the window displaying the dynamic image. Receiving the instruction, the operating system 210 deletes the window displaying the dynamic image at a step 1515. As the window for displaying a dynamic image is deleted, the application program 200 terminates the processing to reproduce the dynamic-image data.

As described above, the attribute information showing the contrast value of the dynamic-image data is set in advance as a run-time parameter of the application program 200. It should be noted that the attribute information can also be stored in the DVD 104 for storing data to be displayed along with the data to be displayed, such as the dynamic-image data. In this case, in an operation to display such data, the attribute information which is stored along with the data to be displayed is read out from the storage and used for modifying the display attribute of the specific area on the display screen of the image displaying apparatus 110.

Figure 16:
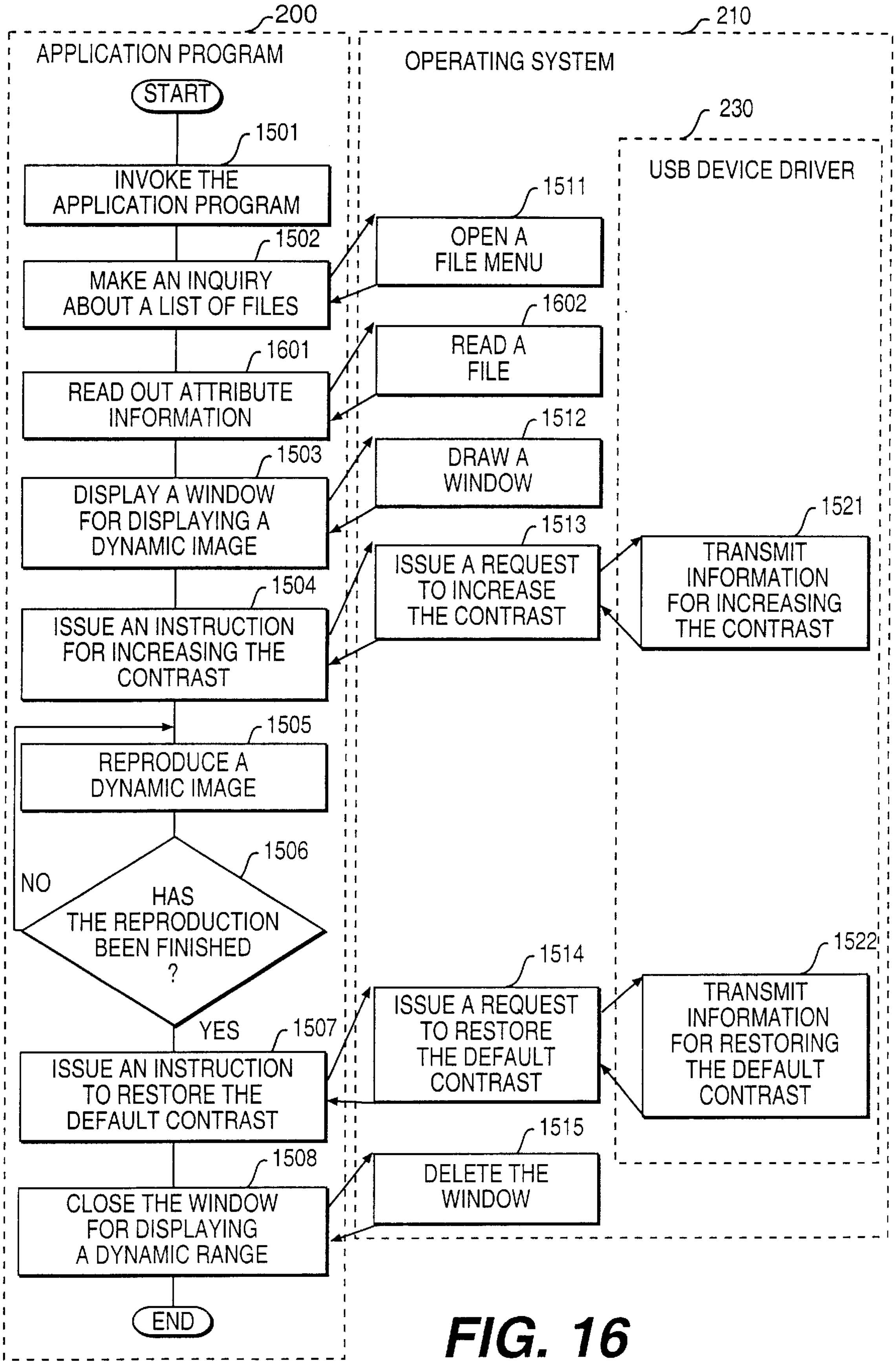
FIG. 16 is a flowchart showing a procedure carried out in the first embodiment to change a display attribute using attribute information stored along with dynamic-image data.

FIG. 16 is a flowchart showing the processing procedure carried out in the present embodiment to change a display attribute using attribute information stored along with dynamic-image data. The procedure is a series of operations carried out by the application program 200 for changing the display attribute so as to set a window for displaying a dynamic image corresponding to dynamic-image data at a high contrast, to reproduce the dynamic-image data as shown in the figure.

The procedure begins with a step 1501 at which the user invokes the application program 200. The flow then goes on to a step 1502 at which the application program 200 makes an inquiry to the operating system 210 about a list of files in a storage such as the DVD 104, which contain dynamic-image data.

In response to the inquiry, the operating system 210 references files on the DVD 104 through a file system driver and a DVD interface in order to open a menu, at a step 1511.

As the list of files containing dynamic-image data are displayed, the user selects one of the files from the list.

After a file for storing dynamic-image data has been selected, the flow goes on to a step 1601 at which the application program 200 makes a file-read request to the operating system 210, requesting the operating system 210 to read out a contrast value, the attribute information of the dynamic-image data in the selected file.

At the request described above, the flow goes on to a step 1602 at which the operating system 210 reads out a contrast value, the attribute information set in advance in the selected file for storing the desired dynamic-image data, and passes the contrast value to the application program 200.

The flow then goes on to a step 1503 at which the application program 200 issues a draw instruction to the operating system 210 to display a window for displaying a dynamic image corresponding to the selected dynamic-image data. At the request made by the application program 200, the operating system 210 requests the image displaying device driver 240 to display the window by using area information specified in the draw instruction at a step 1512. As a result, the window for displaying the dynamic image is displayed on the image displaying apparatus 110 by way of the display controller 105.

The flow then proceeds to a step 1504 at which the area-attribute-information generating means 201 of the application program 200 issues a contrast-increasing instruction to the operating system 210, requesting the operating system 210 to increase the contrast of the window in which the dynamic image is to be displayed. More specifically, the area-attribute-information generating means 201 transfers area-attribute information 250 comprising area information specified when displaying the window, and attribute information showing a contrast value of the dynamic data specified in advance as a run-time parameter, to the image displaying apparatus 110 through the operating system 210, in order to increase the contrast of the window in which the dynamic image is to be displayed.

At a step 1513, the display-attribute-change control means 211 of the operating system 210 receives the contrast increasing instruction from the application program 200 by way of the area-attribute-information acquiring means 213. Receiving the instruction, the area-attribute-information acquiring means 213 references the attribute change flag set at initialization and, if the image displaying apparatus 110 is an apparatus capable of changing a display attribute of a specific area on a display screen thereof, area-attribute information 251 is supplied to the USB device driver 230, making a request to increase the contrast of the specified window.

At the request described above, the USB device driver 230 assembles an instruction packet containing the area-attribute information 251 to increase the contrast of the window in conformity with a USB protocol, sending the packet to the USB controller 107 in processing carried out at a step 1521.

The USB controller 107 converts the instruction packet supplied thereto into an electrical signal and outputs the electrical signal conveying area-attribute information 252 to the image displaying apparatus 110 connected to the USB controller 107. The image displaying apparatus 110 receives the instruction packet through the USB controller 115, extracting area information and contrast information from the area-attribute information 252. The contrast of the specified window is then changed accordingly.

At the subsequent steps, the application program 200 reproduces the dynamic-image data stored in the selected file on the dynamic-data window, the display attribute of which has been changed to a high contrast value for dynamic-image data, in the same way as the processing described by referring to FIG. 15.

Figure 17:
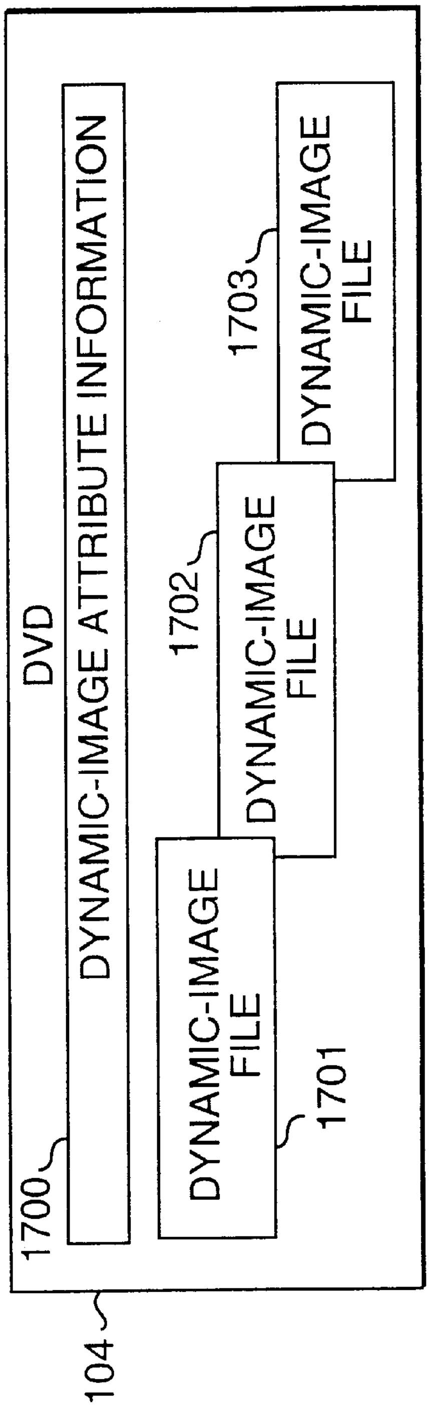
FIGS. 17(*a*) to 17(*c*) are diagrams showing examples of storage media each for storing dynamic-image attribute information along with dynamic-image files in the first embodiment.
Figure 17:
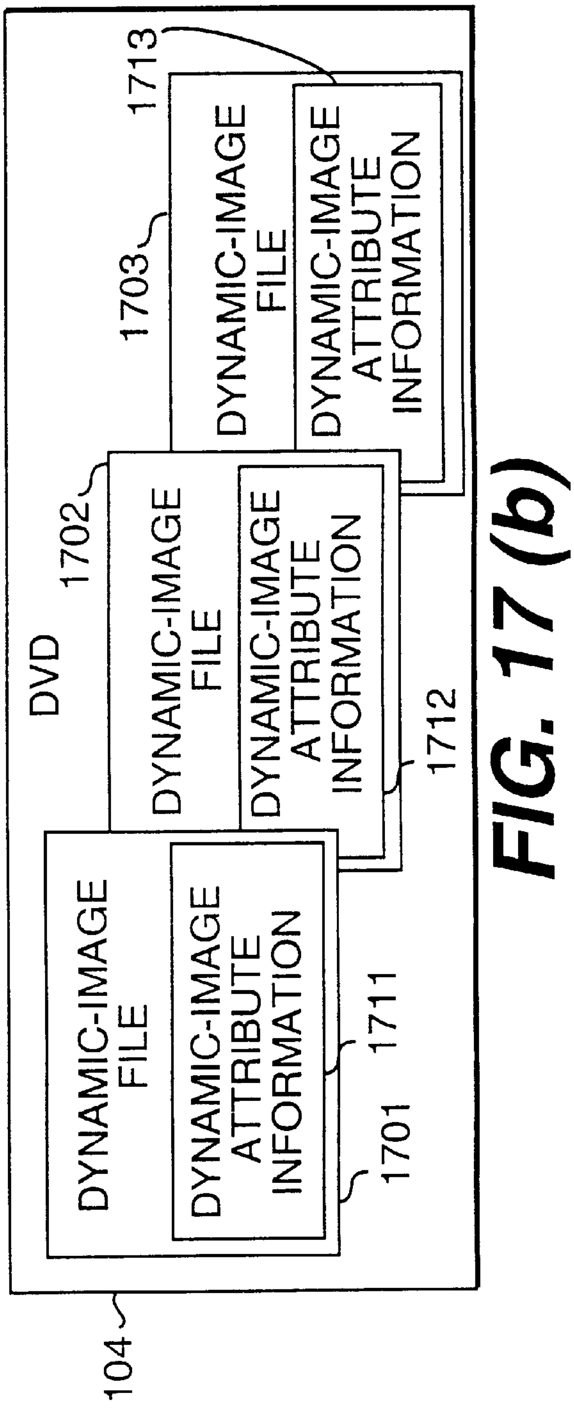
Figure 17:
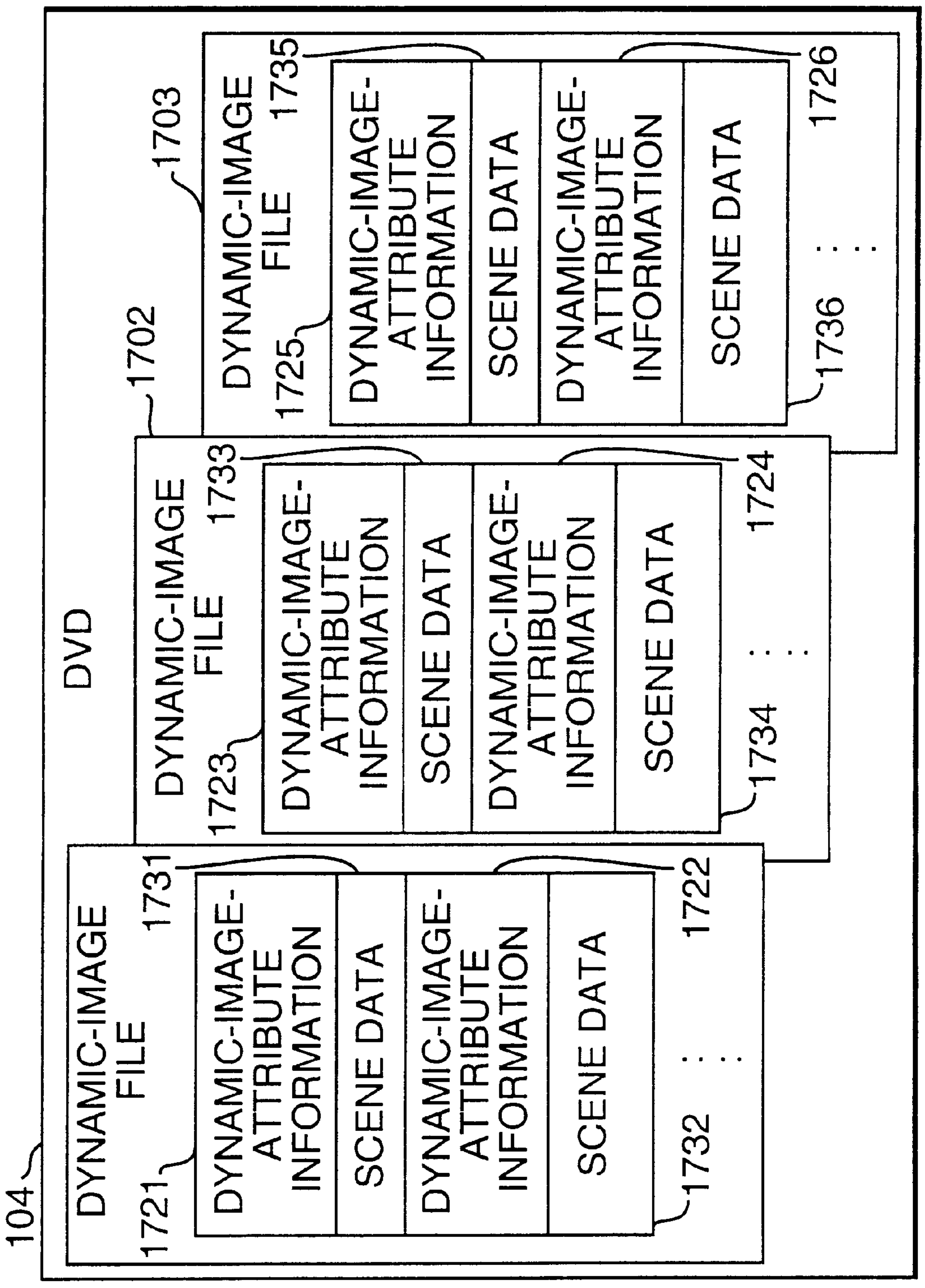

FIGS. 17(*a*)–17(*c*) show examples of storage media each for storing dynamic-image attribute information along with dynamic-image files in the present embodiment. Each of FIGS. 17(*a*)–17(*c*) show the DVD 104 for storing dynamic-image attribute information along with dynamic-image files, wherein a plurality of dynamic-image files 1701 to 1703 for storing dynamic data are stored along with attribute information for the dynamic-image data contained in the dynamic-image files 1701 to 1703.

The attribute information stored in the storage medium along with data to be displayed can be dynamic-image attribute information 1700 common to the dynamic-image files 1701 to 1703 as shown in FIG. 17(*a*), or pieces of dynamic-image attribute information 1711 to 1713 included in the dynamic-image files 1701 to 1703, respectively, which are created for different titles of dynamic-image data as shown in FIG. 17(*b*).

The attribute information can be stored in the storage medium as a file, or simply recorded in the storage medium as numbers.

As an alternative, the pieces of dynamic-image data 1701 to 1703 are stored in the storage medium as scene data 1731 to 1736, specific units, as shown in FIG. 17(*c*). Pieces of dynamic-image attribute information 1721 and 1726 are then set for the pieces of scene data 1731 to 1736, respectively. In this case, when the scene data is reproduced, the display attribute of the scene data is changed in accordance with the dynamic-information attribute information associated with the scene data.

As described above, attribute information is set for each specific unit composing data to be displayed and, by changing the display attribute for each specific unit of the data to be displayed in accordance with the set attribute information, a display attribute set for each piece of data by the user and aimed at a specific display effect can be reproduced with a high degree of fidelity.

Figure 18:
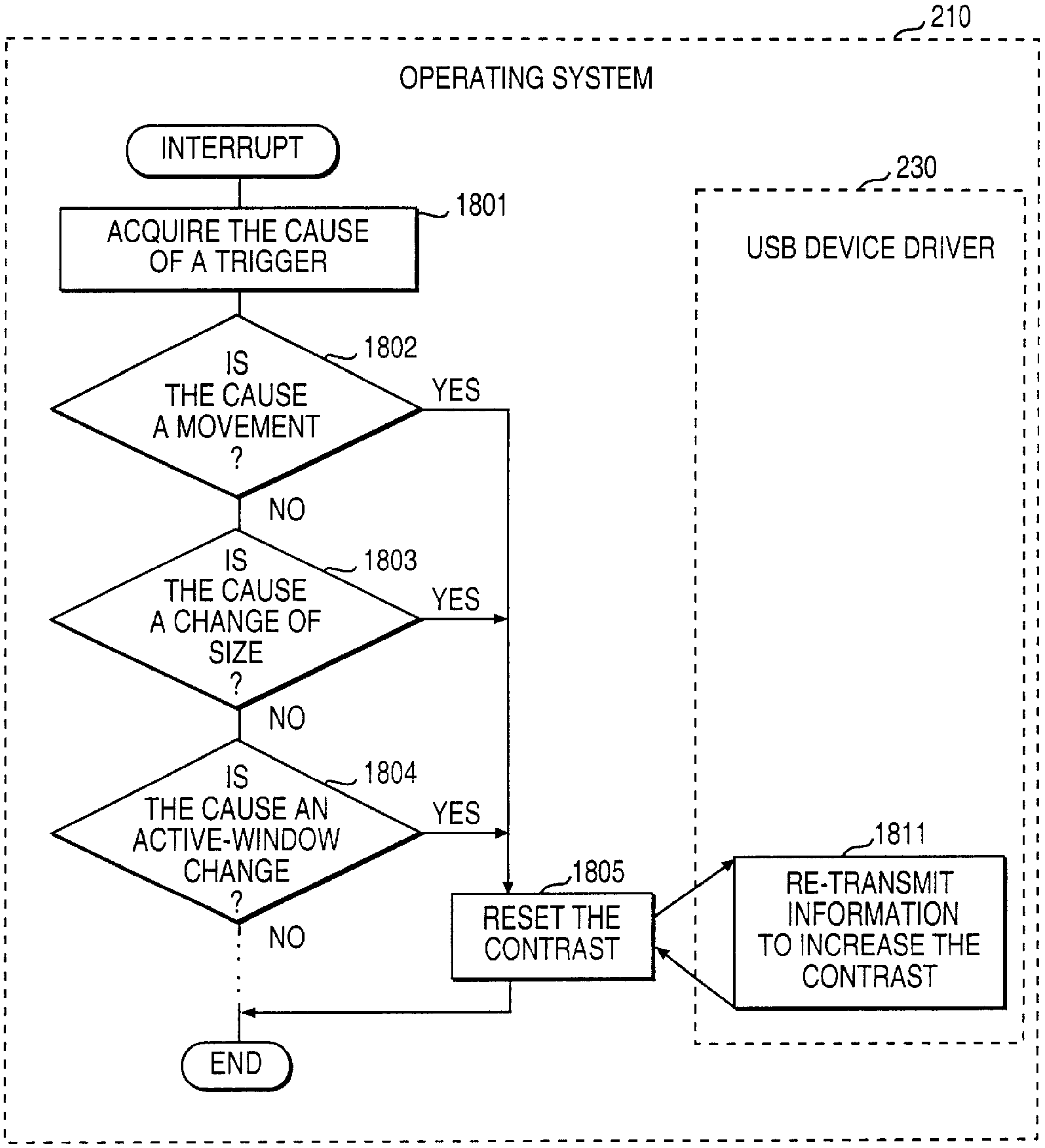
FIG. 18 is a flowchart showing a procedure of processing to modify a display attribute in the event of a specific trigger in the first embodiment.

FIG. 18 is a flowchart showing a processing procedure for modifying a display attribute in the event of a specific trigger in the present embodiment. The procedure is a series of operations carried out by the operating system 210 to modify a display attribute of a window for displaying data at an increased contrast in the event of a specific trigger, as shown in the figure.

In the event of a specific trigger, the display-attribute-change control means 211 of the operating system 210 obtains information on the cause of the trigger at a step 1801.

The flow then goes on to a step 1802 at which the display-attribute-change control means 211 forms a judgment as to whether the trigger causes a movement of a window for displaying data at an increased contrast. If the trigger causes a movement of a window for displaying data at an increased contrast, the flow goes on to a step 1805 at which the area-attribute-information generating means 212 generates area-attribute information 251 using post-movement area information, making a request to the USB device driver 230 to reset the contrast value of the window.

At the request, the USB device driver 230 assembles an instruction packet containing the area-attribute information 251 to reset the contrast value of the window in conformity with a USB protocol, sending the packet to the USB controller 107 at a step 1811.

If the outcome of the judgment formed at the step 1802 indicates that the trigger does not cause a movement of a window for displaying data at an increased contrast, on the other hand, the flow proceeds to a step 1803 at which the display-attribute-change control means 211 forms a judgment as to whether the trigger causes the size of a window for displaying data at an increased contrast to be changed.

If the outcome of the judgment formed in the processing carried out at the step 1803 is YES, the flow goes on to the step 1805 described earlier. Otherwise, the flow continues to a subsequent step. At each of the subsequent steps, the display-attribute-change control means 211 forms a judgment as to whether the trigger is relevant to a window for displaying data at an increased contrast. Similarly, if the outcome of the judgment is YES, the flow goes on to the step 1805 described earlier. Otherwise, the flow continues to a subsequent step. If the outcome of the judgment formed at the last step is NO, the processing is terminated.

As described above, the display attribute of the display screen of the image displaying apparatus 110 can always be updated in accordance with the area-attribute information 250, allowing data to be properly displayed in a window of the display screen.

Figure 19:
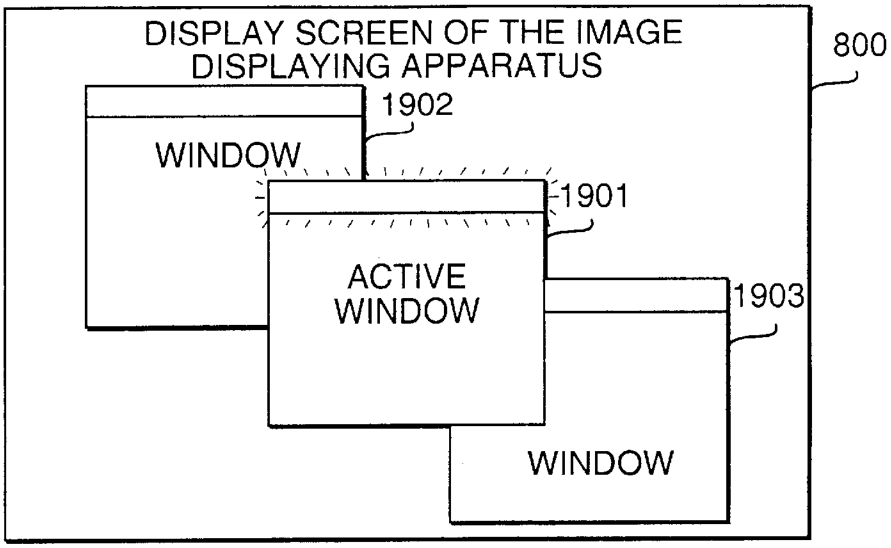
FIG. 19 is a diagram schematically showing processing to generate area-attribute information carried out by the operating system in the first embodiment.

FIG. 19 is a diagram showing processing carried out by the operating system 210 to generate area-attribute information in the present embodiment. In the processing to generate area-attribute information carried out by the operating system 210 shown in the figure, as an example, data is displayed on an active window display screen 1901 at a contrast higher than those of window display screens 1902 and 1903, on the display screen 800 of the image displaying apparatus 210.

The operating system 210 receives a window drawing instruction including area information from the application program 200, displaying a window on a display screen of the image displaying apparatus 110 or a window on a display screen inside the operating system 210 for notifying the user of. information. The area information at that time is a value determined in the operating system 210.

A plurality of these windows can be displayed. When newly displaying a window, the window frames already existing at the uppermost layer of the display screen (the layer closest to the viewer) are made to be visually the same as other windows, while the new window frame is made to be different from the others; for example the color of the window frames already existing at the uppermost layer can be made to be the same as the lower-layer frames, while the color of the new window is different. As a result, the newly displayed window can be identified with ease as an active window needing the user's attention at the present time.

After a new window display screen 1901 has been displayed, a click of the mouse 314 to designate the already-existing window display screen 1901 as an active window is detected by the display-attribute-change control means 211 of the operating system 210 as a trigger. In the event of such a trigger, the area-attribute-information generating means 212 generates area-attribute information 251 comprising attribute information of the active window and area information indicating a location where the active window is displayed. That is, when the window display screen 1901 is made an active window by a click of the mouse 314, the area-attribute-information generating means 212 of the operating system 210 references a database for storing a variety of set values for windows, acquiring contrast information used as attribute information set in advance for the active window.

Then, the area-attribute-information generating means 212 acquires area information showing a display area for displaying the active window display screen 1901. The display area of the window display screen 1901 is controlled by the operating system 210 itself, and is acquired as area information on a controlled area, subject to a change of a display attribute.

The area-attribute-information generating means 212 of the operating system 210 passes the acquired area-attribute information 251 to the display-attribute-change control means 211. As the display-attribute-change control means 211 sends the acquired area-attribute information 251 to the image displaying apparatus 110 by way of the USB device driver 230, the image displaying apparatus 110 displays the window display screen 1901 by requesting the specific-area-display-attribute changing means 113 to modify the contrast of the window display screen 1901 to a value indicated by the area-attribute information 252.

Figure 20:
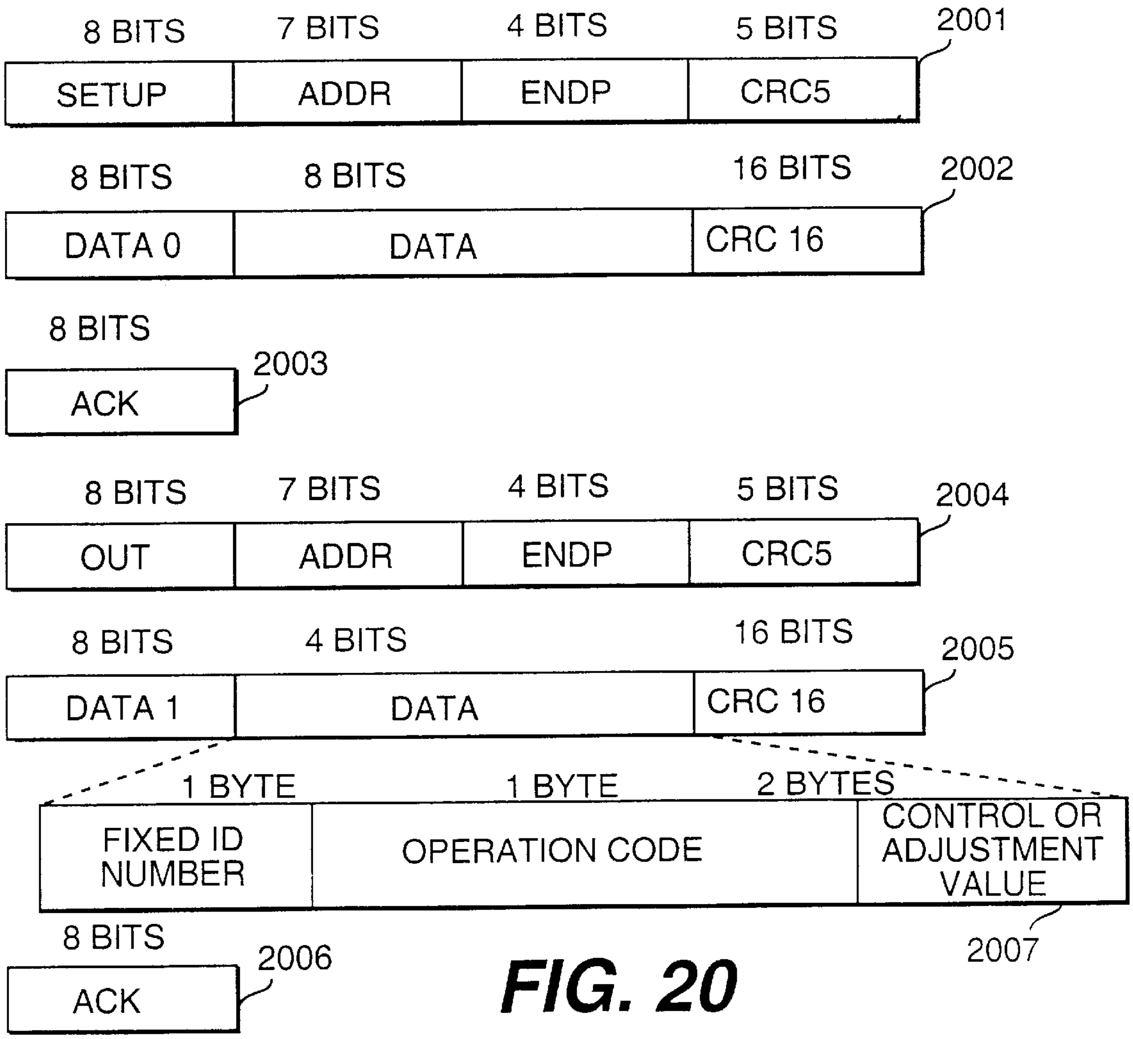
FIG. 20 is a diagram schematically showing formats of data packets of the USB interface in the first embodiment.

FIG. 20 is a diagram showing formats of data packets of the USB interface in the present embodiment. More specifically, the figure shows the contents of each USB-interface data packet which is exchanged between the information processing apparatus 100 and the image displaying apparatus 110 by using the USB interface as a communication interface, and used by the information processing apparatus 100 for controlling the image displaying apparatus 110.

A set-up token packet 2001 is transmitted from the information processing apparatus 100 to the image displaying apparatus 110 for informing the image displaying apparatus 110 that communication is started. A data packet 2002 is transmitted from the information processing apparatus 100 to the image displaying apparatus 110, following the set-up token packet 2001, for indicating the kind of information that is to be exchanged and the amount of the transmission to be transmitted after this packet.

Receiving the set-up token packet 2001 and the data packet 2002, the image displaying apparatus 110 returns a handshake packet 2003 to the information processing apparatus 100 as a response to the set-up token packet 2001 and the data packet 2002.

After that, the information processing apparatus 100 outputs an output token packet 2004, requesting the image displaying apparatus 110 to carry out predetermined data setting. A data packet 2005 contains four bytes of data indicating the data setting to be carried out and how much data will be involved in the data setting.

When the output token packet 2004 and the data packet 2005 are received by the image displaying apparatus 110 normally, the image displaying apparatus 110 returns a handshake packet 2006 to the information processing apparatus 100.

A data packet data portion 2007 shows in detail the four bytes of data contained in the data packet 2005. The first byte is a fixed ID number, and the second byte is an operation code showing what control or adjustment is to be carried out. The third and fourth bytes are an actual set value for the control or adjustment specified by the operation code.

Typical standard operation codes for controlling or adjusting the image displaying apparatus 110 through the USB interface are shown in Table 5.

TABLE 5

| VCP command name | Function | USB op code |
|---|---|---|
| Brightness | Brightness control | 10H |
| Contrast | Contrast control | 12H |
| Red Video Gain | Red gain control | 16H |
| Green Video Gain | Green gain control | 18H |
| Blue Video Gain | Blue gain control | 1AH |
| Focus | Spot size adjustment | 1CH |
| Horizontal Position | Horizontal position control | 20H |
| Horizontal Size | Horizontal size control | 22H |
| Horizontal Pincushion | Side pin distortion adjustment | 24H |
| Horizontal Pincushion Balance | Side pin distortion left-right adjustment | 26H |
| Horizontal Misconvergence | Horizontal-direction misconvergence adjustment | 28H |
| Horizontal Linearity | Horizontal linearity adjustment | 2AH |
| Horizontal Linearity Balance | Horizontal linearity left-right adjustment | 2CH |
| Vertical Position | Vertical position control | 30H |
| Vertial Size | Vertical size control | 32H |
| Vertical Pincushion | Vertical pin distortion adjustment | 34H |
| Vertical Pincushion Balance | Vertical pin distortion up/down adjustment | 36H |
| Vertical Misconvergence | Vertical-direction misconvergence adjustment | 38H |
| Vertical Linearity | Vertical linearity adjustment | 3AH |
| Vertical Linearity Balance | Vertical linearity up/down adjustment | 3CH |
| Parallelogon Distortion | Parallelogon distortion adjustment | 40H |
| Trapezoidal Distortion | Trapezoidal distortion adjustment | 42H |
| Tilt | Rotation adjustment | 44H |
| Top Corner Distortion Control | Top corner distortion adjustment | 46H |
| Top Corner Distortion Balance | Top corner distortion balance adjustment | 48H |
| Bottom Corner Distortion Control | Bottom corner distortion balance adjustment | 4AH |
| Bottom Corner Distortion Balance | Bottom corner distortion balance adjustment | 4CH |
| Horizontal Moiré | Horizontal Moiré adjustment | 56H |
| Vertical Moiré | Vertical Moiré adjustment | 58H |
| Input Level Select | Input signal level selection | 5EH |
| Input Source Select | Input signal selection | 60H |

The image displaying apparatus 110 does not have to be provided with capabilities for all of the functions listed in Table 5. It will be sufficient to provide facilities for required functions only. Since one byte is allocated to the operation code, hexadecimal codes 00H to FFH can be used.

Codes which are not used yet in Table 5 are reserved for future expansions. By assigning a variety of controllable and adjustable items for the purpose of changing the display attributes shown in Tables 1 to 3, it is possible to modify a variety of display attributes by using the USB interface. By utilizing unused codes described above, it is possible to prevent communication errors and incorrect display controls in the function of communication with an information processing apparatus 100 that has no display-attribute changing function, even if area-attribute information 250 is output to an image displaying apparatus 110 having such functions as a standard.

For example, operation codes 00H to 60H shown in Table 5 are provided for the USB interface. Thus, an operation code 62H can be assigned for contrast control of a specific area on the display screen of the image displaying apparatus 110 as an extension code.

As another example, an operation code 64H can be assigned for changing information on the start position of an area, while an operation code 66H can be assigned for changing information on the end position of the area. In this way, the additional extension operation codes allow the area information to be updated in the image displaying apparatus 110 by using the USB interface.

An extension operation code can also be provided for carrying out the contrast control and the control to change area information at the same time. As an alternative, by defining a new Set_Report_Request field for updating area information in the data packet 2002 following the set-up token packet 2001, data showing area information can be transmitted as is by using the data packet 2005 following the next output token packet 2004. In this case, however, a lot of data cannot be transmitted by using one data packet 2005. To solve this problem, the data is transmitted by using a plurality of data packets 2005.

Figure 21:
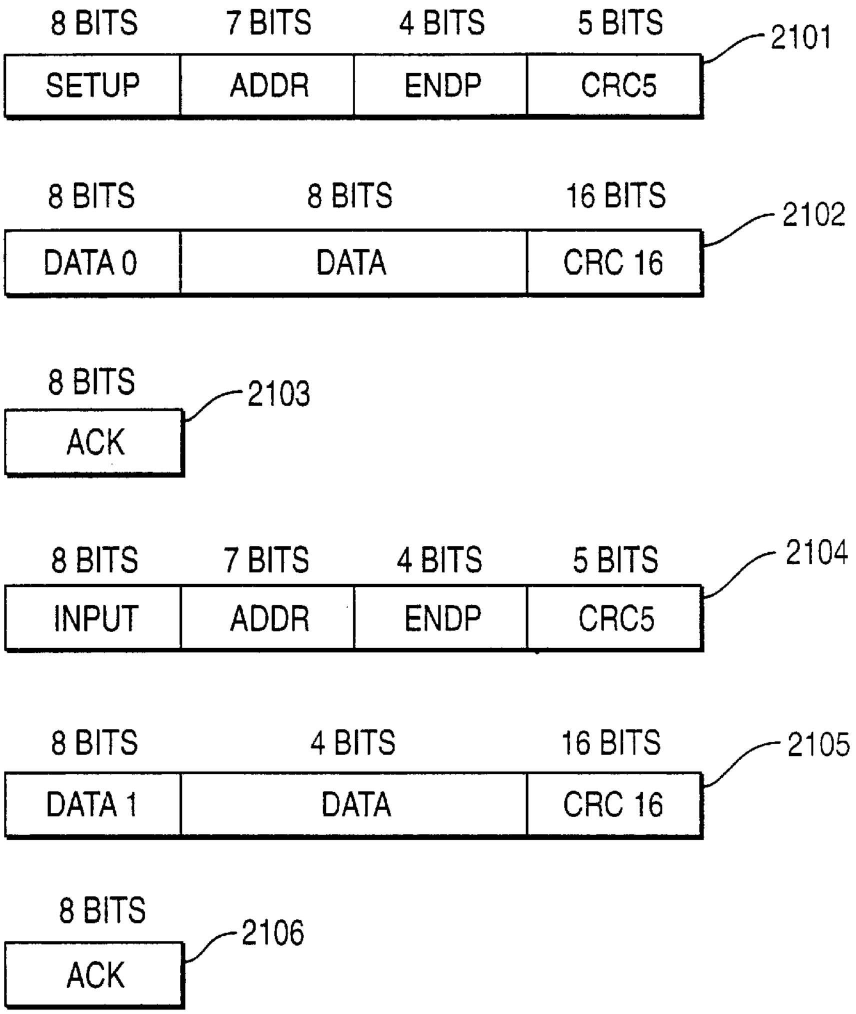
FIG. 21 is a diagram schematically showing formats of transmission of the image-displaying-apparatus information in the first embodiment.

FIG. 21 shows transmission formats of the image-displaying-apparatus information 260 in the present embodiment. As shown in the figure, the image-displaying-apparatus information 260 is transmitted from the image displaying apparatus 110 to the information processing apparatus 100 in a USB packet when the latter makes a request for the image-displaying-apparatus information 260 to the former.

The set-up token packet 2101, the data packet 2102, and the handshake packet 2103 shown in FIG. 21 are the same as packets 2001, 2002, and 2003 shown in FIG. 20. More specifically, the information processing apparatus 100 calls a peripheral apparatus specified by an address code in an ADDR field in the set-up token packet 2101, and a request made by the information processing apparatus 100 to the called peripheral apparatus is specifically described in the DATA field of the next data packet 2102.

When the packets described above are received by the peripheral apparatus, that is, the image displaying apparatus 110 in this case, the image displaying apparatus 110 returns a handshake packet 2103 to the information processing apparatus 100.

In the case of a data packet 2102 requesting the image displaying apparatus 110 to send the image displaying-apparatus information 260 thereof to the information processing apparatus 100, an input token packet 2104 is issued by the information processing apparatus 100 to the image displaying apparatus 110, to be followed by the desired image-displaying-apparatus 260 in a data packet 2105 transmitted by the image displaying apparatus 110 to the information processing apparatus 100. If the USB transmission is successful, a handshake packet 2106 is transmitted by the information processing apparatus 100 to the image displaying apparatus 110.

The image-displaying-apparatus information 260 shown in Table 4 is acquired by the information processing apparatus 100 by issuing an input token packet 2104 when the USB interface is initialized. At that time, a request to acquire image-displaying-apparatus information (a Get_Descriptor request prescribed in the USB standards) is sent by the information processing apparatus 100 to the image displaying apparatus 110 by using the data packet 2102 following the set-up token packet 2101, and various kinds of information shown in Table 4 are sent by the image displaying apparatus 110 to the information displaying apparatus 100 by using the data packet 2105 following the input token packet 2104.

At that time, since the maximum amount of information included in the data packet 2105 issued by the image displaying apparatus 110 is eight bytes, the image-displaying-apparatus information 260 is transmitted by using some data packets 2105. In this case, a handshake packet 2106 is issued for each data packet 2105.

In addition, in the image displaying system implemented by the present embodiment, when communication conforming to the DDC standards is carried out between the information processing apparatus 100 and the image displaying apparatus 110, the following signal transmission format is used.

Figure 22:
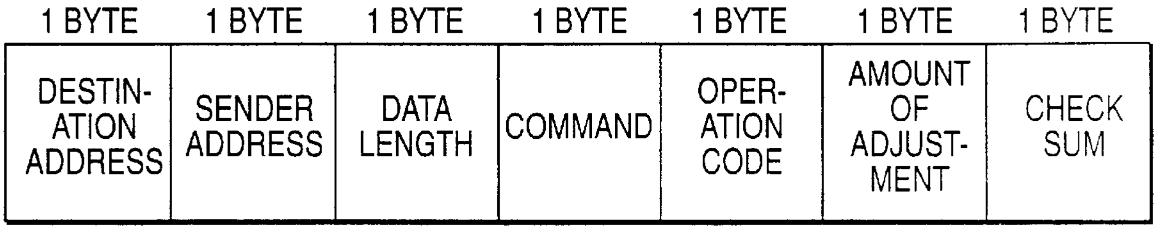
FIG. 22 is a diagram schematically showing a signal transmission format conforming to the DDC protocol used in the first embodiment.

FIG. 22 is a diagram showing a signal transmission format conforming to the DDC protocol used in the present embodiment. The DDC signal transmission format shown in the figure is a standard signal transmission format used when transmitting information in conformity with DDC standards. The first byte is the address of the destination to which the information is transmitted, an address assigned to peripheral equipment connected to the information processing apparatus 100. The next byte is the address of the apparatus sending the information, and the third byte represents the amount of information being transmitted.

The fourth byte is a command describing the information being transmitted. An operation code following the command is information on actual control, etc. The byte following the operation code represents an adjustment amount, and the last byte contains a check sum for error checking of the transmitted data.

By using the signal transmission format described above, for example, the contrast of a specific area on a display screen of the image displaying apparatus 110 can be controlled. In this case, the command is an instruction transmitted to the image displaying apparatus 110 by the information processing apparatus 100 to control the image displaying apparatus 110. The operation code following the command is completely identical with the code used in the case of the USB protocol (that is, a code shown in Table 5). As a result, a request or a command for the image displaying apparatus can be issued in the same way, even if the type of interface changes.

The following is a description of the image displaying apparatus 110 employed in the image displaying system, wherein a dynamic image B (for example, a television image signal) is displayed over an image A by increasing the contrast of the image B in accordance with area-attribute information 252 transmitted to the image displaying apparatus 110 from the information processing apparatus 100.

Figure 23:
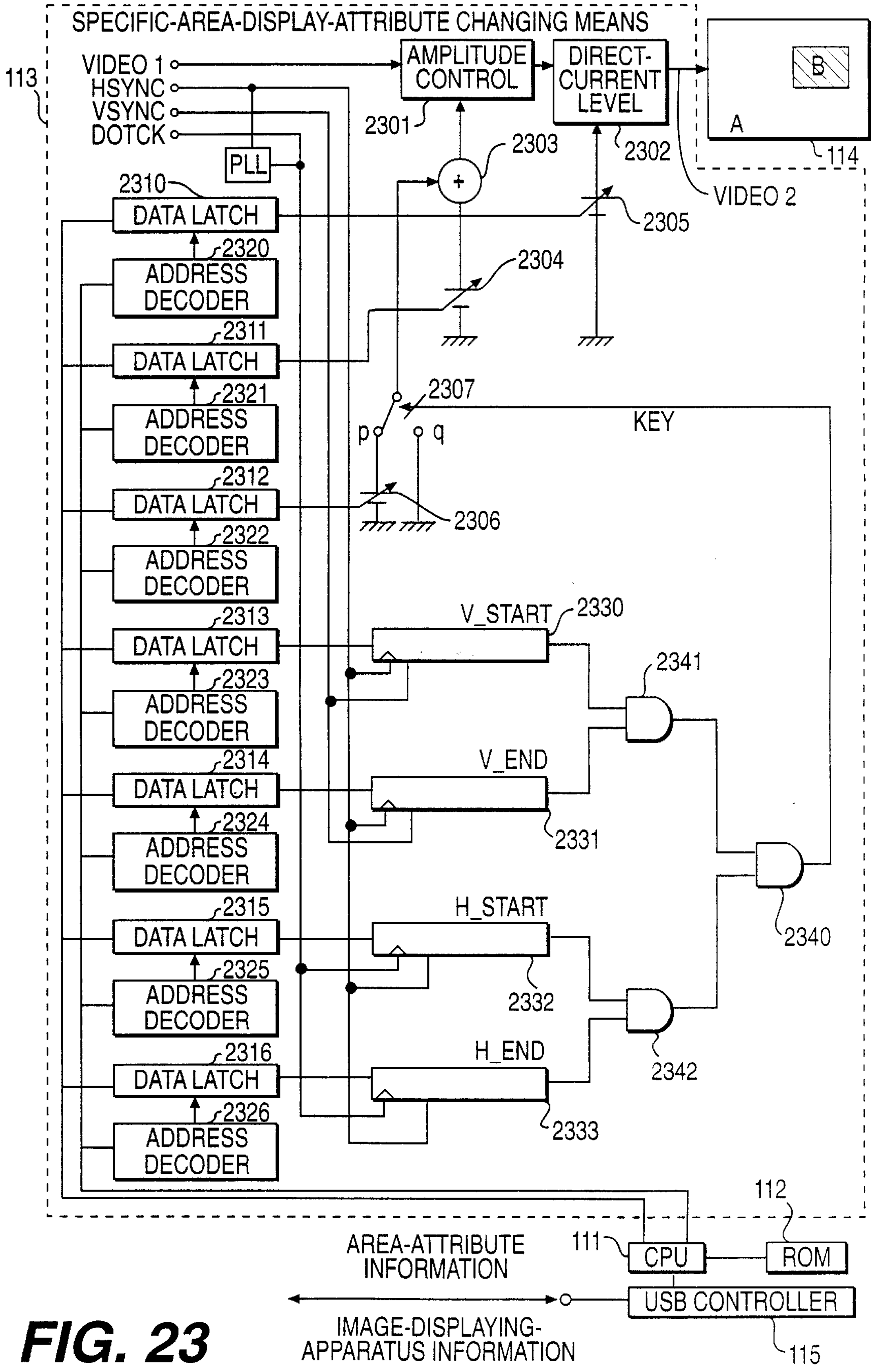
FIG. 23 is a diagram showing a preferred implementation of an image displaying apparatus provided by the first embodiment.

FIG. 23 is a diagram showing a preferred implementation of an image displaying apparatus 110 provided by the present embodiment. As shown in the figure, the image displaying apparatus 110 comprises amplitude control means 2301 for changing the amplitude of an image signal, direct-current-level control means 2302 for controlling the direct-current level of the image signal, an adder 2303, variable power supplies 2304 to 2306, a switch 2307, data latches 2310 to 2312 for setting the voltages of the variable power supplies 2304 to 2306, respectively, address decoders 2320 to 2322 for determining whether data is to be latched in the data latches 2310 to 2312, respectively, and a circuit for generating a timing signal KEY for actuating the switch 2307.

The circuit for generating the timing signal KEY comprises a vertical start counter 2330 for determining a start address of the image B in the vertical direction, a vertical end counter 2331 for determining an end address of the image B in the vertical direction, a horizontal start counter 2332 for determining a start address of the image B in the horizontal direction, a horizontal end counter 2333 for determining an end address of the image B in the horizontal direction, AND gates 2340 to 2342, data latches 2313 to 2316 for setting address values in the vertical start counter 2330, the vertical end counter 2331, the horizontal start counter 2332, and the horizontal end counter 2333, respectively, and address decoders 2323 to 2326.

The data latch 2310 is used for storing data of the direct-current level of an image signal VIDEO 1 supplied by the information processing apparatus 100. The direct-current level determines the brightness of the entire display screen. The data latch 2311 is used for storing amplitude data of the image signal VIDEO 1 for determining the contrast of the entire display screen. The data latch 2312 is used for storing amplitude data for determining the contrast of an area for displaying the image B. The data latch 2313 is used for storing the vertical start address of the image B. The data latch 2314 is used for storing the vertical end address of the image B. The data latch 2315 is used for storing the horizontal start address of the image B. The data latch 2316 is used for storing the horizontal end address of the image B.

FIG. 24 is a diagram showing different formats of the area-attribute information 252 used in the present embodiment. As shown in the figure, the area-attribute information 252 comprises area information which is transmitted from the information processing apparatus 100 and stored in the latches described above, and contrast levels showing contrast values which represent attribute information. To be more specific, FIG. 24(*a*) shows a contrast level along with start and end addresses, FIG. 24(*b*) shows a contrast level, a start address, and horizontal and vertical widths, and FIG. 24(*c*) shows a contrast level, an end address, and horizontal and vertical widths.

In the specific-area-display-attribute changing means 113 shown in FIG. 23, the circuit is designed by assuming that the received area-attribute information 252 comprises a contrast level along with start and end addresses as shown in FIG. 24(*a*). If the received area-attribute information 252 has another format like the ones shown in FIGS. 24(*b*) and 24(*c*), the circuit for generating the timing signal KEY needs to be modified to conform to the format.

It should be noted that data of the direct-current level of the image signal VIDEO 1 for determining the brightness of the entire display screen, data of the amplitude of the image signal VIDEO 1 for determining the contrast of the entire display screen, and addresses are stored as initial data in the ROM 112 to be read out by the CPU 111. The initial data can be changed by the CPU 111 in accordance with operations carried out by the user.

In the specific-area-display-attribute changing means 113 shown in FIG. 23, the data latch 2310 and the address decoder 2320 are associated with each other to form a pair. Similarly, the data latch 2311 and the address decoder 2321 are associated with each other to form a pair, and so on. Pieces of data to be stored in the data latches 2310 to 2316 and addresses to be decoded by the address decoders 2320 to 2326 are supplied by the CPU 111. Addresses are decoded by the address decoders 2320 to 2326 to find out whether the addresses match those of the associated respective data latches 2310 to 2316. If the addresses match those of the associated respective data latches 2310 to 2316, the data latches 2310 to 2316 latch the respective pieces of data supplied thereto.

Assume, for example, that data of direct-current levels for determining the brightness of the entire display screen is supplied by the CPU 111. An address supplied by the CPU 111 at the same time is decoded by the address decoder 2320 to determine whether the data is indeed data for the data latch 2310. If the data is judged to be data for the data latch 2310, a latch pulse generated by the address decoder 2320 is used for latching the data into the data latch 2310.

Pieces of data in the data latches 2313 and 2314 are preset in the vertical start counter 2330 and the vertical end counter 2331, respectively, with timing determined by a vertical synchronization signal VSYNC. Similarly, pieces of data in the data latches 2315 and 2316 are preset in the horizontal start counter 2332 and the horizontal end counter 2333, respectively, with timing determined by a horizontal synchronization signal HSYNC.

Thereafter, the vertical start counter 2330 and the vertical end counter 2331 each count pulses of the horizontal synchronization signal HSYNC as a counter clock signal, whereas the horizontal start counter 2332 and the horizontal end counter 2333 each count pulses of a dot clock signal DOTCK as a counter clock signal. It should be noted that the dot clock signal DOTCK can be generated by multiplying the frequency of the horizontal synchronization signal HSYNC using a PLL technique, as shown in FIG. 23.

The vertical start counter 2330 and the horizontal start counter 2332 output "0" till the contents reach the latch data preset therein, outputting "1" after the contents have reached the preset latch data. On the other hand, the vertical end counter 2331 and the horizontal end counter 2333 output "1" till the contents reach the latch data preset therein, outputting "0" after the contents have reached the preset latch data.

The outputs of the vertical start counter 2330 and the vertical end counter 2331 are supplied to the AND gate 2341 to produce the logical product thereof. Similarly, the outputs of the horizontal start counter 2332 and the horizontal end counter 2333 are supplied to the AND gate 2341 to produce the logical product thereof. The outputs of the AND gates 2341 and 2342 are supplied to the AND gate 2340 to generate the timing signal KEY, showing the area of the image B as the logical product thereof.

FIGS. 25(*a*) and 25(*b*) are timing charts showing a relation between the levels of the timing signal KEY and the image signal in the present embodiment. To be more specific, FIG. 25(*a*) is a timing chart showing a relation between the levels of the timing signal KEY and the image signal during a horizontal scanning period, and FIG. 25(*b*) is a timing chart showing a relation between the levels of the timing signal KEY and the image signal during a vertical scanning period. The hatched portion of the image signal VIDEO 1 corresponds to the image B. The timing signal KEY is "0" (that is, reset at a low level) at all times except during this hatched period, where it is set at "1" (a high level).

Referring back to FIG. 23, as shown in the figure, the switch 2307 is controlled by this timing signal KEY. Since the timing signal is normally "0", the switch 2307 is set on a contact q. As the timing signal KEY is set to "1", however, the switch 2307 is set to a contact q which is connected to the variable power supply 2306.

A voltage output by the switch 2307 is supplied to the adder 2303. This output voltage is added to a voltage output by the variable power supply 2304. Since the timing signal KEY is "0" except during the period of the image signal VIDEO 1 corresponding to the image B, however, the adder 2303 passes on the output voltage of the variable power supply 2304 as is. In the period of the image signal VIDEO 1 corresponding to the image B, the sum of the voltages output by the variable power supplies 2304 and 2306 is output by the adder 2303.

Here, the voltage output by the variable power supply 2306 has a value corresponding to the data latched in the data latch 2312, whereas the voltage output by the variable power supply 2304 has a value corresponding to the data latched in the data latch 2311.

The voltage output by the adder 2303 is supplied to the amplitude control means 2301 as a control voltage. The amplitude control means 2301 controls the amplitude of the image signal VIDEO 1 in accordance with the control voltage supplied thereto. As described above, since the level of the control voltage is high during the period of the image signal VIDEO 1 corresponding to the image B, the amplitude of the image signal VIDEO 1 is amplified even more by the amplitude control means 2301 during this period. The direct-current-level control means 2302 further sets the direct-current level of the image signal VIDEO 1 output by the amplitude control means 2301 at a value corresponding to a voltage output by the variable power supply 2305, to produce an image signal VIDEO 2, which also has an amplitude in this period amplified to a level higher than those in other periods.

In this way, by properly setting the voltages output by the variable power supplies 2304 and 2306, the contrast levels of the portion of the image B of the image signal VIDEO 1 and those of the other portions can be set at arbitrary values independent of each other. For example, let an image A be a static text image while the image B is a dynamic television image. In this case, by increasing the contrast of the television image while relatively suppressing that of the text image, the television image can be made bright and beautiful and, at the same time, the text image can be made easy to read.

As described above, according to the image displaying system implemented by the present embodiment, area-attribute information 250 for changing a display attribute of a specific area on a display screen of the image displaying apparatus 110 is generated by the information processing apparatus 100 and transferred to the image displaying apparatus 110 where an image is displayed on the specific area of the display screen thereof by changing a display attribute of the specific area. As a result, the image displaying system can keep up with processing to change a display attribute of the specific area by merely modifying a program in the information processing apparatus 110.

Second Embodiment

The following is a description of an image displaying system implemented by a second embodiment of the invention, wherein data to be displayed in a specific area on a display screen of an image displaying apparatus and attribute data for the specific area are transferred from an information processing apparatus to the image displaying apparatus, and the display attribute of the specific area is changed in accordance with the attribute data in the image displaying apparatus.

Figure 26:
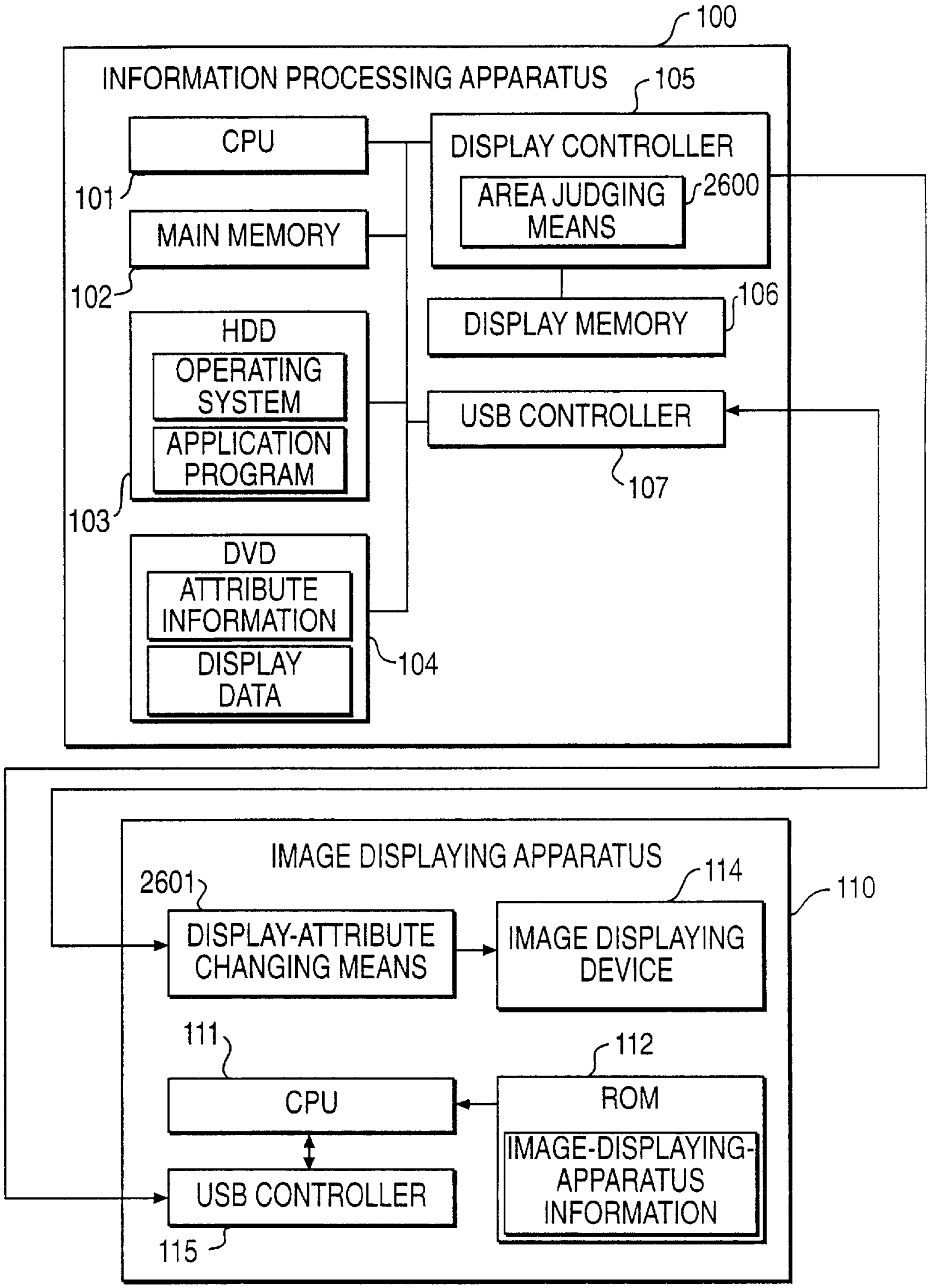
FIG. 26 is a diagram schematically showing the configuration of the image displaying system implemented by a second embodiment of the invention.

FIG. 26 is a diagram showing a configuration of an image displaying system implemented by the present embodiment. As shown in the figure, the image displaying system comprises an information processing apparatus 100 having a display controller 105 that includes an area judging means 2600. The area judging means forms a judgment as to whether data to be displayed exists in a specific area, a display attribute of which is to be changed, on a display screen of an image displaying apparatus 110, which has a display-attribute changing means 2601 for changing a display attribute of an image signal for the specific area. The image displaying apparatus 110 is connected to the information processing apparatus 100.

In the image displaying system implemented by the present embodiment, after the area judging means 2600 forms a judgment as to whether data to be displayed exists in the specific area whose display attribute is to be changed, the information processing apparatus 100 transmits an image signal to the image displaying apparatus 110. Then, after the display-attribute changing means 2601 of the image displaying apparatus 110 changes the display attribute of the specific area, the image is displayed.

The CPU 101 employed in the information processing apparatus 100 is a processor for controlling the entire information processing apparatus 100. More specifically, the CPU 101 controls the information processing apparatus 100 as a whole by actually interpreting and executing an application program 200, an operating system 210, and a group of programs such as a USB device driver 230 and an image displaying device driver 240 which are loaded into the main memory unit 102.

In addition, the information processing apparatus 100 also includes an HDD 103 for storing software such as the application program 200, the operating system 210, a GUI program, an API program, the USB device driver 230, and the image displaying device driver 240. The information processing apparatus 100 is also provided with a DVD 104 for storing texts as well as display data of static and dynamic images to be displayed on the image displaying apparatus 110.

The display controller 105 controls a write operation for writing data to be displayed on the image displaying apparatus 110 into the display memory unit 106, and controls a read operation for reading out the data from the display memory unit 106 as an image signal to be transmitted to the image displaying apparatus 110. Further, the display controller 105 has a plurality of registers in which area-attribute information 251 used for changing the display attribute of the specific area is set. The display controller 105 also transfers area-attribute information for changing the display attribute of the specific area generated from the area-attribute information 251 to the image displaying apparatus 110.

Finally, the information processing apparatus 100 is also provided with a USB controller 107 for transmitting an inquiry signal to the image displaying apparatus 110, and receiving a report signal in response to the inquiry signal from the image displaying apparatus 110.

The image displaying apparatus 110 comprises a CPU 111 and a ROM 112. The CPU 111 is a processor for controlling the image displaying apparatus 110 as a whole by interpretation and execution of a control program stored in a storage area of the ROM 112. The control program itself is not shown in the figure.

The ROM 112 employed in the image displaying apparatus 110 stores information indicating whether the image displaying apparatus 110 has a display-attribute changing means 2601. That is, the ROM 112 indicates whether the image displaying apparatus 110 has a capability of displaying an image on a specific area on the screen thereof by changing the display attribute of the specific area. The display-attribute changing means 2601 changes a display attribute in the image signal input to the image displaying apparatus 110 in accordance with an attribute control signal.

In addition, the image displaying apparatus 110 also employs a USB controller 115, which serves as a counterpart of the USB controller 107 employed in the information processing apparatus 100. More specifically, the USB controller 115 receives the inquiry signal from the information processing apparatus 100, and transmits the report signal in response to the inquiry signal to the information processing apparatus 100. The inquiry signal is used for making an inquiry about the ability of the image displaying apparatus 110 to display an image on the specific area on the screen thereof by changing the display attribute of the specific area in accordance with USB standards.

Figure 27:
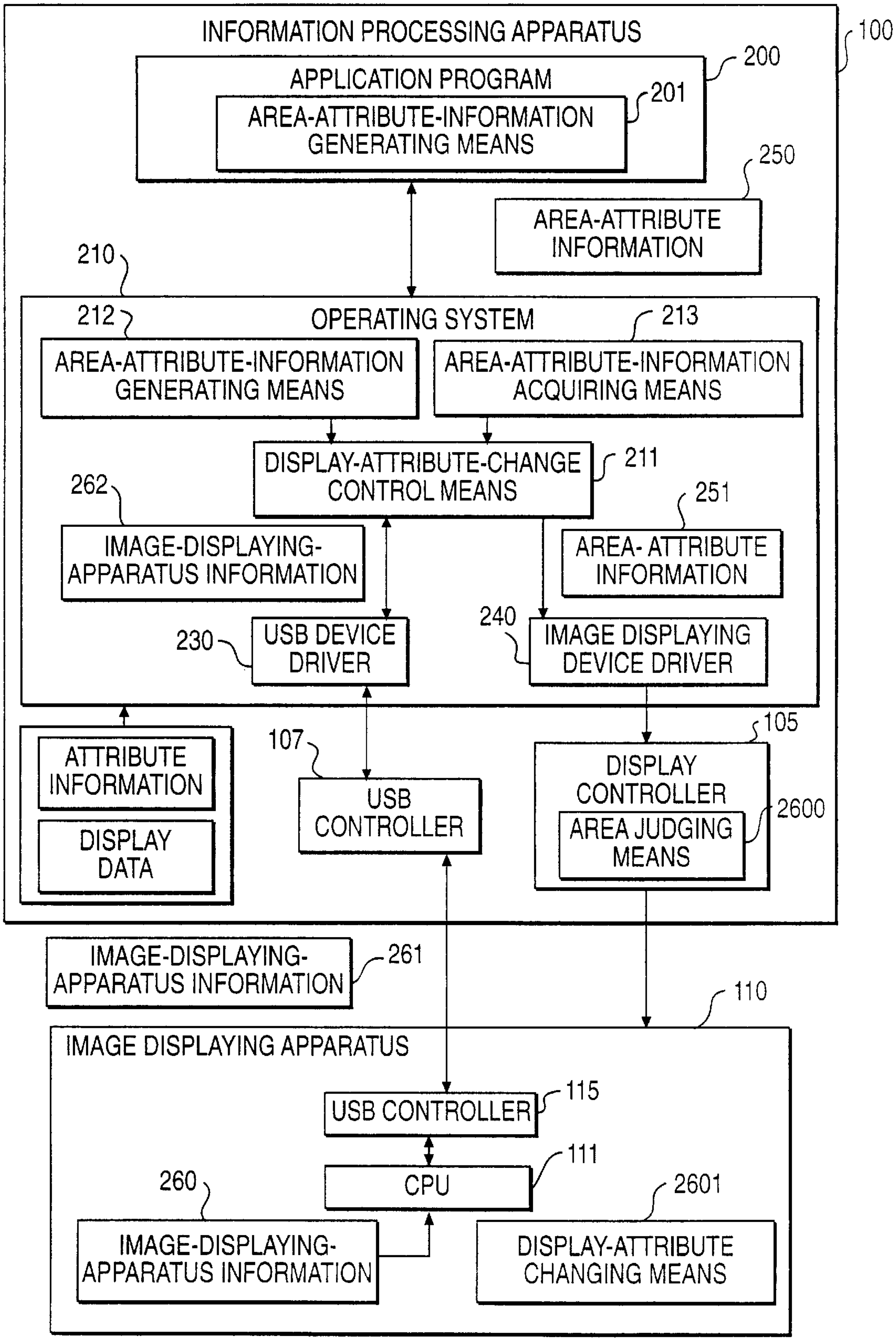
FIG. 27 is a diagram showing an outline of processing carried out by the image displaying system implemented as the second embodiment.

FIG. 27 is a diagram showing an outline of the processing carried out by the image displaying system implemented by the present embodiment. As shown in the figure, the area judging means 2600 and the display-attribute changing means 2601 correspond to the specific-area-display-attribute changing means 113.

The application program 200 in the information processing apparatus 100 comprises a GUI, which is visible to the operator who operates the information processing apparatus 100, and which serves as an interface with the operating system 210.

The operating system 210 in the information processing apparatus 100 is a basic program serving as the nucleus of the image displaying system. More specifically, the operating system 210 connects the application program 200 with program members directly controlling hardware, such as the USB device driver 230 and the image displaying device driver 240.

The image displaying device driver 240 in the information processing apparatus 100 is positioned between the operating system 210 and hardware members such as the device controller 105 and the display memory unit 106. More specifically, the image displaying device driver 240 is a program which implements a draw instruction issued by the operating system 210, by reading out and writing information from and into internal registers of the display controller 105 and the display memory unit 106. It should be noted that the internal registers themselves are not shown in the figure.

The application program 200 is provided with area-attribute-information generating means 201. When there is detected a need to change the display attribute of the specific area on the display screen of the image displaying apparatus 110, area-attribute information 250 for changing the display attribute of the specific area on the display screen of the image displaying apparatus 110 is generated in the application program 200 and passed to the operating system 210 by the area-attribute-information generating means 201.

The operating system 210 comprises display-attribute-change control means 211, area-attribute-information generating means 212, and area-attribute-information acquiring means 213. The display-attribute-change control means 211 controls the entire display-attribute-change processing of the information processing apparatus 100 by making an inquiry into an ability of the image displaying apparatus 110 to display an image on a specific area on its display screen, by changing the display attribute of the specific area, and by receiving a response to the inquiry. The area-attribute-information generating means 212 generates area-attribute information 251 in the operating system 210 when there is detected a need to change the display attribute. The area-attribute-information acquiring means 213 acquires the area-attribute information 250 generated by the area-attribute-information generating means 201 of the application program 200.

In addition, the USB device driver 230 and the image displaying device driver 240 are included in the operating system 210. The USB device driver 230 converts area-attribute information 251 and image-displaying-apparatus information 260 into USB data packets and vice versa in accordance with USB standards, and exchanges image-displaying-apparatus information 261 between the information processing apparatus 100 and the image displaying apparatus 110. The image displaying device driver 240 stores data to be displayed in the display-memory unit 106.

The USB controller 107 is controlled by the USB device driver 230 so that the USB controller 107 transmits to the image displaying apparatus 110 the inquiry into the ability of the image displaying apparatus 110 to display an image on a specific area on its display screen by changing a display attribute of the specific area, whereas the image displaying apparatus 110 transmits, in response to the inquiry, a report to the USB controller 107 indicating the capability of the image displaying apparatus 110 to so display an image.

It should be noted that, in the area-attribute information 250 and the image-displaying-apparatus information 260, information similar to that shown in Tables 1 to 4 can be used. In addition, a non-USB means such as a DDC means can be used for exchanging the area-attribute information 250 and the image-displaying-apparatus information 260 between the information processing apparatus 100 and the image displaying apparatus 110, as is indicated in the description of the first embodiment.

The following is a description of pieces of processing which are carried out by the application program 200 and the operating system 210 according to the present embodiment when a display attribute of a specific area on a display screen of the image displaying apparatus 110 is changed.

Figure 28:
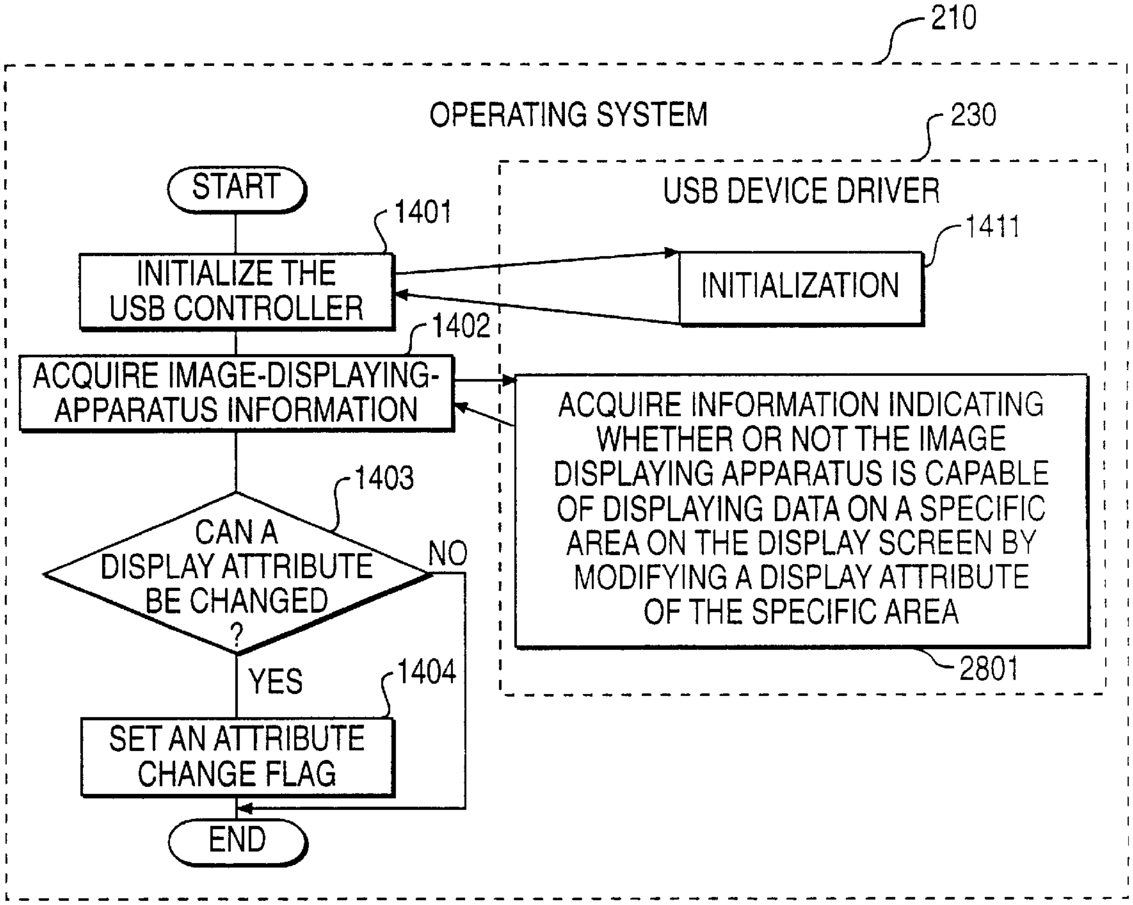
FIG. 28 is a flowchart showing a procedure of initialization processing carried out by the operating system in the second embodiment.

FIG. 28 is a flowchart showing a procedure of initialization processing carried out by the operating system 210 in the present embodiment. The initialization processing carried out by the operating system 210 modifies a display attribute carried out by the operating system 210. The initialization begins with a step 1401 at which the power supply of the information processing apparatus 100 is turned on. As the power supply is turned on, at a step 1411, the USB device driver 230 initializes the USB controller 107.

The flow then proceeds to a step 1402 at which the display-attribute-change control means 211 of the operating system 210 makes the inquiry into the ability of the image displaying apparatus 110 to modify the display attribute through the USB driver 230 (that is, an inquiry into, among other things, whether a display-attribute changing means 2601 is provided in the image displaying apparatus 110).

Receiving the inquiry, the USB driver 230 creates a packet containing the inquiry, and sends the inquiry packet to the image displaying apparatus 110 by way of the USB controller 107 as an inquiry signal at a step 2801.

The image displaying apparatus 110 receives the inquiry signal transmitted by the information processing apparatus 100 by way of the USB controller 115, and creates a packet containing image-displaying-apparatus information 261 to indicate that a display-attribute changing means 2601 is provided in the image displaying apparatus 110. The packet is then sent to the information processing apparatus 100 by way of the USB controller 115 as a report signal in response to the inquiry packet.

The information processing apparatus 100 receives the report signal transmitted by the image displaying apparatus 110 by way of the USB controller 107. In step 2801, the USB device driver 230 of the information processing apparatus 100 receives the image-displaying-apparatus information 261 transmitted by the image displaying apparatus 110 by way of the USB controller 107, and passes on the image-displaying-apparatus information 261 to the display-attribute-change control means 211 as image-displaying-apparatus information 262.

At a step 1403, the display-attribute-change control means 211 references the image-displaying-apparatus information 262 received at the step 1402, to determine whether the image displaying apparatus 110 is capable of modifying a display attribute of a specific area. If the image displaying apparatus 110 is determined to be capable of modifying a display attribute of a specific area, the flow goes on to a step 1404 at which an attribute change flag is set to indicate that a display attribute of a specific area can be changed.

If the result of the step 1403 indicates that the image displaying apparatus 110 is not capable of modifying a display attribute of a specific area, or if no image-displaying-apparatus information 262 is transmitted from the image displaying apparatus 110, a display attribute of a specific area is considered to be unchangeable and the initialization processing is ended without setting the attribute change flag cited above.

Figure 29:
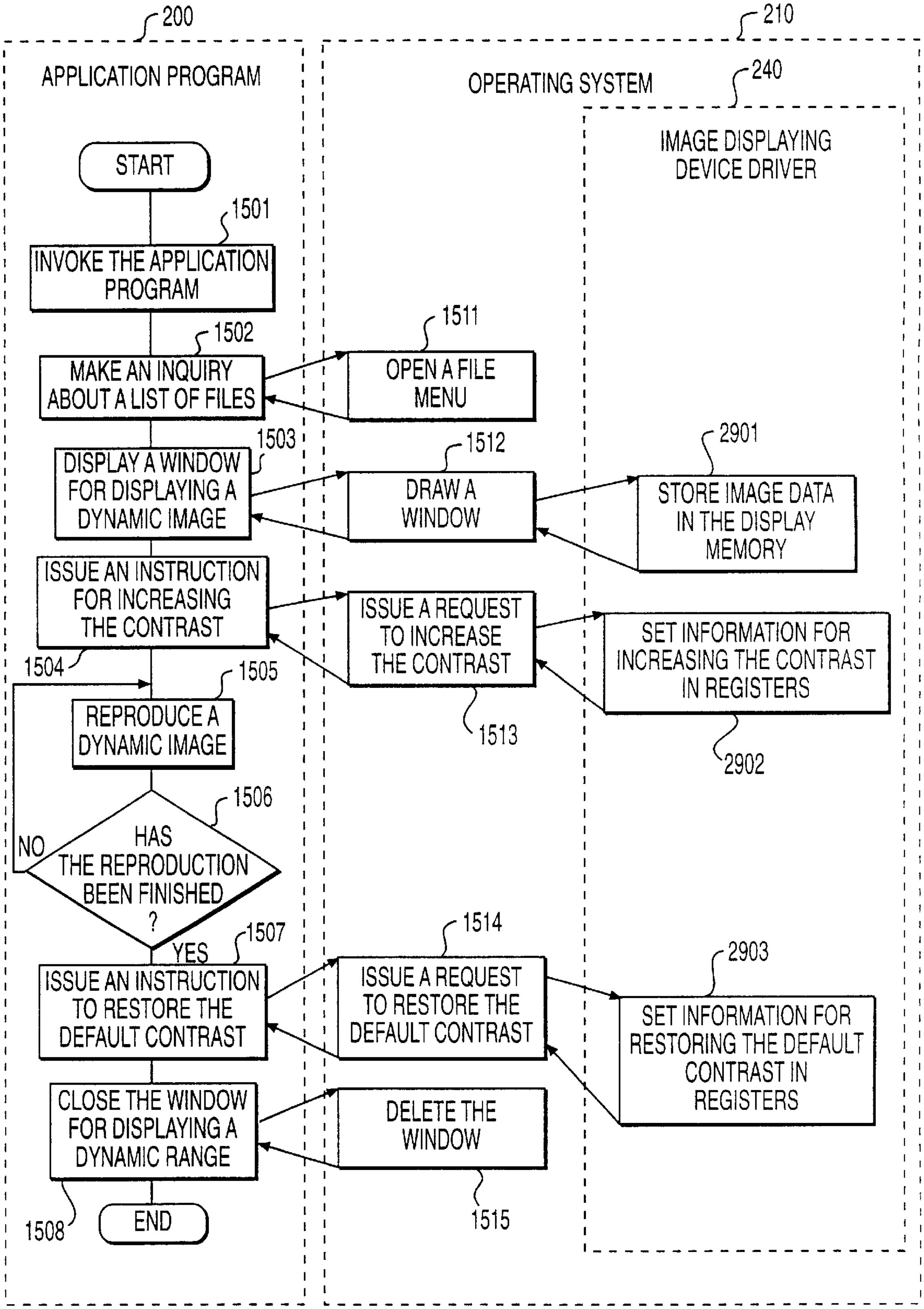
FIG. 29 is a flowchart showing a procedure of processing carried out by an application program to modify a display attribute in the second embodiment.

FIG. 29 is a flowchart showing a procedure carried out by the application program 200 to modify a display attribute in the present embodiment. The procedure is a series of operations performed by the application program 200 to modify a display attribute so as to display a window for reproducing dynamic-image data at a high contrast.

The flowchart begins with a step 1501 at which the user invokes the application program 200 for reproducing dynamic-image data. The flow then goes on to a step 1502 at which the application program 200 makes an inquiry to the operating system 210, about a list of files in a recording medium storing dynamic-image data.

In response to the inquiry, the operating system 210 opens a file menu at a step 1511. As the list of files storing dynamic-image data is displayed, the user selects a file storing dynamic-image data from the list.

The flow then goes on to a step 1503, at which the application program 200 issues a draw instruction to the operating system 210, to display a window for displaying a dynamic image. At the request made by the application program 200, the operating system 210 requests the image displaying device driver 240 to display the window for displaying a dynamic image by using area information specified in the draw instruction, at a step 1512. As a result, the window for displaying a dynamic image is displayed on the image displaying apparatus 110 by the image displaying device driver 240, by storing the dynamic-image data in the display memory unit 106 at a step 2901.

The flow then proceeds to a step 1504 at which the area-attribute-information generating means 201 of the application program 200 issues a contrast-increasing instruction to the operating system 210, requesting the operating system 210 to increase the contrast of the window in which the dynamic image is to be displayed, at the step 1503. More specifically, the area-attribute-information generating means 201 transfers area-attribute information 250 comprising area information specified when displaying the window, and attribute information showing a contrast value of the dynamic data specified in advance as a run-time parameter, to the image displaying apparatus 110 through the operating system 210, in order to increase the contrast of the window for displaying the dynamic image.

At a step 1513, the display-attribute-change control means 211 of the operating system 210 receives the contrast-increasing instruction from the application program 200 by way of the area-attribute-information acquiring means 213.

Receiving the instruction, the area-attribute-information acquiring means 213 references the attribute change flag set at initialization and, if the image displaying apparatus 110 is capable of changing a display attribute of a specific area on a display screen thereof, area-attribute information 251 is supplied to the image displaying device driver 240, making a request to increase the contrast of the window in which the dynamic image is to be displayed.

At the request described above, the image displaying device driver 240 sets the area-attribute information 251 used for increasing the contrast in a color-information control register, area start-position registers, and area end-position registers of the display controller 105, at a step 2902.

Receiving the area-attribute information 251, the display controller 105 determines a specific area in which dynamic-image data is to be displayed by using the area judging means 2600, sending an attribute control signal to the image displaying apparatus 110 indicating the contrast value of the specific area on the display screen of the image displaying apparatus 110, along with an image signal conveying the dynamic-image data.

The flow then continues to a step 1505 at which the application program 200 reproduces the dynamic image in the window, the display attribute of which was modified to a high contrast value for the dynamic-image data. The flow then goes on to a step 1506 at which the application program examines whether the dynamic-image data has all been reproduced. If any dynamic-image data remains to be reproduced, the flow returns to the step 1505. If the dynamic-image data has all been reproduced, on the other hand, the flow proceeds to a step 1507.

After reproducing all the dynamic-image data, at the step 1507, the area-attribute-information generating means 201 of the application program 200 generates area-attribute information 250 for returning the display attribute of the window displaying the dynamic image to the default value, and issues a default-contrast restoring instruction to the operating system 210.

At a step 1514, the display-attribute-change control means 211 of the operating system 210 receives the default-contrast restoring instruction from the application program 200 by way of the area-attribute-information acquiring means 213. After the instruction has been received, area-attribute information 251 for restoring the display attribute to the default contrast is supplied to the image displaying device driver 240.

At the request described above, the image displaying device driver 240 sets the area-attribute information 251 used for restoring the contrast of the specified window to the default value in the color-information control register, the area start-position registers, and the area end-position registers of the display controller 105, at a step 2903.

The flow then goes on to a step 1508 at which the application program 200 sends an instruction to the operating system 210 to close the window in which the dynamic image was displayed. Receiving the instruction, the operating system 210 deletes the window at a step 1515. As the window is deleted, the application program 200 terminates the procedure of reproducing the dynamic-image data.

Figure 30A:
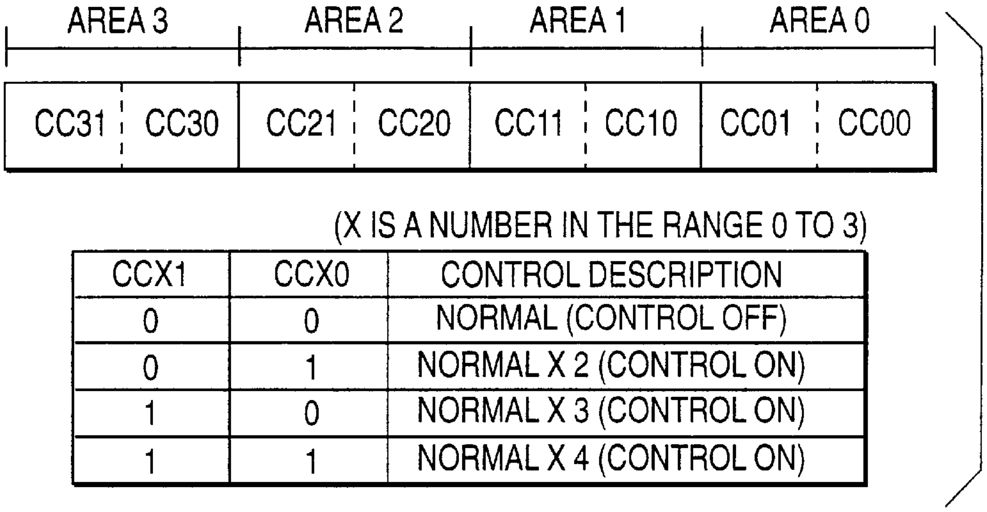
FIGS. 30(*a*) and 30(*b*) are diagrams schematically showing the color-information control register, the area start-position registers, and the area end-position registers employed in the second embodiment.
Figure 30B:
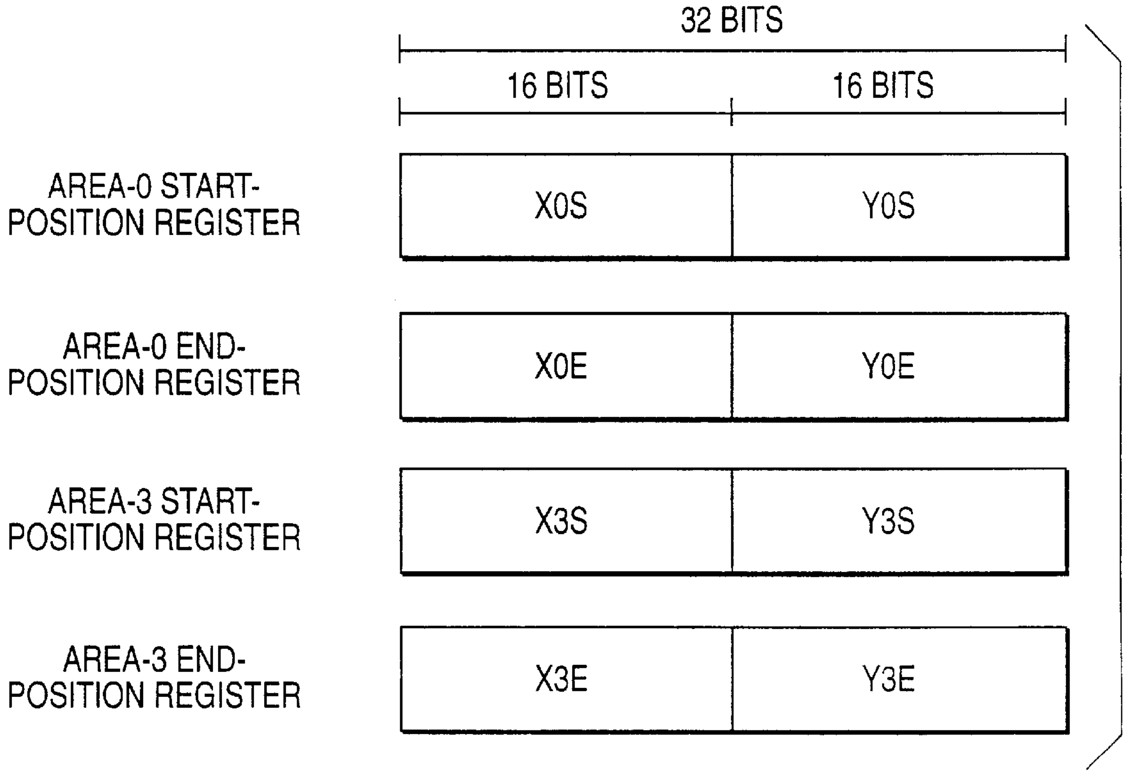

FIG. 30 is a diagram showing the color-information control register, the area start-position registers, and the area end-position registers employed in the present embodiment. To be more specific, the color-information control register is shown in FIG. 30(*a*), and the area start-position registers and the area end-position registers are shown in FIG. 30(*b*). The color-information control register shown in FIG. 30(*a*) contains attribute information indicating whether the contrasts of pieces of data to be displayed in areas 0 to 3 are to be changed. On the other hand, the area start-position registers and the area end-position registers shown in FIG. 30(*b*) contain area information for the four areas, the attribute information for which is stored in the color-information control register shown in FIG. 30(*a*).

The color-information control register shown in FIG. 30(*a*) is eight bits in width, comprising four two-bit control fields for the four areas 0 to 3. Each of the four two-bit control fields is denoted by CCX1 and CCX0, where X is the area number ranging from a to 3. For (CCX1, CCX0)=(0, 0), the control is turned off, setting the contrast of the area at an ordinary value. For (CCX1, CCX0)=(0, 1), the control is turned on, setting the contrast of the area at twice the ordinary value. For (CCX1, CCX0)=(1, 0), the control is turned on, setting the contrast of the area at three times the ordinary value. For (CCX1, CCX0)=(1, 1), the control is turned on, setting the contrast of the area at four times the ordinary value.

The area start-position registers and the area end-position registers shown in FIG. 30(*b*) are each 32 bits in width. An area-0 start-position register comprises a 16-bit field X0S representing an X-direction start position, and a 16-bit field Y0S representing a Y-direction start position . Area-1, area-2 and area-3 start-position registers have the same configuration as the area-0 start-position register.

An area-0 end-position register comprises a 16-bit field X0E representing an X-direction end position, and a 16-bit field Y0E representing a Y-direction end position. Area-1, area-2 and area-3 end-position registers have the same configuration as the area-0 end-position register.

Figure 31:
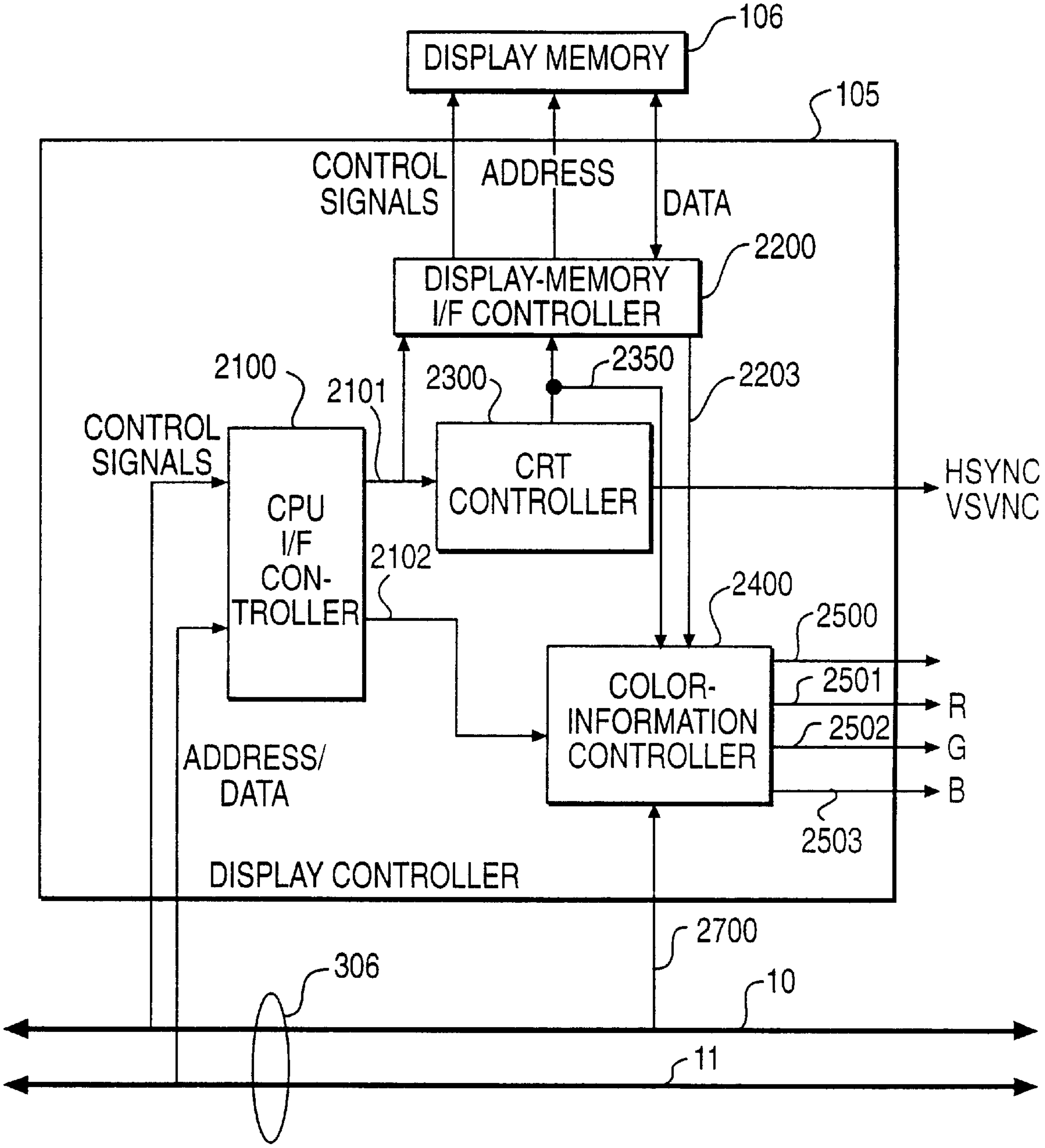
FIG. 31 is a diagram showing the internal configuration of the display controller employed in the second embodiment.

FIG. 31 is a diagram showing the internal configuration of the display controller 105 employed in the present embodiment. As shown in the figure, in the display controller 105, a color-information controller 2400 generates an attribute control signal 2500 for changing a display attribute of an image signal. In the CRT display 322 which serves as the image displaying apparatus 110, a display attribute such as the contrast can be adjusted by using the attribute control signal 2500. In addition, display attributes such as the brightness, the chromaticity, the γ characteristic and the RGB level can also be controlled.

The attribute control signal 2500 generated from the color-information controller 2400 is transmitted to the image displaying apparatus 110 through an available signal line in a cable for transmitting an image signal. It should be noted that the attribute control signal can also be transmitted to the image displaying apparatus 110 through the USB controller The display controller 105 includes a CPU interface controller 2100 for controlling accesses between the CPU 101 and the display controller 105, and a display-memory interface controller 2200 for controlling accesses between the display controller 105 and the display memory unit 106.

When data is set by the CPU 101 in the display memory unit 106 or, conversely, when data is read out by the CPU 101 from the display memory unit 106, the data is transferred through a path between the CPU 101 and the display memory unit 106 comprising a host bus 301, a memory controller 302, a system bus 306 and the display controller 105 composed of the CPU interface controller 2100 and the display-memory interface controller 2200.

In addition, the CPU interface controller 2100 also controls operations carried out by the CPU 101 to set and read out data in and from registers in the CRT controller 2300 and the color-information controller 2400.

The CRT controller 2300 generates a horizontal synchronization signal HSYNC and a vertical synchronization signal VSYNC. In addition, the CRT controller 2300 supplies position information 2350 for reading out data to be displayed to the display-memory interface controller 2200, and reads out raw display data 2203, data required in displaying data, from the display memory unit 106.

Figure 32:
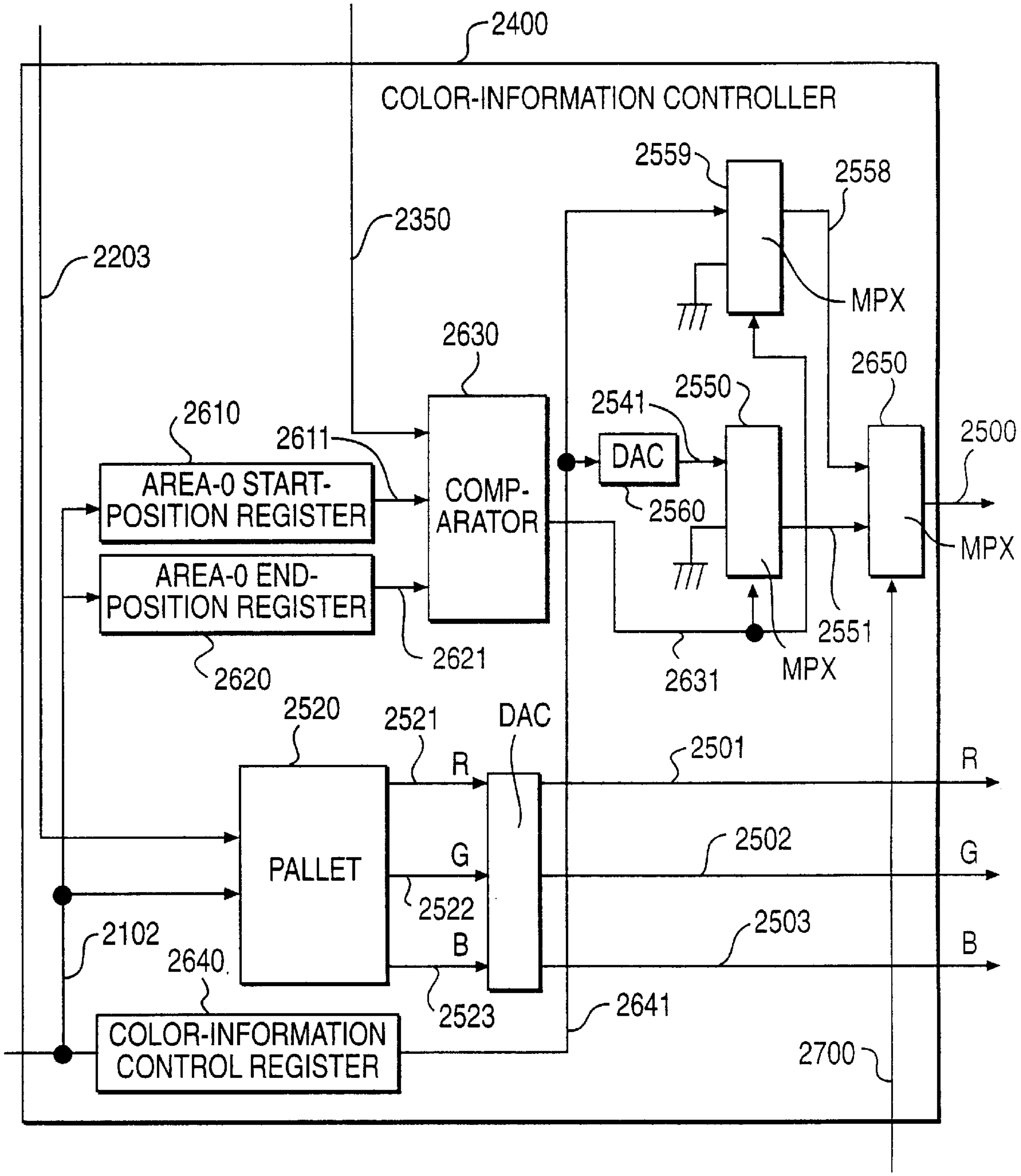
FIG. 32 is a diagram showing the internal configuration of the color-information controller employed in the second embodiment.

FIG. 32 is a diagram showing the internal configuration of the color-information controller 2400 employed in the present embodiment. As shown in the figure, the color-information controller 2400 is provided with area start- and end-position registers serving as storage means, in which is set the area-attribute information 251 for changing a display attribute of a specific area on the display screen of the image displaying apparatus 110, and a color-information control register 2640.

It should be noted that even though only the area-0 start-position register 2610 and an area-0 end-position register 2620 are shown in the figure, the area start- and end-position registers for the areas 1 to 3 are also provided in the same way as the area 0.

The area-attribute information 251 coming from the CPU 101 is set in the area-0 start- and end-position registers 2610 and 2620, as well as the color-information control register 2640 by a data signal 2102 coming from the CPU interface controller 2100.

Corresponding to the area judging means 2600, a comparator 2630 compares position information 2350 coming from the CRT controller 2300 with data 2611 set in the area-0 start-position register 2610 and data 2621 set in the area-0 end-position register 2620, and outputs a control signal 2631 representing a result of the comparison.

In the color-information controller 2400, data 2641 set in the color-information register 2640 is supplied to a multiplexer 2559 and a DAC 2560. An analog signal 2541 resulting from digital-to-analog conversion of the data 2641 by the DAC 2560 is supplied to a multiplexer 2550. Control signals 2558 and 2551 output by the multiplexers 2559 and 2550 are supplied to a multiplexer 2650 for generating an attribute control signal 2500. The operations of the multiplexers 2559 and 2550 are controlled by the control signal 2631 output by the comparator 2630.

The multiplexer 2550 is controlled by the control signal 2631 to select the analog signal 2541 resulting from digital-to-analog conversion of the data 2641 set in the color-information register 2640 by the DAC 2560, if the position information 2350 of the CRT controller 2300 is within the range of the area 0 (that is, if the area information in the X direction is equal to or greater than X0S and equal to or smaller than X0E, whereas the area information in the Y direction is equal to or greater than Y0S and equal to or smaller than Y0E), outputting the analog signal 2541 as the control signal 2551. Otherwise, the multiplexer 2550 outputs "0".

Similarly, the multiplexer 2559 is controlled by the control signal 2631 to select the data 2641 set in the color-information register 2640 if the position information 2350 of the CRT controller 2300 is within the range of the area 0, (that is, if the area information in the X direction is equal to or greater than X0S and equal to or smaller than X0E, whereas the area information in the Y direction is equal to or greater than Y0S and equal to or smaller than Y0E), outputting the data 2641 as the control signal 2558. Otherwise, the multiplexer 2550 outputs "0".
The multiplexer 2650 selects one of the control signals 2558 and 2551 in accordance with a control signal 2700, and outputs the selected control signal as an attribute control signal 2500. The control signal 2700 can be fixed in advance or controlled in dependence on the type of the CRT display unit 322 connected to the information processing apparatus 100.

Figure 33:
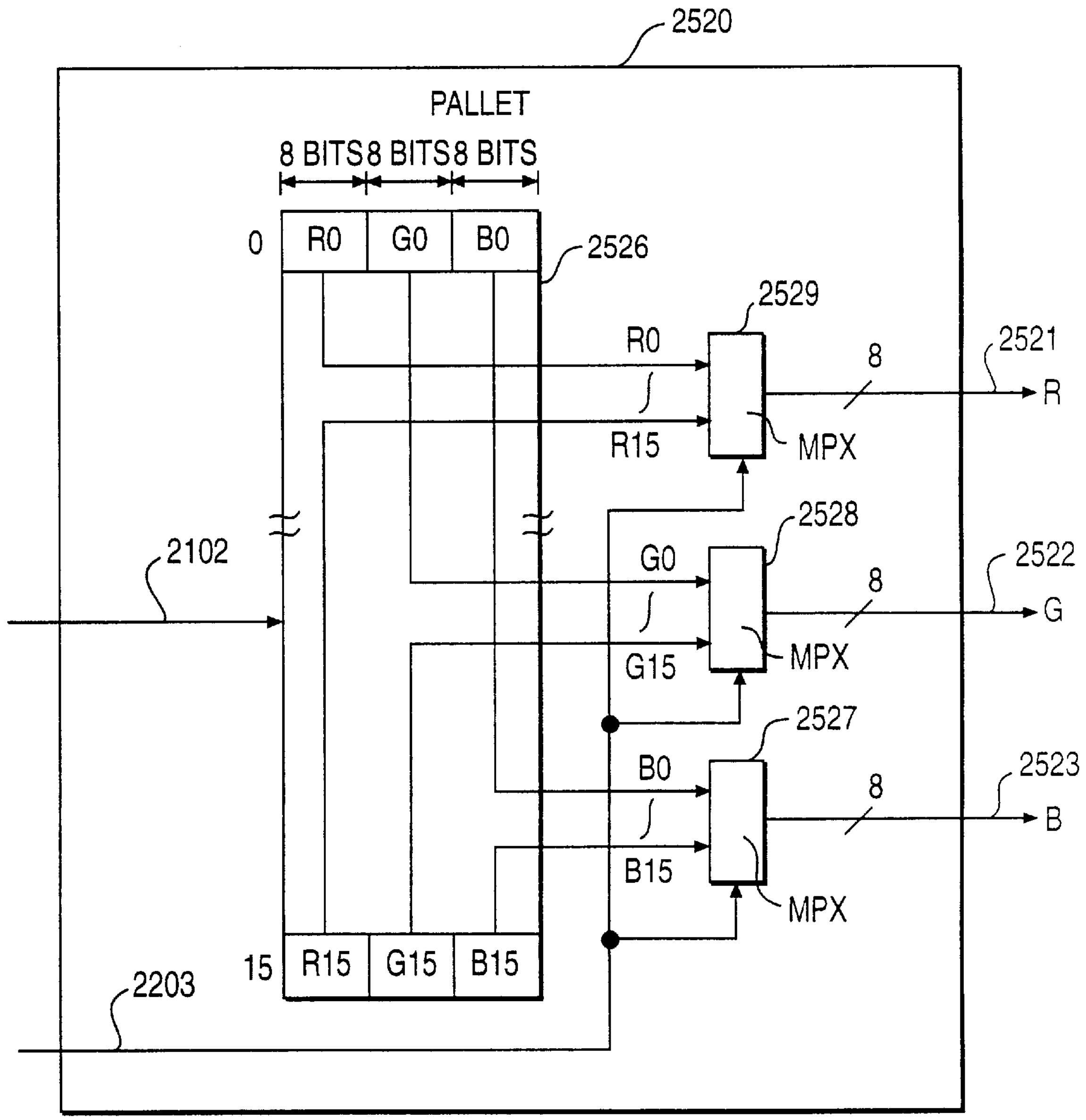
FIG. 33 is a diagram showing the internal configuration of a pallet employed in the second embodiment.

FIG. 33 is a diagram showing the internal configuration of a pallet 2520 used in the present embodiment. As shown in the figure, the pallet 2520 includes a pallet RAM 2526 for storing data to be displayed in eight-bit blocks. The data to be displayed comprises 16 blocks of red data R (R0 to R15), 16 blocks of green data G (G0 to G15), and 16 blocks of blue data B (B0 to B15). Each data block is set by a data signal 2102 generated by the CPU interface controller 2100.

A multiplexer 2529 selects one of the red-data blocks R0 to R15 in accordance with four-bit raw display data 2203, outputting the selected block as digital data 2521. Similarly, a multiplexer 2528 selects one of the green-data blocks G0 to G15 in accordance with the four-bit raw display data 2203, outputting the selected block as digital data 2522, and a multiplexer 2527 selects one of the blue-data blocks B0 to B15 in accordance with the four-bit raw display data 2203, outputting the selected block as digital data 2523.

Figure 34:
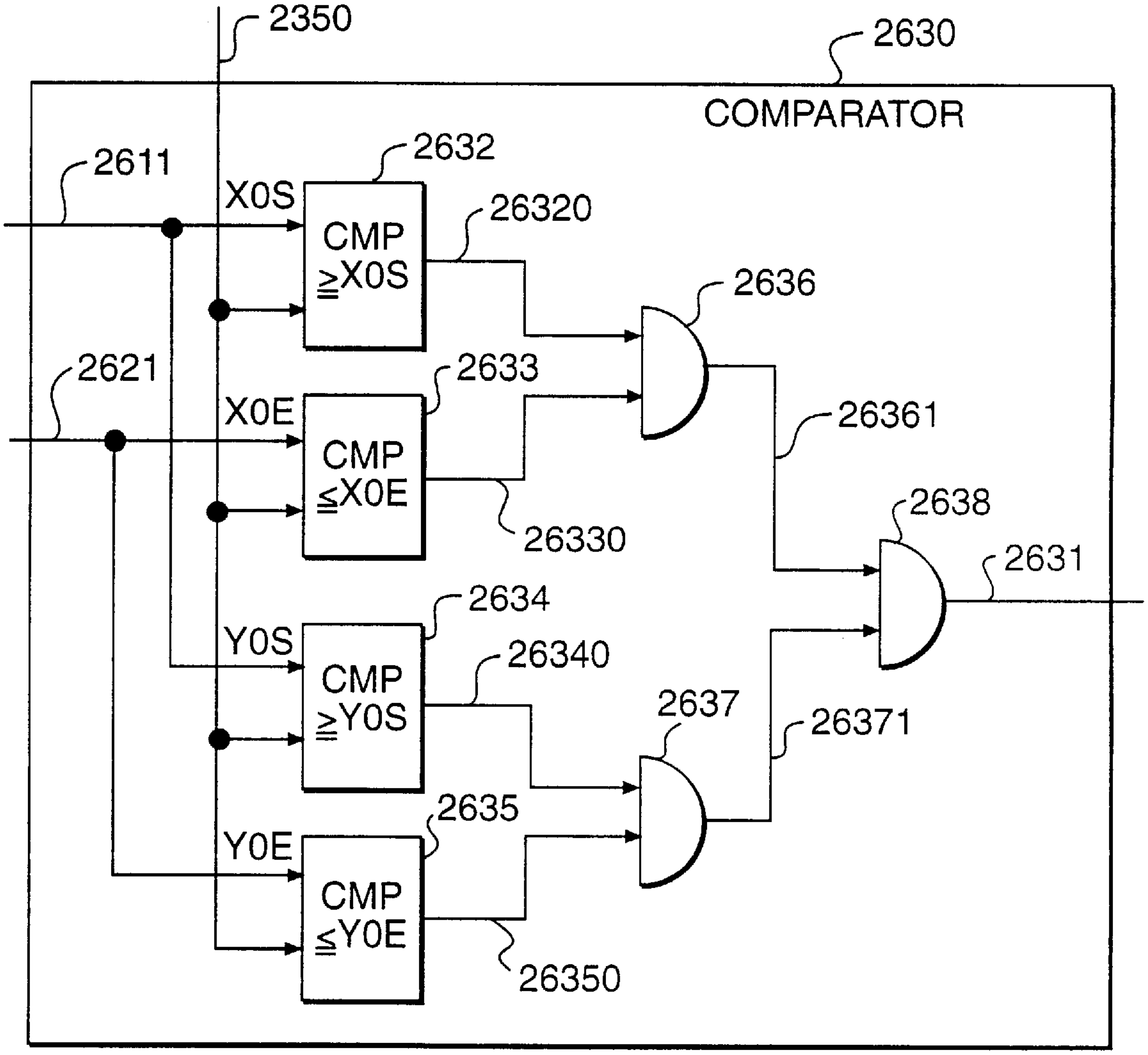
FIG. 34 is a diagram showing the internal configuration of a comparator employed in the second embodiment.

FIG. 34 is a diagram showing the internal configuration of the comparator 2630. As shown in the figure, the comparator 2630 includes a comparator 2632 for comparing X-direction data of the position information 2350 with the contents X0S of the area-0 start-position register 2610. If the X-direction data of the position information 2350 is equal to or greater than the contents X0S of the area-0 start-position register 2610, the comparator 2632 sets a signal 26320 output thereby at "1". Otherwise, the comparator 2632 sets the signal 26320 at "0".

In addition, the comparator 2630 also includes a comparator 2633 for comparing the X-direction data of the position information 2350 with the contents X0E of the area-0 end-position register 2620. If the X-direction data of the position information 2350 is equal to or smaller than the contents X0E of the area-0 end-position register 2620, the comparator 2633 sets a signal 26330 output thereby at "1". Otherwise, the comparator 2633 sets the signal 26330 at "0".

Further, the comparator 2630 also includes a comparator 2634 for comparing the Y-direction data of the position information 2350 with the contents Y0S of the area-0 start-position register 2610. If the Y-direction data of the position information 2350 is equal to or greater than the contents Y0S of the area-0 start-position register 2610, the comparator 2634 sets a signal 26340 output thereby at "1". Otherwise, the comparator 2634 sets the signal 26340 at "0".

Furthermore, the comparator 2630 includes a comparator 2635 for comparing the Y-direction data of the position information 2350 with the contents Y0E of the area-0 end-position register 2620. If the Y-direction data of the position information 2350 is equal to or smaller than the contents Y0E of the area-0 end-position register 2620, the comparator 2632 sets a signal 26350 output thereby at "1". Otherwise, the comparator 2632 sets the signal 26350 at "0".

An AND gate 2636 employed in the comparator 2630 sets a signal 26361 output thereby at "1" when both the signals 26320 and 26330 are "1", that is, when the X-direction data of the position information 2350 is equal to or greater than X0S and equal to or smaller than X0E.

Similarly, an AND gate 2637 employed in the comparator 2630 sets a signal 26371 output thereby at "1" when both the signals 26340 and 26350 are "1", that is, when the Y-direction data of the position information 2350 is equal to or greater than Y0S and equal to or smaller than Y0E.

An AND gate 2638 employed in the comparator 2630 sets a control signal 2631 output thereby at "1" when both the signals 26361 and 26371 are "1", that is, when the X-direction data of the position information 2350 is equal to or greater than X0S and equal to or smaller than X0E and, at the same time, the Y-direction data of the position information 2350 is equal to or greater than Y0S and equal to or smaller than Y0E. That is to say, only when the X-direction data of the position information 2350 coming from the CRT controller 2300 is equal to or greater than X0S and equal to or smaller than X0E and, at the same time, the Y-direction data of the position information 2350 is equal to or greater than Y0S and equal to or smaller than Y0E, is the control signal 2631 set to "1".

Figure 35:
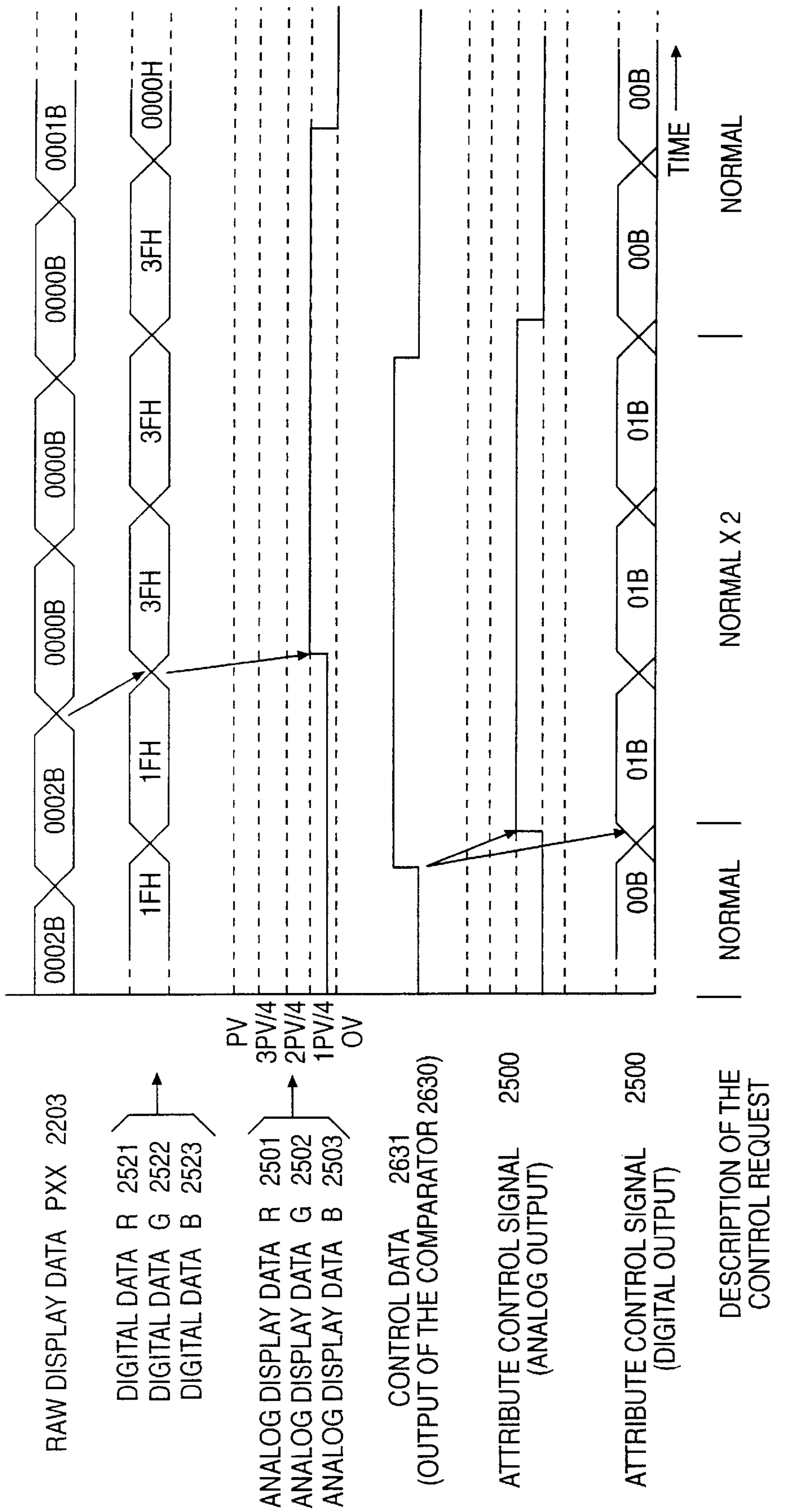
FIG. 35 is a timing chart of operations of the color-information controller employed in the second embodiment.

FIG. 35 is a timing chart for the operations carried out by the color-information controller 2400 employed in the present embodiment. As shown in the figure, in the operation of the color-information controller 2400, the attribute control signal 2500 is output in synchronization with the pieces of analog display data 2501 to 2503. In the CRT display unit 322, it is possible to adjust display attributes such as the contrast by using the pieces of analog display data 2501 to 2503 and the attribute control signal 2500. In addition, other display attributes, such as the brightness, the chromaticity, the γ characteristic, and the RGB levels can also be adjusted.

In this way, a display attribute of any arbitrary area on the display screen of the image displaying apparatus can be controlled by using the area-0 start-position register 2610, the area-0 end-position register 2620, and the color-information control register 2640.

So far, the image displaying system implemented by the present embodiment has been explained by focusing only on the area 0. It should be noted that display attributes of a plurality of arbitrary areas 1, 2, and 3 can also each be controlled by using an area start-position register, an area end-position register, and the color-information control register 2640, in the same way as the area 0.

Figure 36:
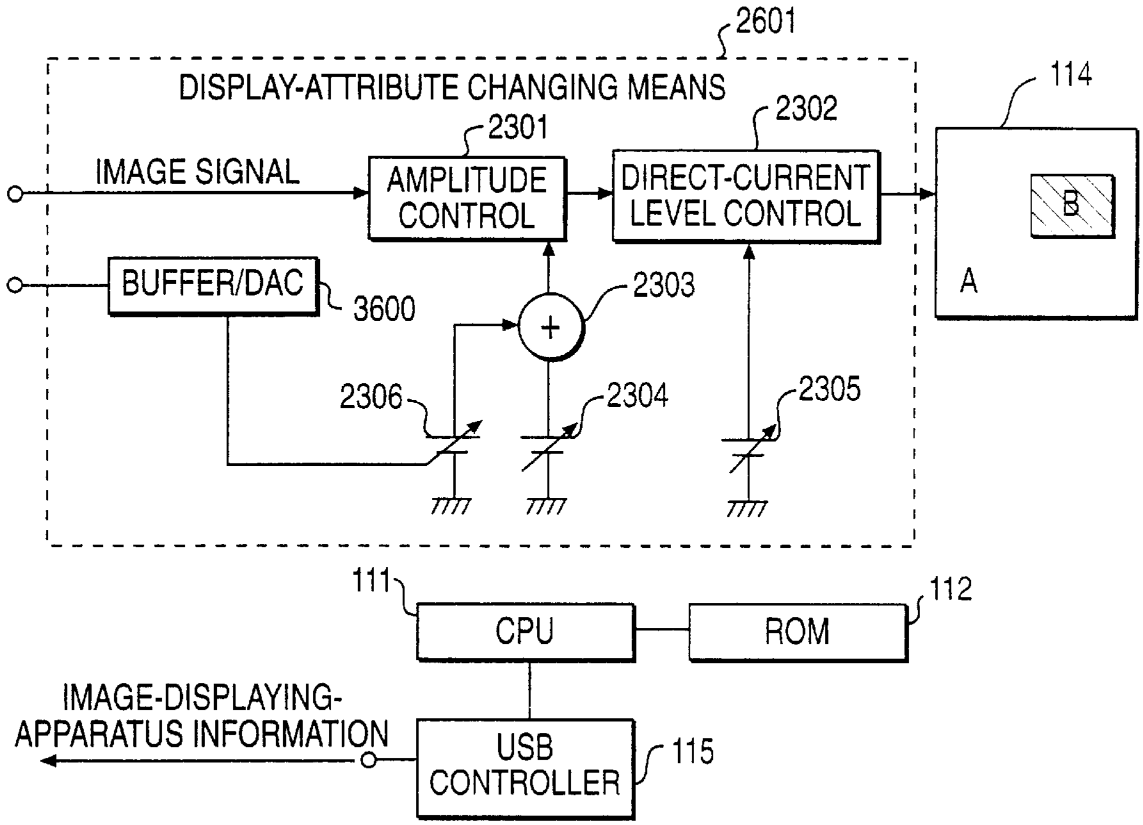
FIG. 36 is a diagram showing a preferred implementation of the image displaying apparatus provided by the second embodiment.

FIG. 36 is a diagram showing a preferred implementation of the image displaying apparatus 110 provided by the present embodiment. More particularly, the figure shows a preferred implementation of a display-attribute changing means 2601 employed in the image displaying apparatus 110 for changing a display attribute of an image signal on the image-displaying apparatus side. As shown in the figure, the attribute control signal 2500 transmitted from the information processing apparatus 100 by way of a buffer/DAC 3600 is supplied to the variable power supply 2306. The variable power supply 2306 is controlled by the attribute control signal 2500.

When the attribute control signal 2500 for a specific area on a display screen of the image displaying apparatus 110, in which data is to be displayed, is received from the information processing apparatus 100, the display-attribute changing means 2601 employed in the image displaying apparatus 110 changes a display attribute of only the specific area. For example, the display-attribute changing means 2601 increases the contrast of the image B.

As described above, according to the image displaying apparatus implemented by the present embodiment, the information processing apparatus 100 determines data to be displayed in a specific area on a display screen of the image displaying apparatus 110, transmitting an image signal and the attribute control signal 2500 for the image signal to the image displaying apparatus 110, whereby a display attribute of the data to be displayed is changed. As a result, processing to modify a display attribute of a specific area on a display screen of the image displaying apparatus 110 can be distributed among the information processing apparatus 100 and the image displaying apparatus 110.

Third Embodiment

The following is a description of an image displaying system implemented by a third embodiment of the invention. In this third embodiment, after the attribute information is developed and stored as attribute data, the data to be displayed and the attribute data for the data to be displayed are read out from the display memory unit and transferred from the information processing apparatus to the image displaying apparatus for display of the data to be displayed in the specific area, by modifying a display attribute of the specific area.

Figure 37:
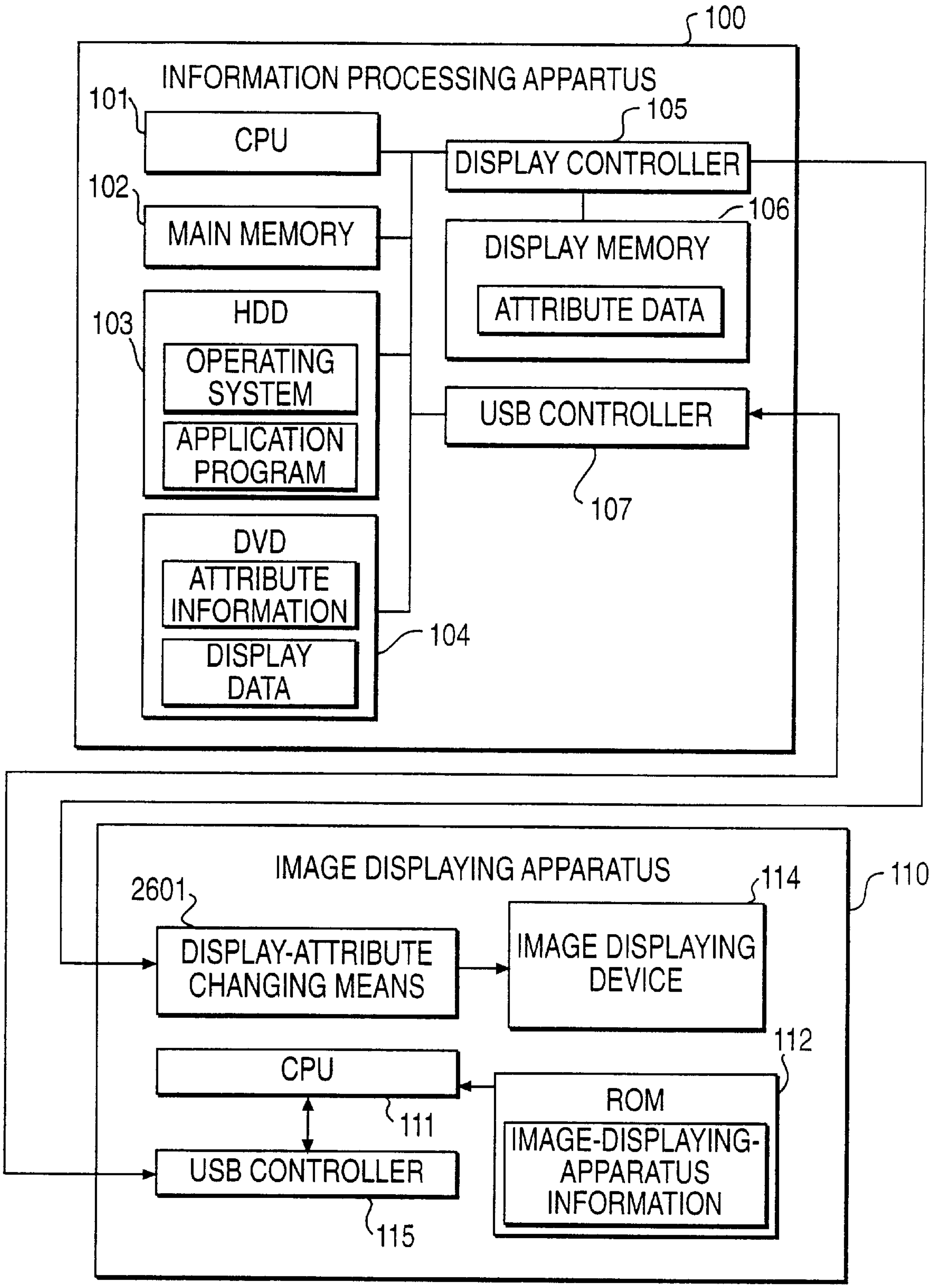
FIG. 37 is a diagram schematically showing the configuration of the image displaying system implemented by a third embodiment of the invention.

FIG. 37 is a diagram showing the configuration of the image displaying system implemented by the present embodiment. As shown in the figure, the image displaying system comprises an information processing apparatus 100 provided with a display memory unit 106 for storing data to be displayed and attribute data, and an image displaying apparatus 110 having a display-attribute changing means 2601 for changing a display attribute of an image signal. The image displaying apparatus 110 is connected to the information processing apparatus 100.

In the image displaying system implemented by the present embodiment, the display controller 105 employed in the information processing apparatus 100 reads out data to be displayed and attribute data from the display memory unit 106, transmitting an image signal and an attribute control signal 2500 from the information processing apparatus 100 to the image displaying apparatus 110. In the image displaying apparatus 110, the data is displayed after the display-attribute changing means 2601 changes the display attribute.

The CPU 101 employed in the image processing apparatus 100 controls the entire information processing apparatus 100. More specifically, the CPU 101 controls the information processing apparatus 100 as a whole by actually interpreting and executing an application program 200, an operating system 210, and a group of programs such as a USB device driver 230 and an image displaying device driver 240, which are loaded into the main memory unit 102.

In addition, the information processing apparatus 100 includes an HDD 103 for storing software such as the application program 200, the operating system 210, a GUI program, an API program, the USB device driver 230, and the image displaying device driver 240. The information processing apparatus 100 is also provided with a DVD 104 for storing texts as well as display data of static and dynamic images to be displayed on the image displaying apparatus 110.

Further, the information processing apparatus 100 also has a display controller 105 and a display memory unit 106. The display controller 105 controls a write operation for writing data to be displayed on the image displaying apparatus 110 into the display memory unit 106, and a read operation for reading out the data from the display memory unit 106 as an image signal to be transmitted to the image displaying apparatus 110. An attribute control signal 2500 for modifying a display attribute contained in the image signal is generated from attribute data which has been developed in the display memory unit 106 on the basis of area-attribute information 251. The attribute control signal 2500 is also transmitted to the image displaying apparatus 110.

The display memory unit 106 employed in the information processing apparatus 100 includes a storage portion in which attribute information in a specific area on a display screen of the image displaying apparatus 110 is developed. The specific area is indicated by the area-attribute information 251 for changing a display attribute of the specific area.

The information processing apparatus 100 is also provided with a USB controller 107 for transmitting an inquiry signal to the image displaying apparatus 110 and receiving a report signal, in response to the inquiry signal, from the image displaying apparatus 110.

The image displaying apparatus 110 comprises a CPU 111 and a ROM 112. The CPU 111 controls the image displaying apparatus 110 as a whole by interpretation and execution of a control program stored in a storage area of the ROM 112. It should be noted that the control program itself is not shown in the figure.

The ROM 112 employed in the image displaying apparatus 110 stores information on the image displaying apparatus 110. This information indicates whether the image displaying apparatus 110 has a display-attribute changing means 2601, (that is, whether the image displaying apparatus 110 has the capability of displaying an image on a specific area on the display screen thereof by changing a display attribute of the specific area). The display-attribute changing means 2601 changes a display attribute of an image signal input to the image displaying apparatus 110 in accordance with an attribute control signal.

In addition, the image displaying apparatus 110 also employs a USB controller 115, which serves as a counterpart of the USB controller 107 employed in the information processing apparatus 100. More specifically, the USB controller 115 receives an inquiry signal from the information processing apparatus 100 and transmits a report signal, in response to the inquiry signal, to the information processing apparatus 100. The inquiry signal is used to determine whether the image displaying apparatus 110 can display an image on a specific area on the display screen thereof by changing a display attribute of the specific area in accordance with USB standards.

Figure 38:
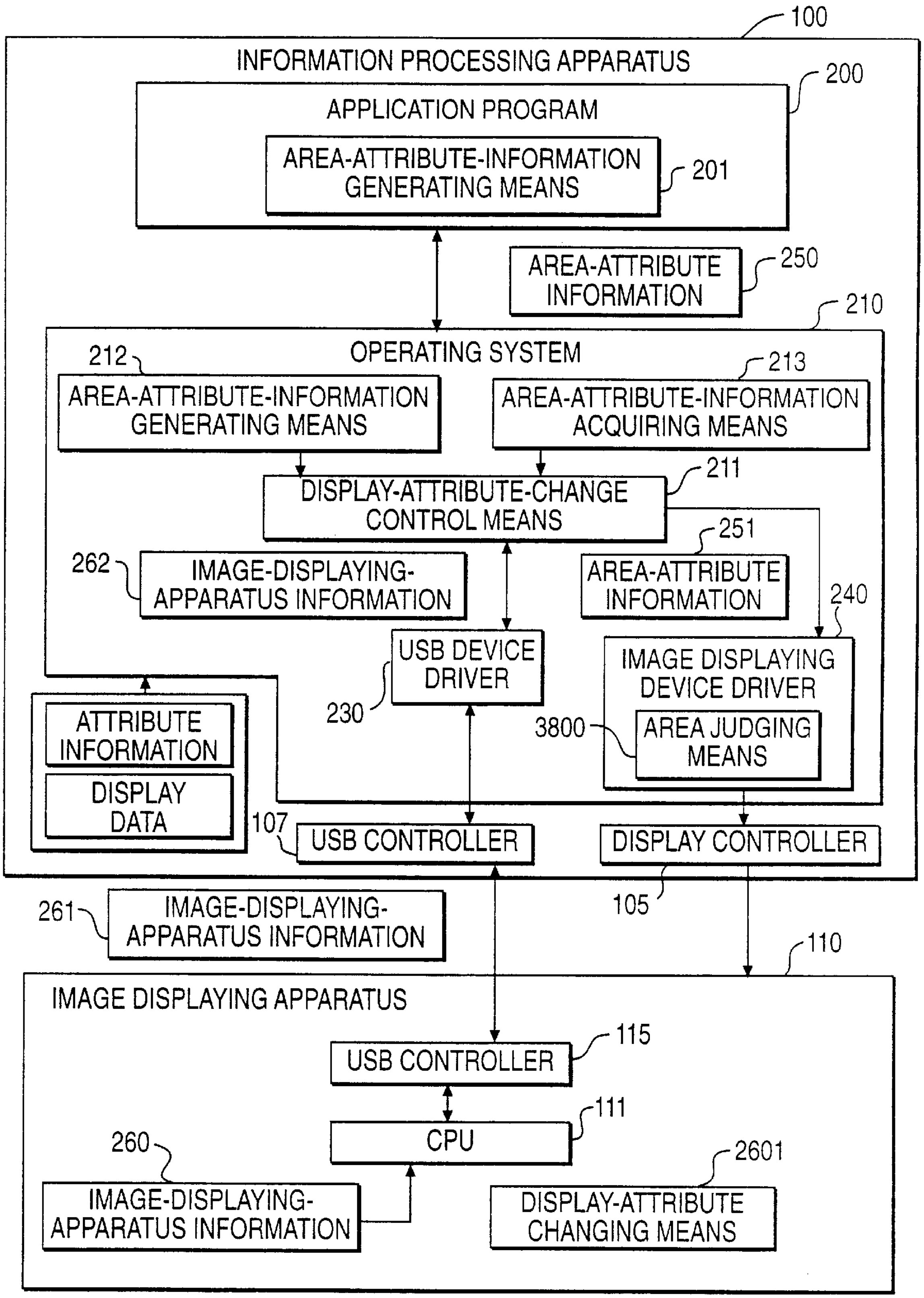
FIG. 38 is a diagram showing an outline of processing carried out by the image displaying system implemented by the third embodiment.

FIG. 38 is a diagram showing an outline of a procedure carried out by the image displaying system implemented by the present embodiment. As shown in the figure, the image displaying system has an image displaying device driver 240 and an area judging means 3800 in the information processing apparatus 100, in addition to a display-attribute changing means 2601 for changing a display attribute in accordance with an image signal and an attribute control signal in the image displaying apparatus 110. The area judging means 3800 and the display-attribute changing means 2601 correspond to the specific-area display-attribute changing means 113.

The application program 200 in the information processing apparatus 100 comprises a GUI, which is visible to the operator who operates the information processing apparatus 100, and which serves as an interface with the operating system 210.

The operating system 210 in the information processing apparatus 100 is a basic program serving as the nucleus of the image displaying system. More specifically, the operating system 210 connects the application program 200 with program members directly controlling hardware such as a USB device driver 230 and the image displaying device driver 240.

The image displaying device driver 240 in the information processing apparatus 100 is positioned between the operating system 210 and hardware members such as the device controller 105 and the display memory unit 106. More specifically, the image displaying device driver 240 is a program which implements a draw instruction issued by the operating system 210 by reading out and writing information from and into internal registers of the display controller 105 and the display memory unit 106. It should be noted that the internal registers themselves are not shown in the figure.

The application program 200 is provided with an area-attribute-information generating means 201. When there is detected a need to change a display attribute of a specific area on the display screen of the image displaying apparatus 110, area-attribute information 250 for changing the display attribute of the specific area is generated in the application program 200 and passed to the operating system 210 by the area-attribute-information generating means 201.

The operating system 210 comprises display-attribute-change control means 211, area-attribute-information generating means 212, and area-attribute-information acquiring means 213. The display-attribute-change control means 211 controls the entire display-attribute-change processing of the information processing apparatus 100 by making an inquiry about an ability of the image displaying apparatus 110 to display an image on a specific area on the display screen thereof by changing a display attribute of the specific area and receiving a response to the inquiry. The area-attribute-information generating means 212 generates area-attribute information 251 in the operating system 210 when there is detected a need to change a display attribute of the specific area. The area-attribute-information acquiring means 213 acquires the area-attribute information 250 generated by the area-attribute-information generating means 201 of the application program 200.

In addition, the USB device driver 230 and the image displaying device driver 240 are included in the operating system 210. The USB device driver 230 converts area-attribute information 251 and image-displaying-apparatus information 260 into USB data packets and vice versa in accordance with USB standards, and exchanges image-displaying-apparatus information 261 between the information processing apparatus 100 and the image displaying apparatus 110. The image displaying device driver 240 stores data to be displayed in the display-memory unit 106.

The USB controller 107 is controlled by the USB device driver 230 so that the inquiry about the ability of the image displaying apparatus 110 to display an image on a specific area on its display screen by changing a display attribute of the specific area is transmitted from the USB controller 107 to the image displaying apparatus 110, whereas a report indicating the ability of the image displaying apparatus 110 to display such an image on a specific area on the display screen thereof is also received by the USB controller 107 in response to such an inquiry.

The area judging means 3800 employed in the image displaying device driver 240 forms a judgment as to whether display data stored in the display memory unit 106 is of a specific area, a display attribute of which is to be changed, on the display screen of the image displaying apparatus 110 based on the area-attribute information 251. If the display data stored in the display memory unit 106 is of such a specific area, the area judging means 3800 stores attribute data in a storage portion at a specific address in the display memory unit 106 associated with the data to be displayed. In the storage portion, the area-attribute information 251 for changing a display attribute of the specific area on the display screen of the image displaying apparatus 110 is developed.

It should be noted that, in the area-attribute information 250 and the image-displaying-apparatus information 260 of the image displaying system implemented by the present embodiment, information similar to that shown in Tables 1 to 4 can be used. In addition, as a communication means for exchanging the area-attribute information 250 and the image-displaying-apparatus information 260 between the information processing apparatus 100 and the image displaying apparatus 110, a non-USB means such as a DDC means can be used as is shown in the description of the first embodiment.

The following is a description of pieces of processing which are carried out by the application program 200 and the operating system 210 in the image displaying system implemented by the present embodiment when a display attribute of a specific area on a display screen of the image displaying apparatus 110 is changed. It should be noted that the initialization carried out by the operating system 210 is the same as that of the second embodiment.

Figure 39:
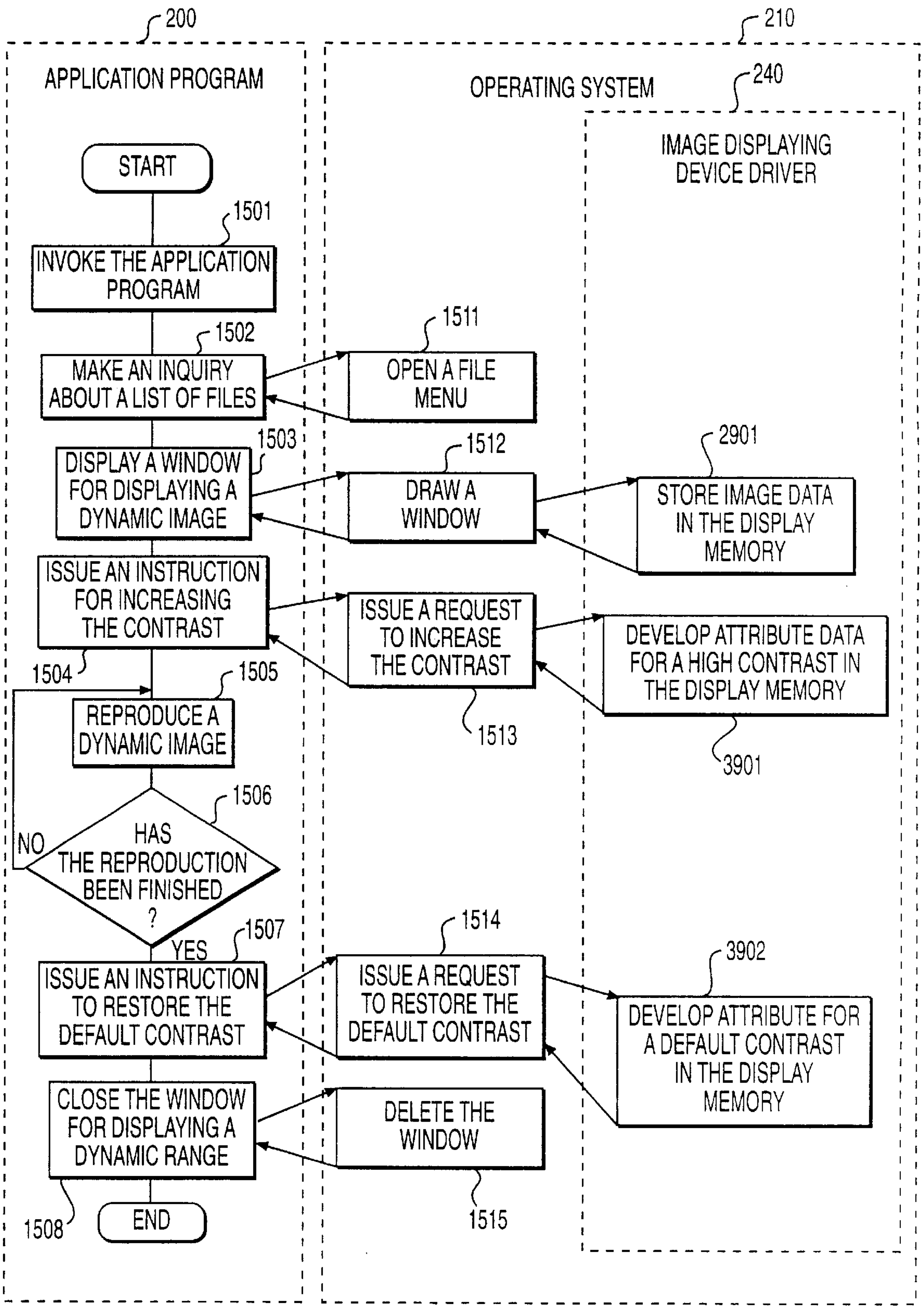
FIG. 39 is a flowchart showing a procedure of processing carried out by an application program to modify a display attribute in the third embodiment.

FIG. 39 is a flowchart showing a procedure carried out by the application program 200 in the present embodiment to modify a display attribute. The procedure carried out by the application program 200 is a series of operations to increase the contrast of a window for displaying a dynamic image reproduction of the dynamic-image data by the application program 200.

The procedure begins with a step 1501 at which the user invokes the application program 200 for reproducing the dynamic-image data. The flow then goes on to a step 1502 at which the application program 200 makes an inquiry to the operating system 210 about a list of files in a recording medium storing dynamic-image data.

In response to the inquiry, the operating system 210 opens a file menu at a step 1511. As the list of files storing dynamic-image data are displayed, the user selects a file from the list that the user wants to reproduce.

The flow then goes on to a step 1503 at which the application program 200 issues a draw instruction requesting the operating system 210 to display a window for displaying a dynamic image. At the request made by the application program 200, the operating system 210 requests the image displaying device driver 240 to display the window by using area information specified in the draw instruction, at a step 1512. As a result, the window is displayed on the image displaying apparatus 110 by the image displaying device driver 240 by storing the dynamic-image data in the display memory unit 106, at a step 2901.

The flow then proceeds to a step 1504 at which the area-attribute-information generating means 201 of the application program 200 issues a contrast-increasing instruction to the operating system 210, requesting the operating system 210 to increase the contrast of the window in which the dynamic image is to be displayed. More specifically, the area-attribute-information generating means 201 transfers area-attribute information 250 comprising area information specified when displaying the window and attribute information showing a contrast value of the dynamic data specified in advance as a run-time parameter, to the image displaying apparatus 110 through the operating system 210, in order to increase the contrast of the window in which the dynamic image is to be displayed.

At a step 1513, the display-attribute-change control means 211 of the operating system 210 receives the contrast-increasing instruction from the application program 200 by way of the area-attribute-information acquiring means 213. Receiving the instruction, the area-attribute-information acquiring means 213 references the attribute change flag set at initialization and, if the image displaying apparatus 110 is capable of changing a display attribute of a specific area on its display screen, area-attribute information 251 is supplied to the image displaying device driver 240, making a request to increase the contrast of the window for displaying a dynamic image to the image displaying device driver 240.

At the request described above, the area judging means 3800 of the image displaying device driver 240 determines the specific area for displaying dynamic-image data, develops attribute information indicating a contrast value of the specific area in the display memory unit 106 for the dynamic-image data, and stores the attribute data at a step 3901. The display controller 105 reads out the attribute data developed in the display memory unit 106, and transfers the attribute data to the image displaying apparatus 110 along with the dynamic-image data.

The flow then continues to a step 1505 at which the application program 200 reproduces the dynamic image on the specified window, the display attribute of which was modified to a high contrast value for the dynamic-image data. The flow then goes on to a step 1506 at which the application program examines whether the dynamic-image data has all been reproduced. If any dynamic-image data remains to be reproduced, the flow returns to the step 1505. If the dynamic-image data has all been reproduced, on the other hand, the flow proceeds to a step 1507.

After reproducing all the dynamic-image data, at the step 1507, the area-attribute-information generating means 201 of the application program 200 generates area-attribute information 250 for returning the display attribute of the window displaying the dynamic image to the default value, issuing a default-contrast restoring instruction to the operating system 210.

At a step 1514, the display-attribute-change control means 211 of the operating system 210 receives the default-contrast restoring instruction from the application program 200 by way of the area-attribute-information acquiring means 213. Receiving the instruction, area-attribute information 251 for restoring the display attribute to the default contrast is supplied to the image displaying device driver 240, making a request to the image displaying device driver 240 to carry out restoration of the display attribute to the default value (that is, to restore the display attribute of the specified window to the default contrast).

At the request described above, the image displaying device driver 240 develops attribute information indicating the default contrast value of the specific area in a storage portion of the display memory unit 106 for the dynamic-image data, stores the attribute data, and restores the contrast of the specified window to the default value, at a step 3902.

The flow then goes on to a step 1508 at which the application program 200 sends an instruction to the operating system 210 to close the window in which the dynamic image was displayed. Receiving the instruction, the operating system 210 deletes the window at the step 1515. As the window is deleted, the application program 200 terminates the procedure of reproducing the dynamic-image data.

In the image displaying system implemented by the present embodiment, attribute data resulting from development of attribute information stored in the color-information control register 2640 in the second embodiment is stored in the display memory unit 106 along with the corresponding data to be displayed. Representative layouts of the data to be displayed and the attribute data stored in the display memory unit 106 are a plane system like that shown in FIG. 40, and a packed-pixel system like that shown in FIG. 41.

Figure 40:
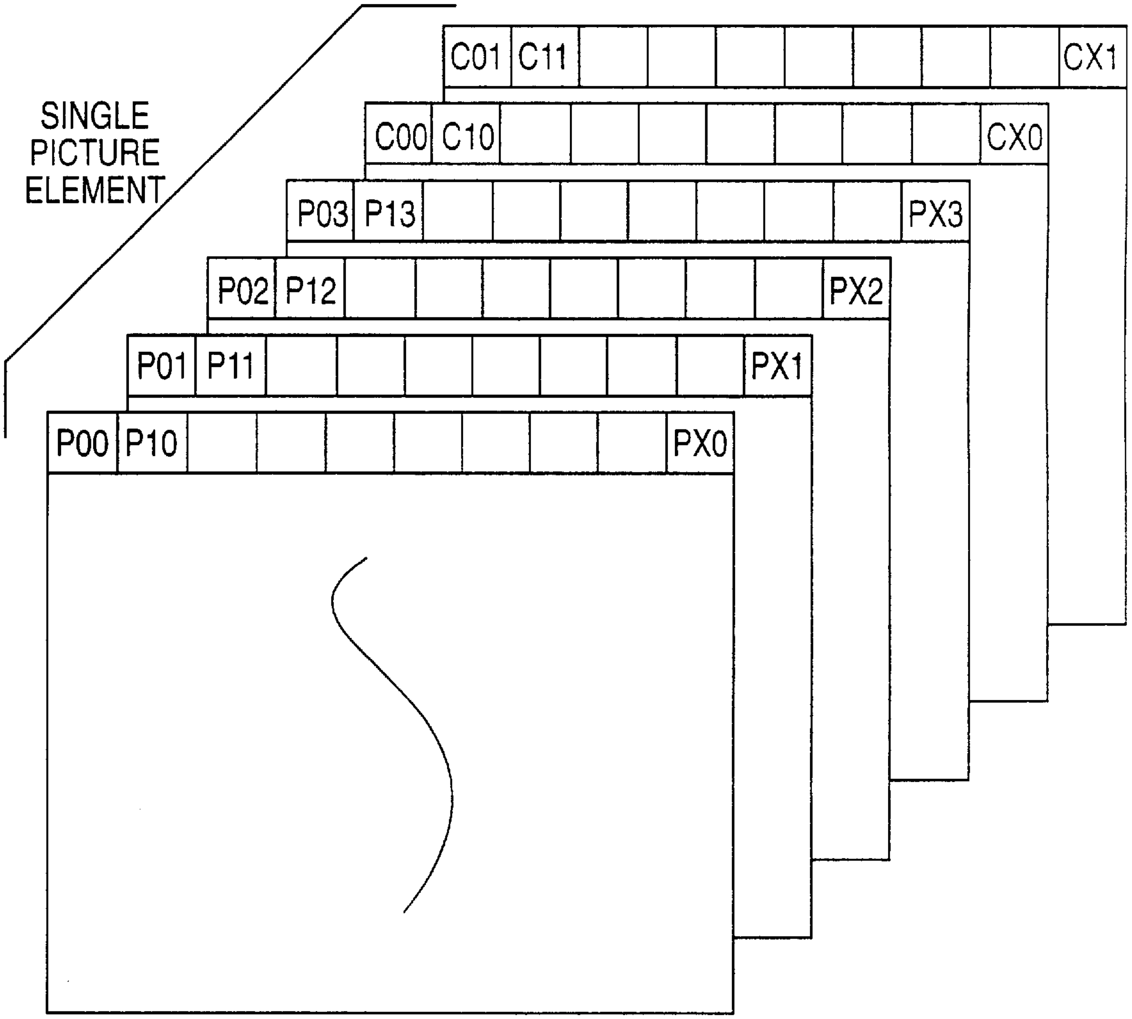
FIG. 40 is a diagram schematically showing the plane system of the layout of the data to be displayed and attribute data stored in a display memory unit in the third embodiment.

FIG. 40 is a diagram showing the plane system of the layout of the data to be displayed and the attribute data stored in the display memory unit 106 in the present embodiment. As shown in the figure, the display memory unit 106 has a storage portion in which display data and attribute data of a picture element are laid out in the depth direction. For example, four-bit display data (P00, P01, P02 and P03) and two-bit attribute data (C00 and C01) pertain to a picture element, whereas four-bit display data (P10, P11, P12 and P13) and two-bit attribute data (C10 and C11) pertain to an adjacent picture element. Thus, each picture element comprises a total of six bits.

Figure 41:
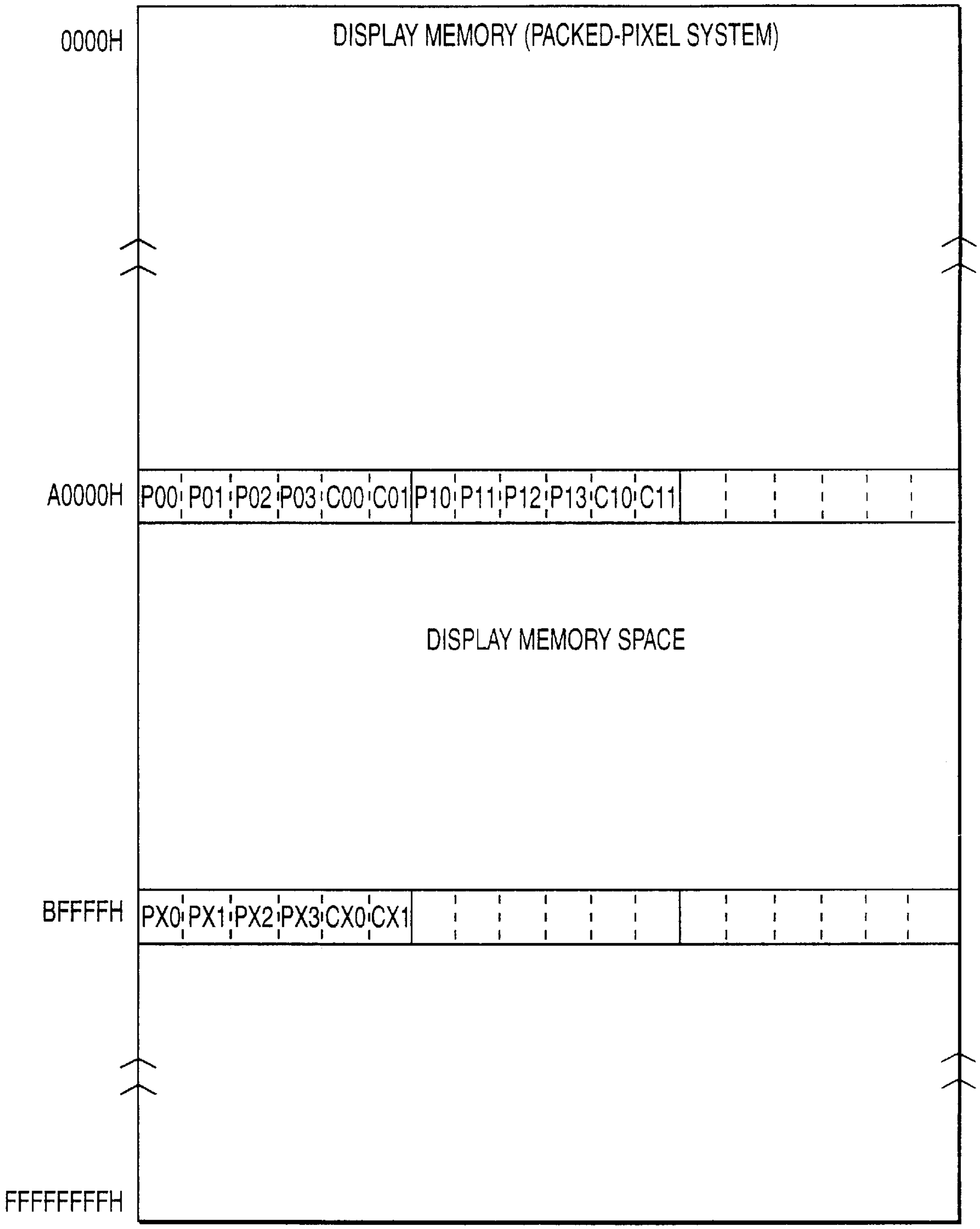
FIG. 41 is a diagram schematically showing the packed-pixel system of the layout of the data to be displayed and attribute data stored in a display memory unit in the third embodiment.

FIG. 41 is a diagram showing the packed-pixel system of the layout of the data to be displayed and the attribute data stored in the display memory unit 106 in the present embodiment. As shown in the figure, the display memory unit 106 has a storage portion in which display data and attribute data of a picture element are laid out contiguously in the width direction. For example, four-bit display data (p00, P01, P02 and P03) and two-bit attribute data (C00 and C01) pertain to a picture element, whereas four-bit display data (P10, P11, P12 and P13) and two-bit attribute data (C10 and C11) pertain to an adjacent picture element. Thus, each picture element comprises a total of six bits.

If the user wants to change display attributes, such as the contrast and the sharpness of the image displaying apparatus 110 (which may be either a CRT display unit 322 or a liquid-crystal display unit 323), display data (P00, P01 etc.) and attribute data (C00, C01 etc.) are developed in the memory display unit 106 by using the area judging means 3800 of the image displaying device driver 240 of the operating system 210.

Figure 42:
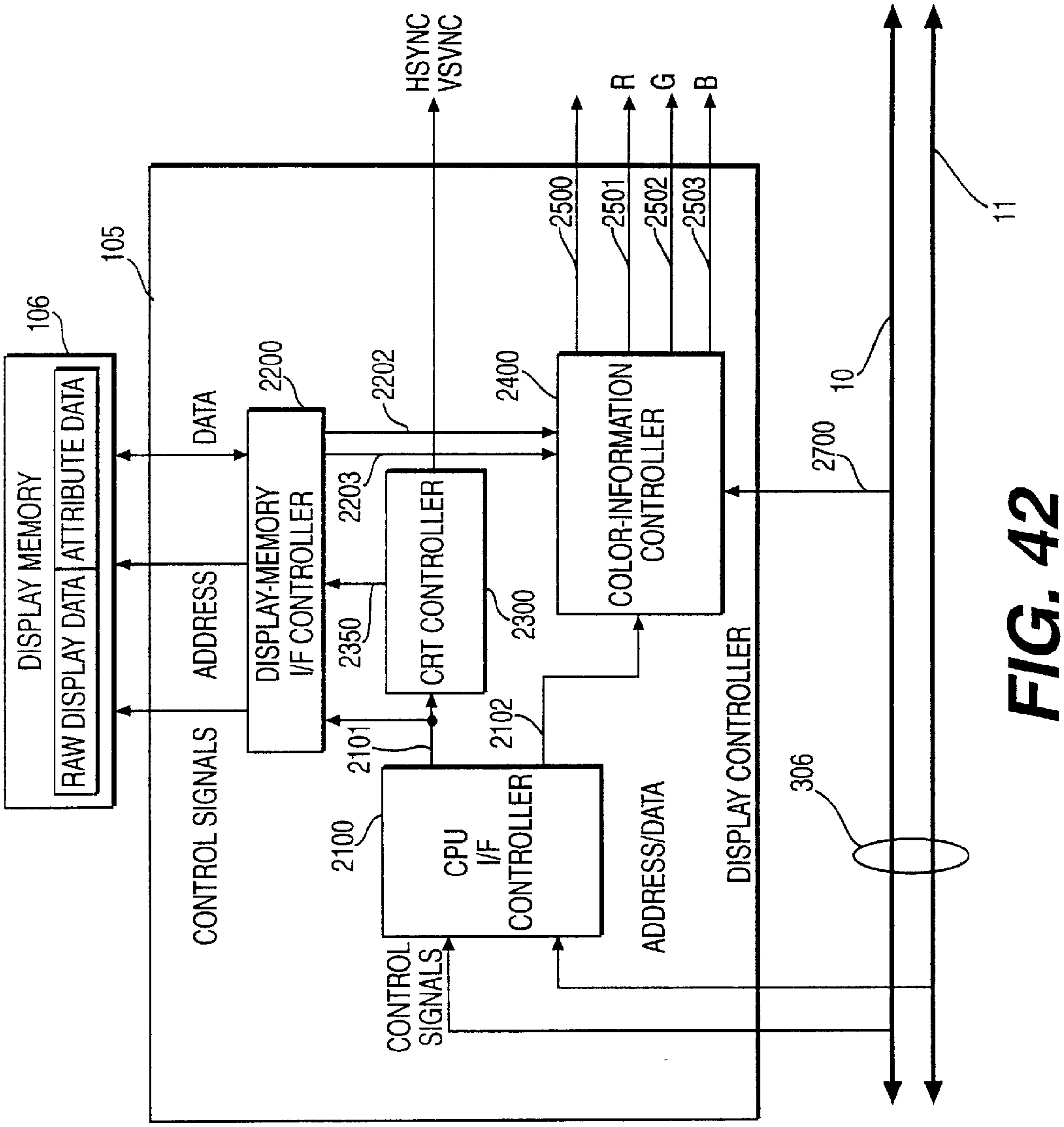
FIG. 42 is a diagram showing the internal configuration of a display controller employed by the third embodiment.

FIG. 42 is a diagram showing the internal configuration of the display controller 105 employed by the present embodiment. As shown in the figure, attribute data 2202 is input from the display memory unit 106 and attribute control information 2500 is generated by the color-information controller 2400. In the CRT display unit 322 (which serves as the image displaying apparatus 110 in the present example), it is possible to adjust display attributes, such as the contrast, by using the attribute control signal 2500. In addition, other display attributes, such as the brightness, the chromaticity, the γ characteristic, and the RGB levels, can be adjusted as well.

The attribute control signal 2500 generated from the color-information controller 2400 is transmitted to the image displaying apparatus 110 through an available signal line in a cable for transmitting an image signal. It should be noted that the attribute control signal can also be transmitted to the image displaying apparatus 110 through the USB controller 107.

The CRT controller 2300 generates a horizontal synchronization signal HSYNC and a vertical synchronization signal VSYNC. In addition, the CRT controller 2300 supplies position information 2350 for reading out data to be displayed to the display-memory interface controller 2200, and reads out raw display data 2203, data required in displaying data, and attribute data 2202 from the display memory unit 106.

Figure 43:
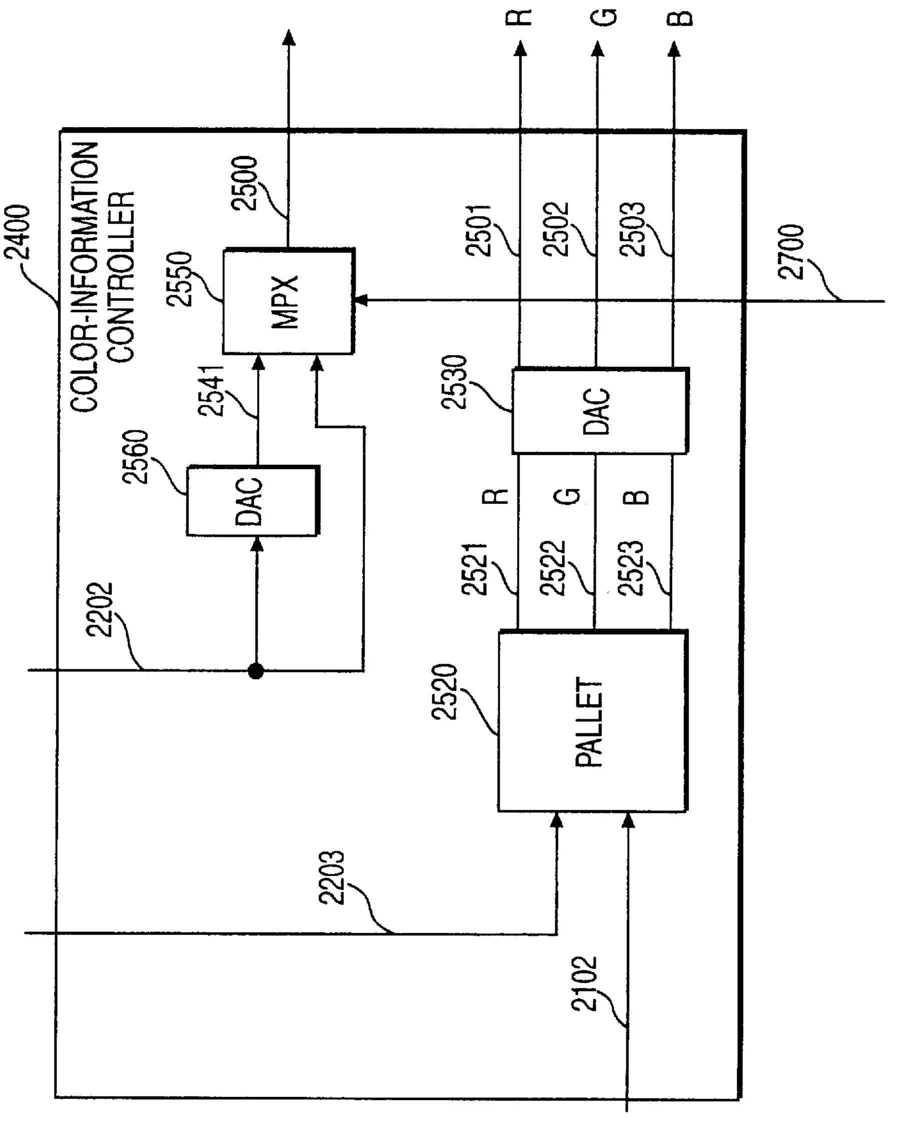
FIG. 43 is a diagram showing the internal configuration of the color-information controller employed in the third embodiment.

FIG. 43 is a diagram showing the internal configuration of the color-information controller 2400 employed in the present embodiment. As shown in the figure, in the color-information controller 2400, either an analog signal 2541 resulting from digital-to-analog conversion of the attribute data 2202 by a DAC 2560 or the attribute data 2202 is selected by a multiplexer 2550, which outputs the selected one as an attribute control signal 2500.

The multiplexer 2550 selects one of the signals in accordance with a control signal 2700. The control signal 2700 can be fixed in advance or controlled by information on the type of the CRT display unit 322 connected to the information processing apparatus 100.

Figure 44:
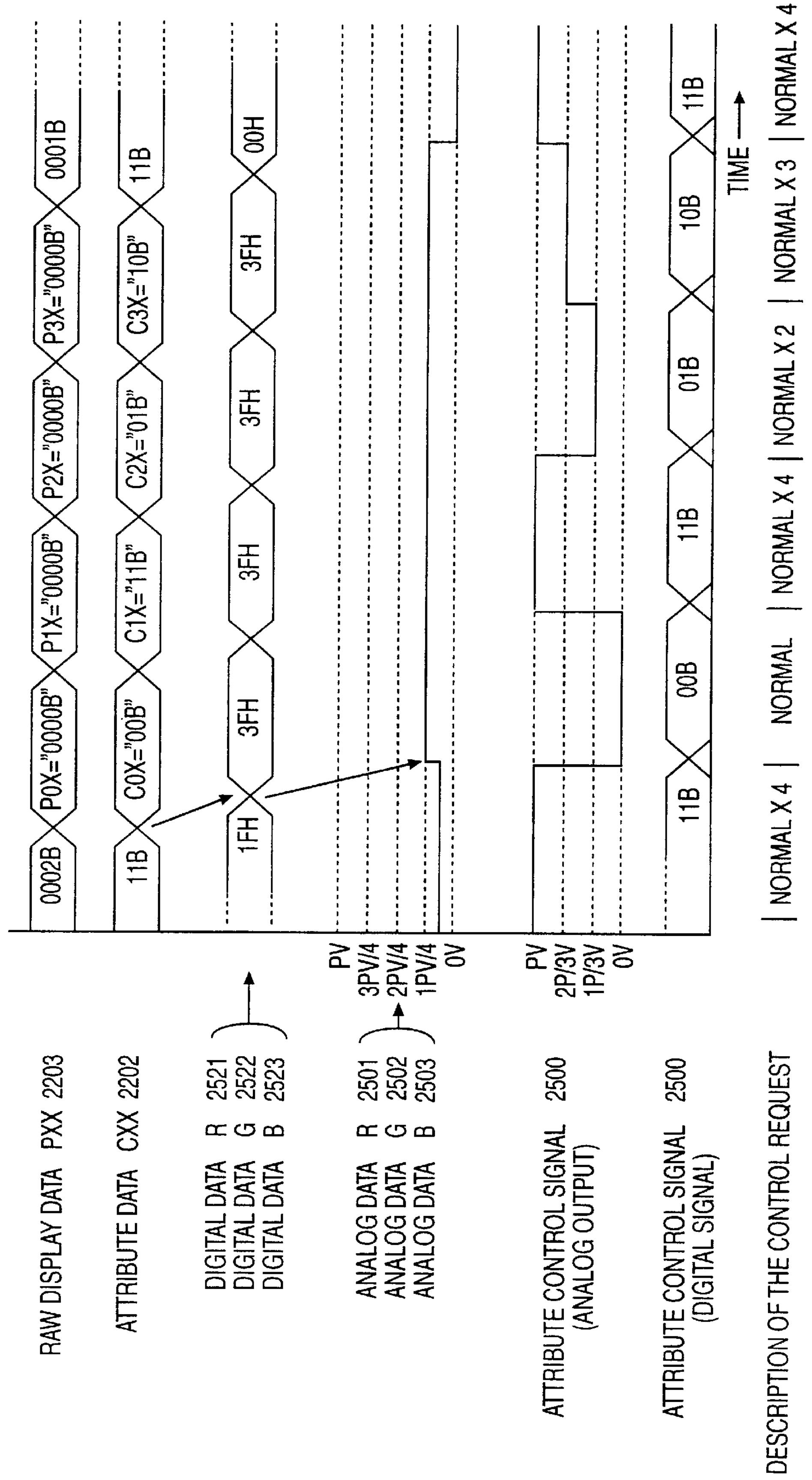
FIG. 44 is an operational timing chart of the color-information controller employed in the third embodiment.

FIG. 44 is an operational timing chart of the color-information controller 2400 employed in the present embodiment. As shown in the figure, in the operation of the color-information controller 2400, the attribute control signal 2500 is output in synchronization with the pieces of analog display data 2501 to 2503. In the CRT display unit 322 connected to the information processing apparatus 110, it is possible to adjust display attributes, such as the contrast, by using the pieces of analog display data 2501 to 2503 and the attribute control signal 2500. In addition, other display attributes, such as the brightness, the chromaticity, the γ characteristic, and the RGB levels, can also be adjusted.

In addition, in the image displaying system implemented by the present embodiment, an image displaying apparatus 110 like that of FIG. 36 provided by the second embodiment can be used as well.

As described above, according to the image displaying system implemented by the present embodiment, the information processing apparatus 100 forms a judgment as to whether or not data to be displayed exists in a specific area on a display screen of the image displaying apparatus 110, and attribute data 2202 for the data to be displayed is stored in the display memory unit 106, making it possible to control a display attribute for each pixel. In addition, since the data to be displayed and the attribute data 2202 are treated on the same column, the amount of restriction on the expression of the designer who creates a raw image of the data to be displayed is decreased.

In addition, according to the image displaying system implemented by the present embodiment, when the position at which data is displayed is moved, the attribute data 2202 for the displayed data is just moved along with the displayed data without the need to form a judgment as to whether the displayed data exists in a specific area on a display screen of the image displaying apparatus 110, making it possible to move at a high speed the data displayed in the specific area whose display attribute has been changed.

Further, according to the image displaying system implemented by the present embodiment, the attribute data 2202 for the data to be displayed is stored in a storage portion of the display memory unit 106. As a result, the attribute data 2202 can be stored without newly providing a storage means for the attribute data 2202.

Fourth Embodiment

The following is description of an image displaying system implemented by a fourth embodiment, wherein a display attribute of a specific area on a display screen of an image displaying apparatus is changed by an information processing apparatus, and an image signal with a changed display attribute is displayed by the image displaying apparatus.

Figure 45:
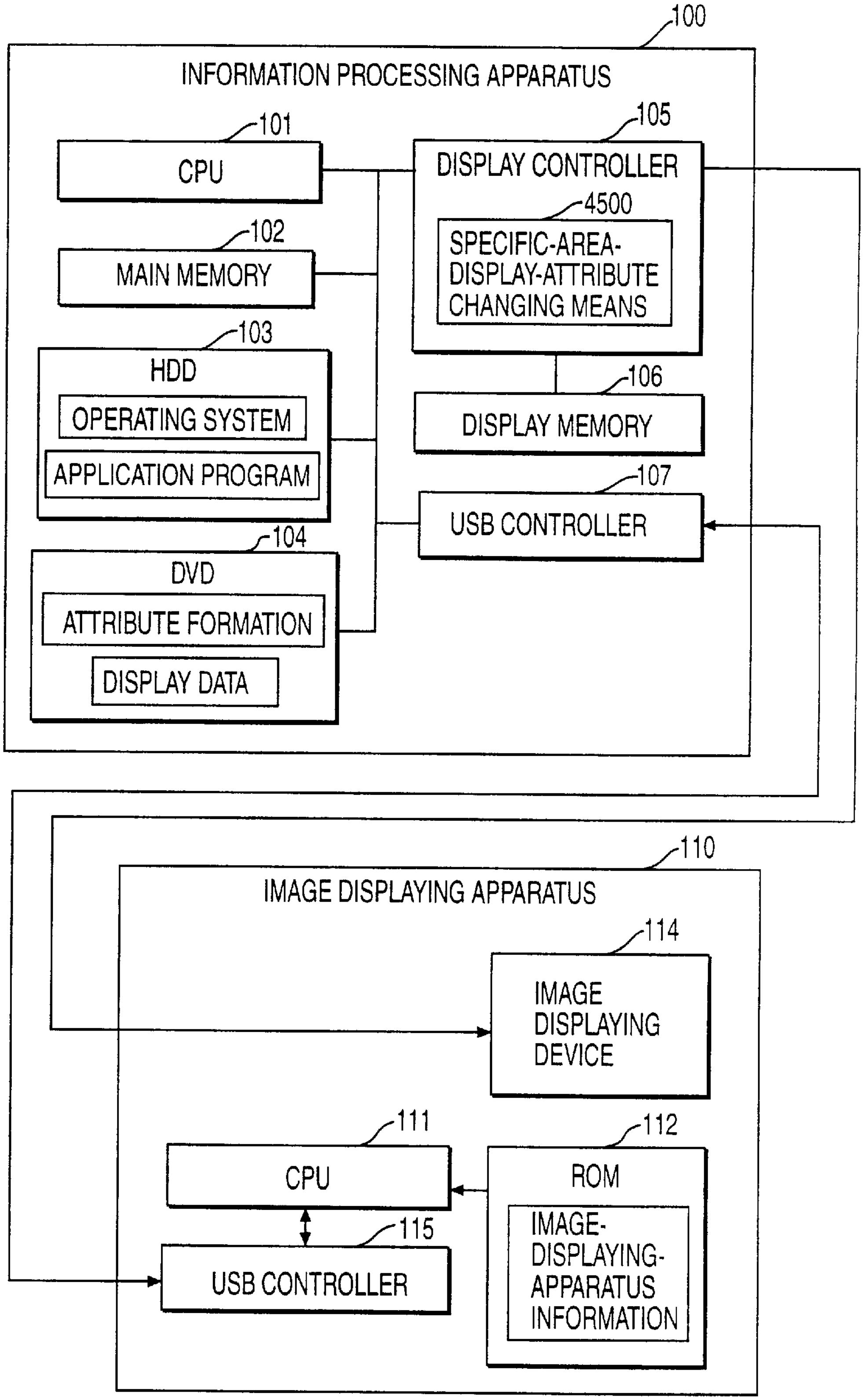
FIG. 45 is a diagram schematically showing the configuration of an image displaying system implemented by a fourth embodiment of the invention.

FIG. 45 is a diagram showing the configuration of an image displaying system implemented by the present embodiment. As shown in the figure, the image displaying system comprises an image displaying apparatus and an information processing apparatus 100 provided with a specific-area-display-attribute changing means 4500 for changing a display attribute of a specific area on a display screen of the image displaying apparatus 110, which has a modified display attribute in a specific area, and displaying the image signal. The image displaying apparatus 110 is connected to the information processing apparatus 100.

In the image displaying system implemented by the present embodiment, after the specific-area-display-attribute changing means 4500 employed in the display controller 105 has changed a display attribute for a specific area on a display screen of an image displaying apparatus 110, an image signal is transmitted from the information processing apparatus 100 to the image displaying apparatus 110 for displaying the image signal.

The CPU 101 employed in the image processing apparatus 100 controls the entire information processing apparatus 100. More specifically, the CPU 101 controls the information processing apparatus 100 as a whole by actually interpreting and executing an application program 200, an operating system 210, and a group of programs such as a USB device driver 230 and an image displaying device driver 240, which are loaded into the main memory unit 102.

In addition, the information processing apparatus 100 also includes an HDD 103 for storing software such as the application program 200, the operating system 210, a GUI program, an API program, the USB device driver 230, and the image displaying device driver 240. The information processing apparatus 100 is also provided with a DVD 104 for storing texts as well as display data of static and dynamic images to be displayed on the image displaying apparatus 110.

Further, the information processing apparatus 100 also has a display controller 105 and a display memory unit 106. The display controller 105 controls a write operation for writing data to be displayed on the image displaying apparatus 110 into the display memory unit 106, and controls a read operation for reading out the data from the display memory unit 106 as an image signal to be transmitted to the image displaying apparatus 110. The display controller 105 has a plurality of registers serving as a storage means in which area-attribute information 251 for changing a display attribute of a specific area on the display screen of the image displaying apparatus 110 is set. The display controller 105 transmits an image signal with a display attribute thereof changed on the basis of the area-attribute information 251 to the image displaying apparatus 110.

Finally, the information processing apparatus 100 is also provided with a USB controller 107 for transmitting an inquiry signal to the image displaying apparatus 110 and for receiving a report signal, in response to the inquiry signal, from the image displaying apparatus 110.

The image displaying apparatus 110 comprises a CPU 111 and a ROM 112. The CPU 111 is a processor for controlling the image displaying apparatus 110 as a whole by interpretation and execution of a control program stored in a storage area of the ROM 112. It should be noted that the control program itself is not shown in the figure.

The ROM 112 employed in the image displaying apparatus 110 stores information 260 on the image displaying apparatus 110. Such information indicates whether the image displaying apparatus 110 has a capability of displaying an image on a specific area on the screen thereof by changing a display attribute of the specific area.

In addition, the image displaying apparatus 110 also employs a USB controller 115, which serves as a counterpart of the USB controller 107 employed in the information processing apparatus 100. More specifically, the USB controller 115 receives the inquiry signal from the information processing apparatus 100 and transmits a report signal, in response to the inquiry signal, to the information processing apparatus 100. The inquiry signal is used to determine whether the image displaying apparatus 110 can display an image on a specific area on the display screen thereof by changing a display attribute of the specific area in accordance with USB standards.

Figure 46:
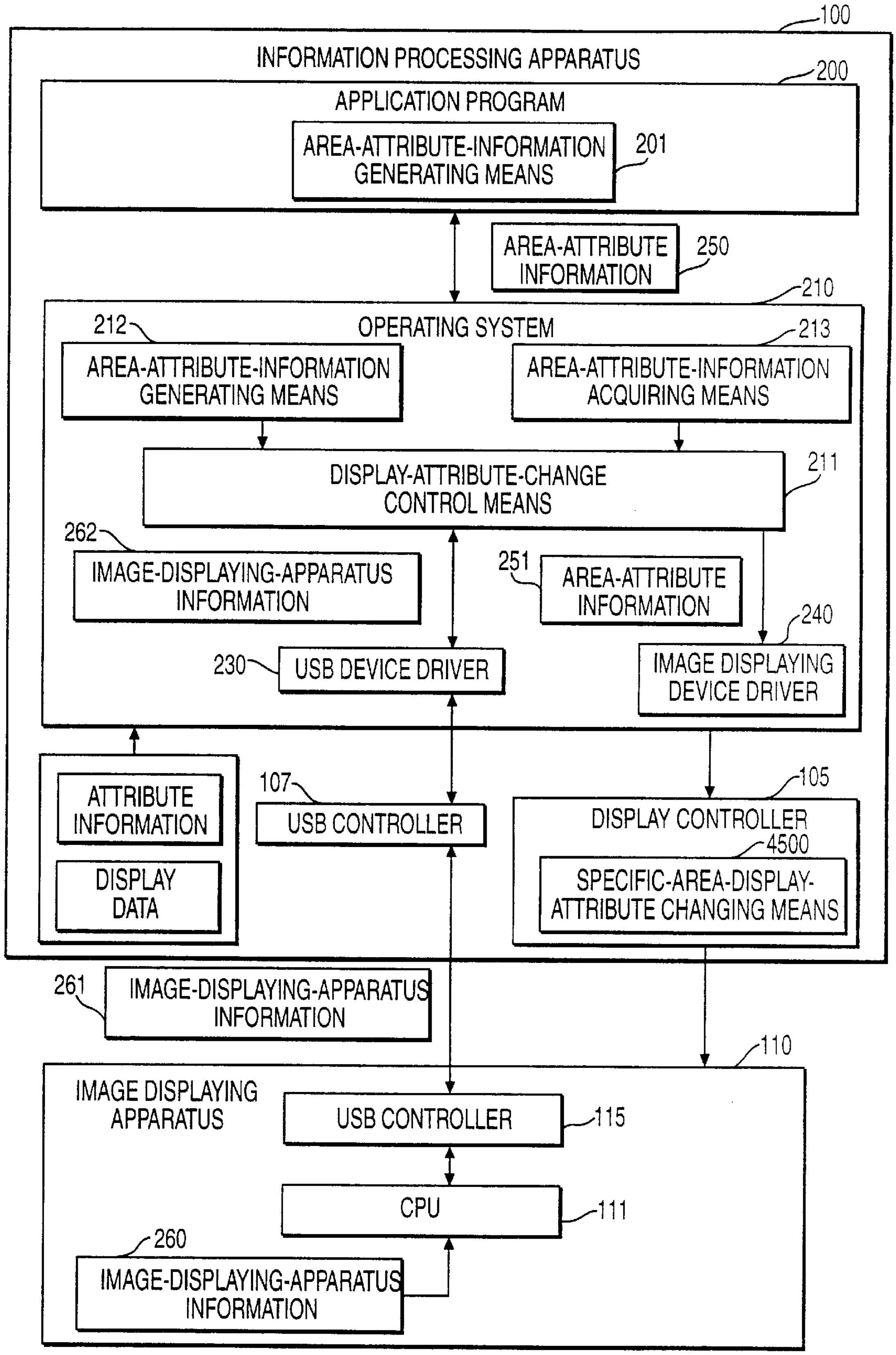
FIG. 46 is a diagram showing an outline of processing carried out by the image displaying system implemented by the fourth embodiment.

FIG. 46 is a diagram showing an outline of a procedure carried out by the image displaying system implemented by the present embodiment. As shown in the figure, the image displaying system has the specific-area-display-attribute changing means 4500 provided in the information processing apparatus 100 for changing a display attribute of a specific area on the display screen of the image displaying apparatus 110.

The application program 200 in the information processing apparatus 100 comprises a GUI, which is visible to the operator who operates the information processing apparatus 100, and which serves as an interface with the operating system 210.

The operating system 210 in the information processing apparatus 100 is a basic program serving as the nucleus of the image displaying system. More specifically, the operating system 210 connects the application program 200 with program members directly controlling hardware such as a USB device driver 230 and the image displaying device driver 240.

The image displaying device driver 240 in the information processing apparatus 100 is positioned between the operating system 210 and hardware members such as the device controller 105 and the display memory unit 106. More specifically, the image displaying device driver 240 is a program which implements a draw instruction issued by the operating system 210 by reading out and writing information from and into internal registers of the display controller 105 and the display memory unit 106. It should be noted that the internal registers themselves are not shown in the figure.

The application program 200 in the information processing apparatus 100 is provided with an area-attribute-information generating means 201. When there is detected a need to change a display attribute of a specific area on the display screen of the image displaying apparatus 110, area-attribute information 250 for changing the display attribute of the specific area is generated in the application program 200 and passed to the operating system 210 by the area-attribute-information generating means 201.

The operating system 210 in the information processing apparatus 100 comprises display-attribute-change control means 211, area-attribute-information generating means 212, and area-attribute-information acquiring means 213. The display-attribute-change control means 211 controls the entire display-attribute-change processing of the information processing apparatus 100 by making an inquiry about an ability of the image displaying apparatus 110 to display an image on a specific area on the display screen thereof by changing a display attribute of the specific area, and by receiving a response to the inquiry. The area-attribute-information generating means 212 generates area-attribute information 251 in the operating system 210 when there is detected a need to change a display attribute of the specific area. The area-attribute-information acquiring means 213 acquires the area-attribute information 250 generated by the area-attribute-information generating means 201 of the application program 200.

In addition, the USB device driver 230 and the image displaying device driver 240 are included in the operating system 210. The USB device driver 230 converts area-attribute information 251 and image-displaying-apparatus information 260 into USB data packets and vice versa in accordance with USB standards, and exchanges image-displaying-apparatus information 261 between the information processing apparatus 100 and the image displaying apparatus 110. The image displaying device driver 240 stores data to be displayed in the display-memory unit 106.

The USB controller 107 is controlled by the USB device driver 230 so that the inquiry is transmitted from the USB controller 107 to the image displaying apparatus 110. Then, a report indicating the ability of the image displaying apparatus 110 to display an image on the specific area on the display screen thereof by changing a display attribute of the specific area is transmitted by the image displaying apparatus 110 in response to the inquiry and received by the USB controller 107.

It should be noted that, in the area-attribute information 250 and the image-displaying-apparatus information 260 of the image displaying system implemented by the present embodiment, information similar to that shown in Tables 1 to 4 can be used. In addition, as a communication means for exchanging the area-attribute information 250 and the image-displaying-apparatus information 260 between the information processing apparatus 100 and the image displaying apparatus 110, a non-USB means such as a DDC means can be used, as is shown in the description of the first embodiment.

The following is a description of pieces of processing which are carried out by the operating system 210 in the image displaying system implemented by the present embodiment when a display attribute of a specific area is changed. It should be noted that the processing carried out by the application program 200 to change a display attribute is the same as that performed by the second embodiment.

Figure 47:
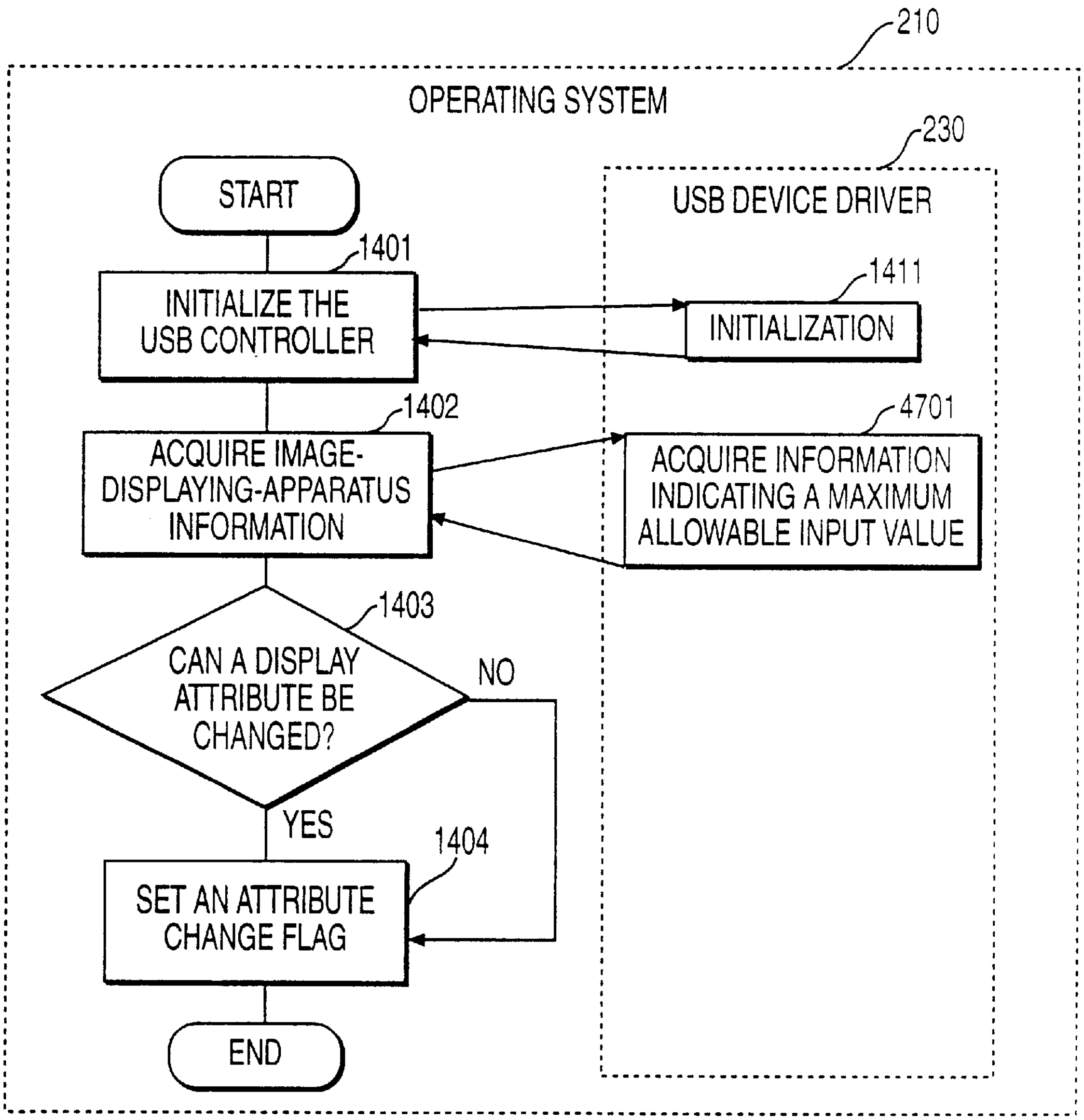
FIG. 47 is a flowchart showing a procedure of initialization processing carried out by the operating system in the fourth embodiment.

FIG. 47 is a flowchart showing a procedure of initialization processing carried out by the operating system 210 in the present embodiment. The initialization processing carried out by the operating system 210 modifies a display attribute carried out by the operating system 210. The initialization begins with a step 1401 at which the power supply of the information processing apparatus 100 is turned on. After the power supply is turned on, at a step 1411, the USB device driver 230 initializes the USB controller 107.

The flow then proceeds to a step 1402 at which the display-attribute-change control means 211 of the operating system 210 makes an inquiry, to the image displaying apparatus 110 through the USB driver 230, about the capability of displaying, among other things, a maximum allowable input voltage indicating whether the image displaying apparatus 110 is capable of displaying an image signal with a modified display attribute in a specific area on a display screen thereof.

Receiving the inquiry, the USB driver 230 creates a packet containing the inquiry, and sends the inquiry packet to the image displaying apparatus 110 by way of the USB controller 107 at a step 4701.

The image displaying apparatus 110 receives the inquiry signal transmitted by the information processing apparatus 100 by way of the USB controller 115, and creates a packet containing image-displaying-apparatus information 261 to indicate that the image displaying apparatus 110 is capable of displaying an image in a specific area on the display screen thereof by modifying a display attribute of the specific area. The packet is sent to the information processing apparatus 100 by way of the USB controller 115 as a report signal in response to the inquiry packet.

The information processing apparatus 100 receives the report signal transmitted by the image displaying apparatus 110 by way of the USB controller 107. At the step 4701, the USB device driver 230 of the information processing apparatus 100 receives the image-displaying-apparatus information 261 transmitted by the image displaying apparatus 110 by way of the USB controller 107, passing on the image-displaying-apparatus information 261 to the display-attribute-change control means 211 as image-displaying-apparatus information 262.

At a step 1403, the display-attribute-change control means 211 references the image-displaying-apparatus information 262 received at the step 1402 to find out whether or not the image displaying apparatus 110 is capable of displaying an image signal with a modified display attribute for a specific area on a display screen of the image displaying apparatus 110. If the image displaying apparatus 110 is found out to be so capable, the flow goes on to a step 1404 at which an attribute change flag is set to indicate that an image signal with a modified display attribute in a specific area on a display screen of the image displaying apparatus 110 can be input.

If, on the other hand, a result of the examination of the image-displaying-apparatus information 262 carried out at the step 1403 indicates that the image displaying apparatus 110 is not capable of displaying an image signal with a modified display attribute of a specific area on a display screen thereof, or if no image-displaying-apparatus information 262 is transmitted from the image displaying apparatus 110, a display attribute of a specific area on the display screen of the image displaying apparatus 110 is considered to be unchangeable and the initialization processing is ended without setting the attribute change flag cited above.

After the initialization has been completed, the display-attribute-change control means 211 of the operating system 210 receives the contrast-increasing instruction from the application program 200 by way of the area-attribute-information acquiring means 213. Receiving the instruction, the area-attribute-information acquiring means 213 references the attribute change flag set at the initialization and, if the image displaying apparatus 110 is capable of changing a display attribute of a specific area on its display screen, area-attribute information 251 is supplied to the image displaying device driver 240, making a request to increase the contrast of the window for displaying a dynamic image.

At the request described above, the image displaying device driver 240 sets the area-attribute information 251 used for increasing the contrast values stored in registers employed in the display controller 105. In the display controller 105, the received area-attribute information 251 is used by the specific-area-display-attribute changing means 4500 for determining a specific area on the display screen of the image displaying apparatus 110 for displaying dynamic-image data, and for changing the contrast value of the specific area. An image signal with the display attribute thereof modified in the specific area is then transmitted to the image displaying apparatus 110.

Figure 48:
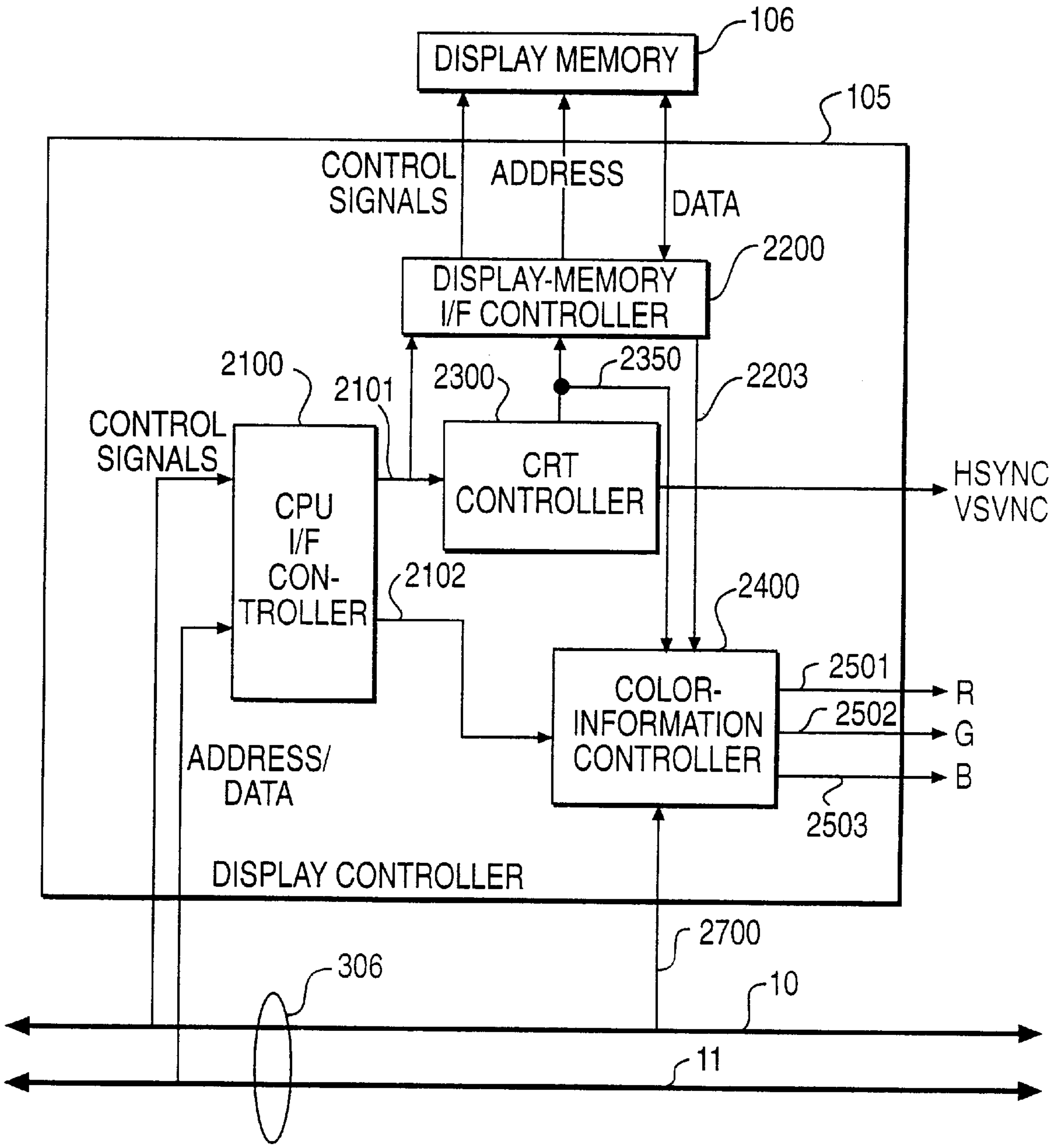
FIG. 48 is a diagram showing the internal configuration of a display controller provided by the fourth embodiment.

FIG. 48 is a diagram showing the internal configuration of the display controller 105 provided by the present embodiment. As shown in the figure, in the display controller 105, raw display data 2203 and position information 2350 are supplied to the color-information controller 2400 corresponding to the special-area-display-attribute changing means 4500. In the color-information controller 2400, display attributes, such as the contrast, can be adjusted. In addition, other display attributes, such as the brightness, the chromaticity, the γ characteristic, and the RGB levels, can also be adjusted.

The CRT controller 2300 generates a horizontal synchronization signal HSYNC and a vertical synchronization signal VSYNC. In addition, the CRT controller 2300 supplies the position information 2350 for reading out data to be displayed to the display-memory interface controller 2200 and reads out raw display data 2203, data required in displaying data, from the display memory unit 106.

Figure 49:
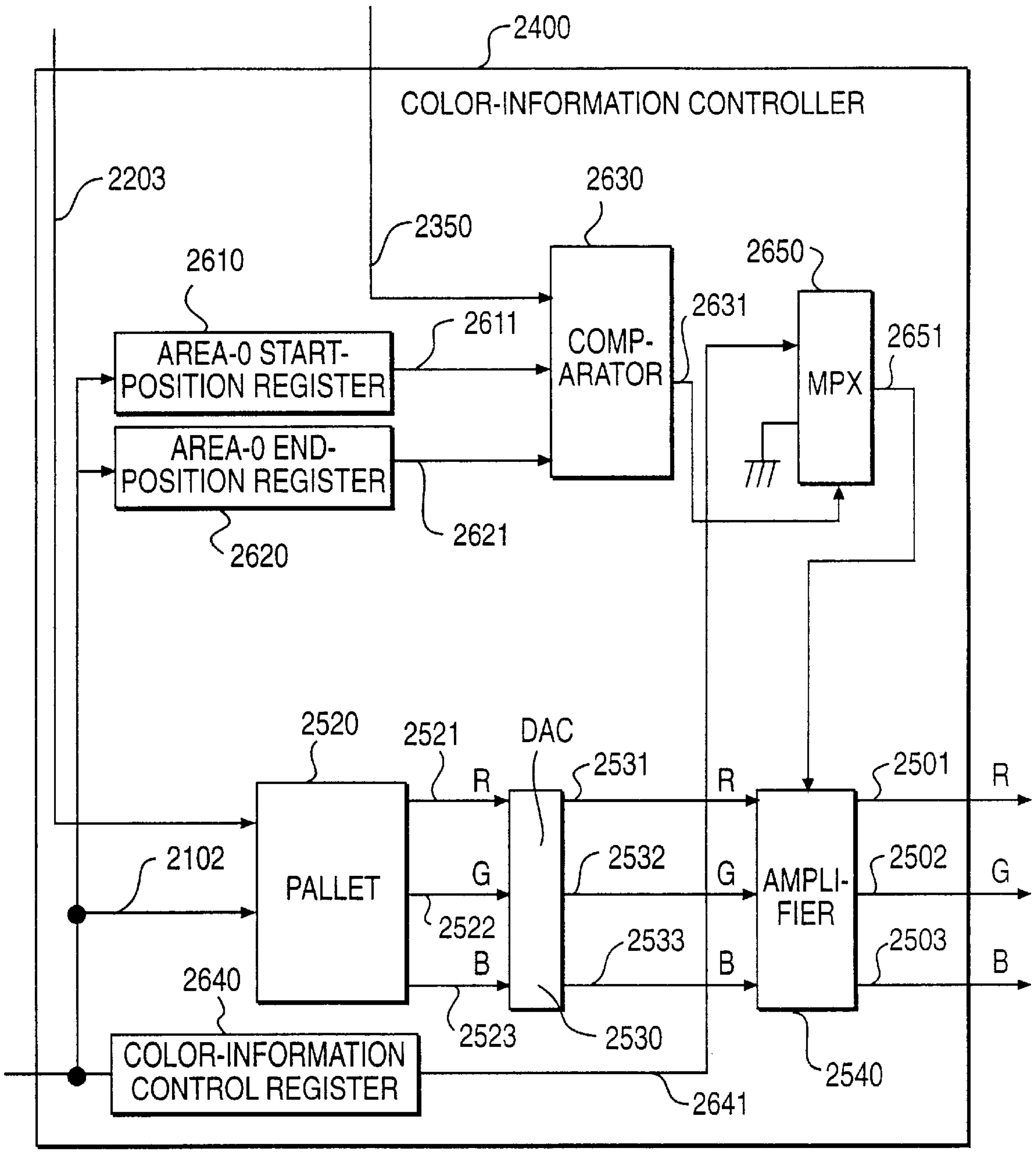
FIG. 49 is a diagram showing the internal configuration of the color-information controller employed in the fourth embodiment.

FIG. 49 is a diagram showing the internal configuration of the color-information controller 2400 employed in the present embodiment. As shown in the figure, the color-information controller 2400 is provided with an area start-position register, an area end-position register, and a color-information control register 2640. The area start-position register and the area end-position register are used for setting the area-attribute information 251 for modifying a display attribute of a specific area on the display screen.

So far, the image displaying system implemented by the present embodiment has been explained by showing only the area start-position register 2610 and the area end-position register 2620 of the area 0. It should be noted that, for each of a plurality of arbitrary areas 1, 2, and 3, an area start-position register and an area end-position register can be provided in the same way as for the area 0.

The area-attribute information 251 coming from the CPU 101 is set in the area-0 start-position register 2610, the area-0 end-position register 2620, and the color-information control register 2640 by a data signal 2102 coming from the CPU interface controller 2100.

A comparator 2630 compares the position information 2350 coming from the CRT controller 2300 with data 2611 set in the area-0 start-position register 2610 and data 2621 set in the area-0 end-position register 2620, outputting a control signal 2631 as a result of the comparison.

Figure 50:
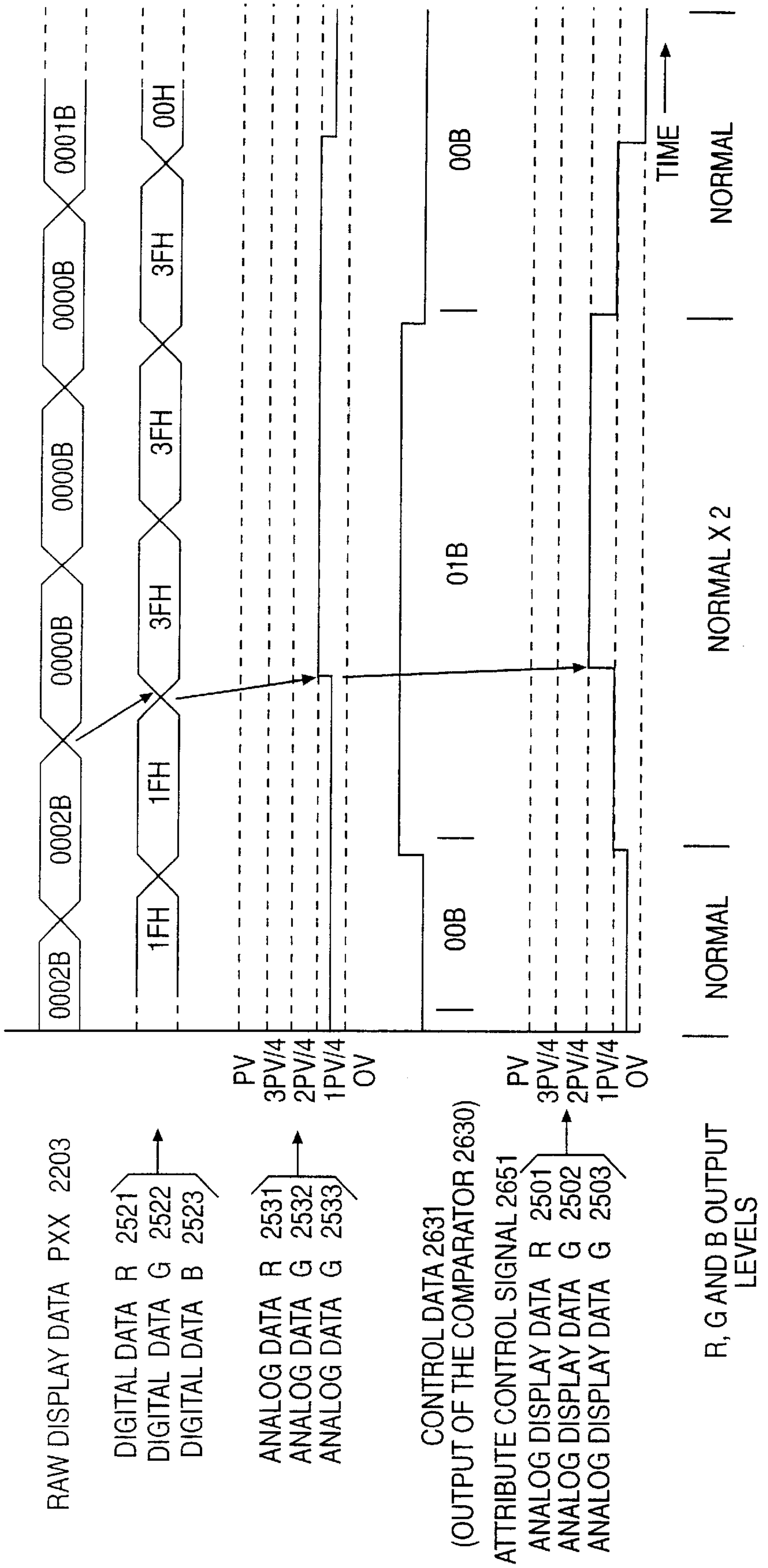
FIG. 50 is timing charts showing operations of the color-information controller employed in the fourth embodiment.

FIG. 50 shows timing charts of operations of the color-information controller 2400 employed in the present embodiment. As shown in the figure, in an operation of the color-information controller 2400, a multiplexer 2650 selects either data 2641 set in the color-information control register 2640 or "0" in accordance with the value of the control signal 2631, outputting the selected one as a control signal 2651.

More specifically, only when the position information 2350 coming from the CRT controller 2300 is in the range of the area 0, that is, only when the X-direction data of the position information 2350 coming from the CRT controller 2300 is equal to or greater than X0S and equal to or smaller than X0E and, at the same time, the Y-direction data of the position information 2350 is equal to or greater than Y0S and equal to or smaller than Y0E, does the control signal 2631 drive the multiplexer 2650 to select the data 2641 set in the color-information control register 2640 as the control signal 2651. Otherwise, the multiplexer 2650 selects "0".

Therefore, when area-0 control bits (CC00, CCO1) of the color-information register 2640 are set at (0, 1), the control signal 2651 is 01B if the position information 2350 coming from the CRT controller 2300 is in the range of the area 0, and 00B otherwise.

An amplifier 2540 determines whether or not to amplify analog signals 2531 to 2533 in dependence on the value of the control signal 2651.

If the position information 2350 coming from the CRT controller 2300 is in the range of the area 0, the control signal 2651 is 01B as described above. In this case, the analog signals 2531 to 2533 are amplified by the amplifier 2540 at an amplification factor of 2.

If, on the other hand, the position information 2350 coming from the CRT controller 2300 is not in the range of the area 0, the control signal 2651 is 00B as described above. In this case, the analog signals 2531 to 2533 are not amplified by the amplifier 2540 but just passed on as analog display signals 2501 to 2503 as they are.

As described above, the contrast of any arbitrary area can be controlled by using the area-0 start-position register 2610, the area-0 end-position register 2620, and the color-information control register 2640. In addition, other display attributes such as the brightness, the chromaticity, the γ characteristic, and the RGB levels can be adjusted as well.

It should be noted that, in the image displaying system implemented by the present embodiment, display attributes of a plurality of arbitrary areas 1, 2, and 3 can also each be controlled by using an area start-position register, an area end-position register, and the color-information control register 2640 in the same way as the area 0.

Figure 51:
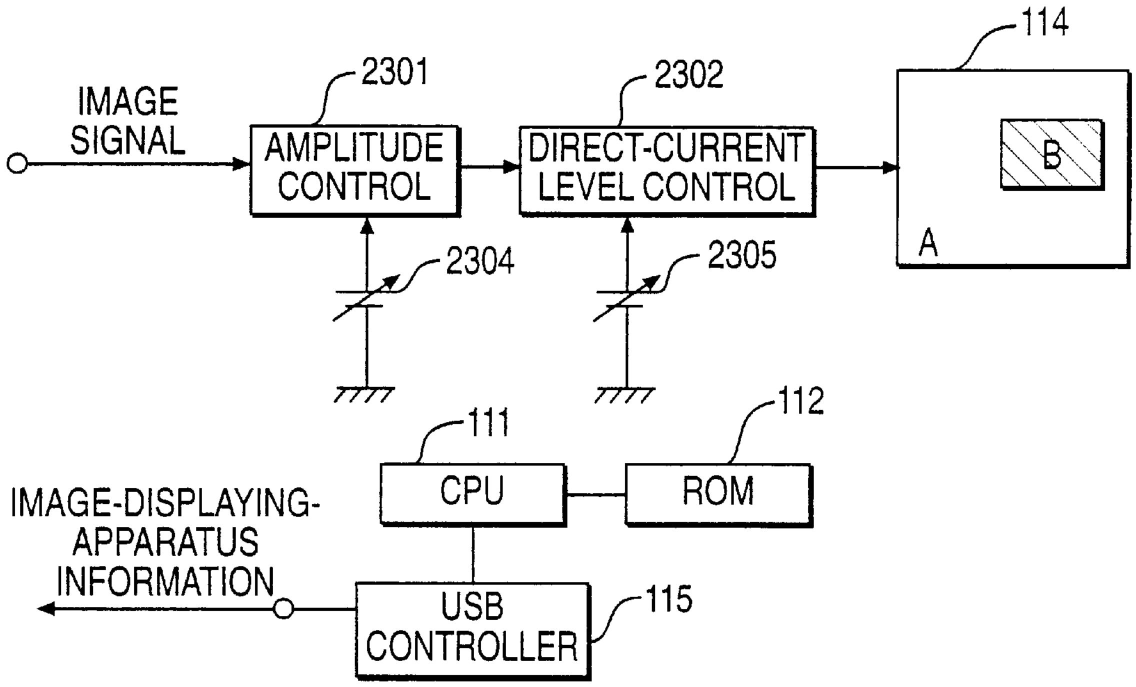
FIG. 51 is a diagram showing a preferred implementation of the image displaying apparatus provided by the fourth embodiment.

FIG. 51 is a diagram showing a preferred implementation of the image displaying apparatus 110 provided by the present embodiment. As shown in the figure, the image displaying apparatus 110 inputs and then displays an image signal with a display attribute thereof changed in a specific area on a display screen thereof. Since the image displaying apparatus 110 merely displays an image signal with a display attribute thereof changed by the information processing apparatus 100, it can be any apparatus as long as it is capable of displaying an image signal with a display attribute thereof changed in a specific area on its display screen.

As described above, according to the image displaying system implemented by the present embodiment, a display attribute of a specific area on a display screen of the image displaying apparatus 110 is changed by the information processing apparatus 100, and an image signal with a display attribute thereof changed in the specific area is then transmitted by the information processing apparatus 100 to the image displaying apparatus 110. It is thus possible to display an image signal with a display attribute thereof changed in a specific area on a display screen by using the image displaying apparatus 110.

Fifth Embodiment

The following is a description of an image displaying system implemented by a fifth embodiment of the invention. In this fifth embodiment, after attribute data has been stored in a storage portion of a display memory unit for data to be displayed in a specific area on a display screen of an image displaying apparatus, an information processing apparatus reads out the data to be displayed along with its attribute data, and changes the display attribute of the specific area. Then, the image displaying apparatus displays an image signal with a display attribute thereof changed in the specific area.

Figure 52:
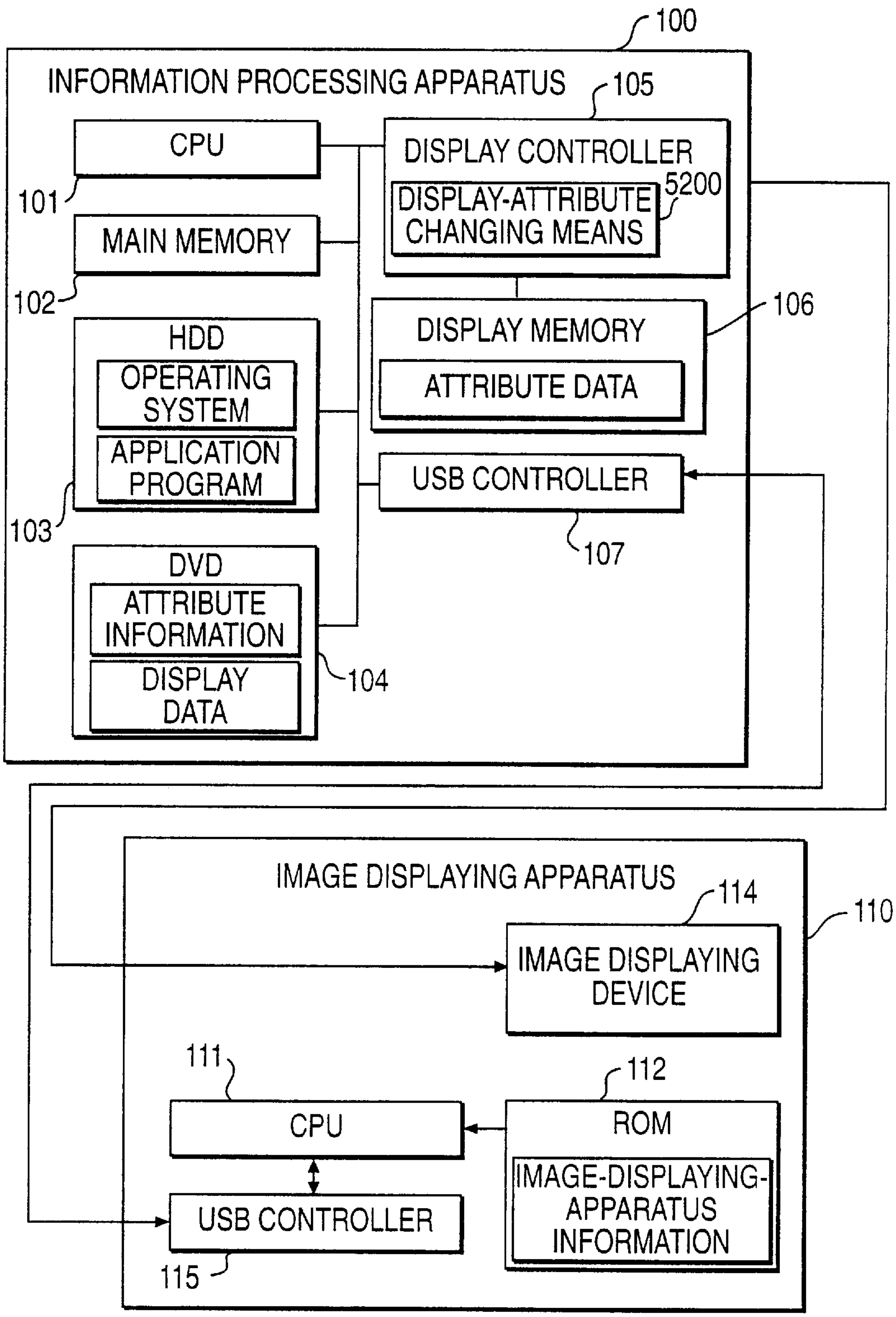
FIG. 52 is a diagram schematically showing the configuration of an image displaying system implemented by a fifth embodiment of the invention.

FIG. 52 is a diagram showing the configuration of an image displaying system implemented by the present embodiment. As shown in the figure, the image displaying system comprises an information processing apparatus 100 provided with a display-memory unit 106 for storing data to be displayed and attribute data, an image displaying apparatus 110 for receiving an image signal which has a modified display attribute in a specific area to be displayed on a display screen of the image displaying apparatus 110, and display-attribute changing means 5200 for changing a display attribute of a specific area on a display screen of the image displaying apparatus 110 in accordance with the attribute data. The image displaying apparatus 110 is connected to the information processing apparatus 100.

In the image displaying system implemented by the present embodiment, after a display controller 105 employed in the information processing apparatus 100 reads out the data to be displayed and its attribute data from the display memory unit 106 and the display-attribute changing means 5200 changes a display attribute for a specific area on the display screen of the image displaying apparatus 110, the image signal is transmitted from the information processing apparatus 100 to the image displaying apparatus 110 for displaying the image signal.

The CPU 101 employed in the image processing apparatus 100 controls the entire information processing apparatus 100. More specifically, the CPU 101 controls the information processing apparatus 100 as a whole by actually interpreting and executing an application program 200, an operating system 210, and a group of programs such as a USB device driver 230 and an image displaying device driver 240, which are loaded into the main memory unit 102.

In addition, the information processing apparatus 100 also includes an HDD 103 for storing software such as the application program 200, the operating system 210, a GUI program, an API program, the USB device driver 230, and the image displaying device driver 240. The information processing apparatus 100 is also provided with a DVD 104 for storing texts as well as display data of static and dynamic images to be displayed on the image displaying apparatus 110.

Further, the information processing apparatus 100 also has a display controller 105 and a display memory unit 106. The display controller 105 controls a write operation for writing data to be displayed on the image displaying apparatus 110 into the display memory unit 106, and a read operation for reading out the data from the display memory unit 106 as an image signal to be transmitted to the image displaying apparatus 110. The display controller 105 has a plurality of registers serving as a storage means in which area-attribute information 251 for changing a display attribute of a specific area on the display screen is set. The display controller 105 transmits to the image displaying apparatus 110 an image signal with a display attribute thereof changed on the basis of the area-attribute information 251.

Finally, the information processing apparatus 100 is also provided with a USB controller 107 for transmitting an inquiry signal to the image displaying apparatus 110 and for receiving a report signal, in response to the inquiry signal, from the image displaying apparatus 110.

On the other hand, the image displaying apparatus 110 comprises a CPU 111 and a ROM 112. The CPU 111 controls the image displaying apparatus 110 as a whole by interpretation and execution of a control program stored in the ROM 112. It should be noted that the control program itself is not shown in the figure.

The ROM 112 employed in the image displaying apparatus 110 stores information 260 on the image displaying apparatus 110. Such information indicates whether the image displaying apparatus 110 has a capability of displaying an image on a specific area of the display screen thereof by changing a display attribute of the specific area.

In addition, the image displaying apparatus 110 also employs a USB controller 115, which serves as a counterpart of the USB controller 107 employed in the information processing apparatus 100. More specifically, the USB controller 115 receives the inquiry signal from the information processing apparatus 100 and transmits the report signal to the information processing apparatus 100 in response to the inquiry signal. The inquiry signal is used for making an inquiry into the ability of the image displaying apparatus 110 to display an image on a specific area of the display screen thereof by changing a display attribute of the specific area in accordance with USB standards.

Figure 53:
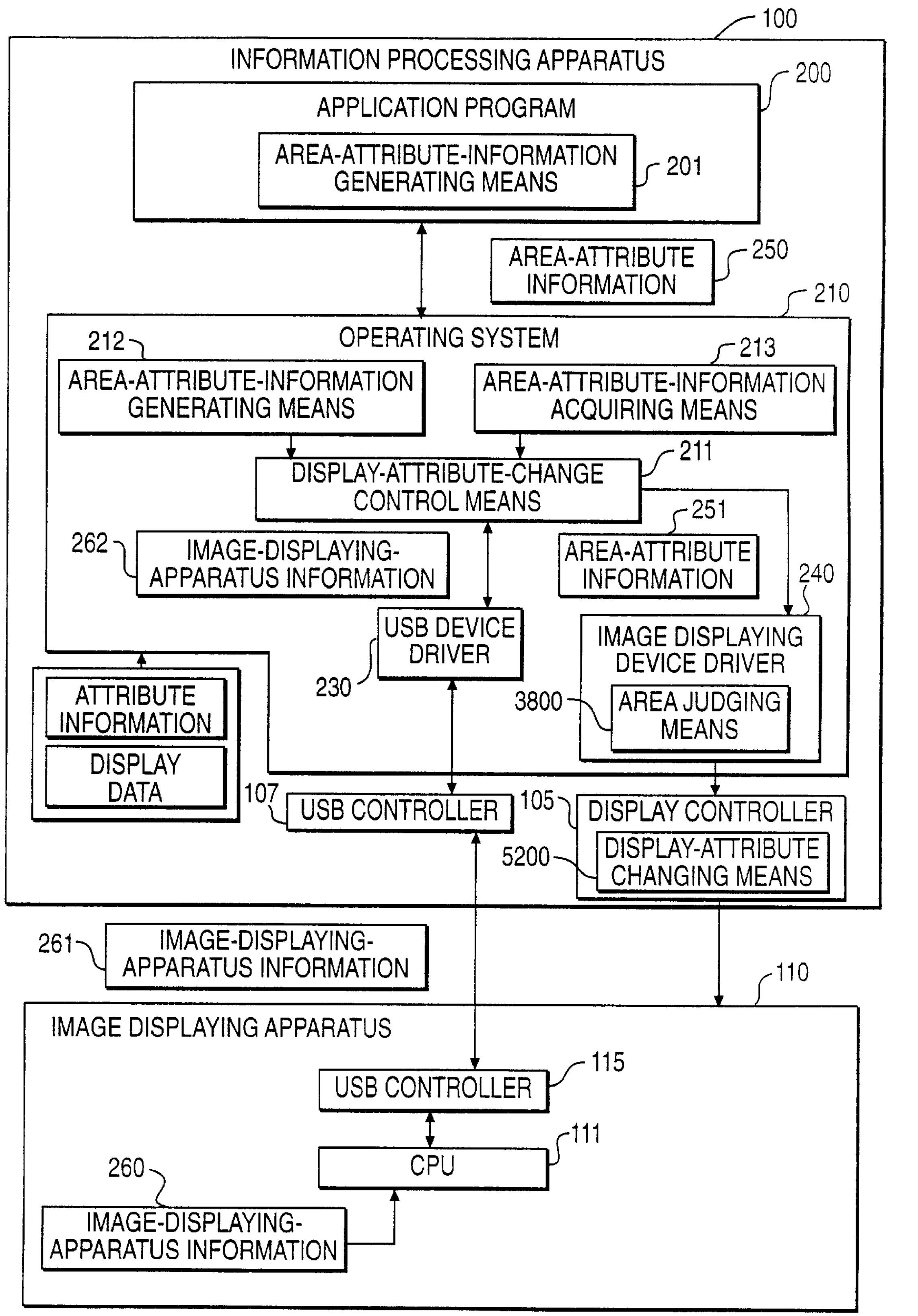
FIG. 53 is a diagram showing an outline of processing carried out by the image displaying system implemented by the fifth embodiment.

FIG. 53 is a diagram showing an outline of processing carried out by the image displaying system implemented by the present embodiment. As shown in the figure, the image displaying system includes an image displaying device driver 240 having an area judging means 3800 provided in the information processing apparatus 100, for determining an area that is subject to a change of a display area; and the display-attribute changing means 5200 provided in the information processing apparatus 100, for changing a display attribute of a specific area on the display screen of the image displaying apparatus 110. The area judging means 3800 and the display-attribute changing means 5200 correspond to the specific-area-display-attribute changing means 4500.

The application program 200 in the information processing apparatus 100 comprises a GUI, which includes a portion that is visible to the operator who operates the information processing apparatus 100, and which serves as an interface with the operating system 210.

The operating system 210 in the information processing apparatus 100 is a basic program serving as the nucleus of the image displaying system. More specifically, the operating system 210 connects the application program 200 with program members directly controlling hardware, such as a USB device driver 230 and the image displaying device driver 240.

The image displaying device driver 240 in the information processing apparatus 100 is positioned between the operating system 210 and hardware members such as the device controller 105 and the display memory unit 106. More specifically, the image displaying device driver 240 is a program which implements a draw instruction issued by the operating system 210 by reading out and writing information from and into internal registers of the display controller 105 and the display memory unit 106. It should be noted that the internal registers themselves are not shown in the figure.

The application program 200 in the information processing apparatus 100 is provided with an area-attribute-information generating means 201. When there is detected a need to change a display attribute of a specific area on the display screen of the image displaying apparatus 110, area-attribute information 250 for changing the display attribute of the specific area on the display screen of the image displaying-apparatus 110 is generated in the application program 200 and passed to the operating system 210 by the area-attribute-information generating means 201.

The operating system 210 in the information processing apparatus 100 comprises display-attribute-change control means 211, area-attribute-information generating means 212, and area-attribute-information acquiring means 213. The display-attribute-change control means 211 controls the entire display-attribute-change processing of the information processing apparatus 100 by making the inquiry about the ability of the image displaying apparatus 110 to display an image on a specific area on the display screen thereof by changing a display attribute of the specific area, and by receiving the response to the inquiry. The area-attribute-information generating means 212 generates area-attribute information 251 in the operating system 210 when there is detected a need to change a display attribute of a specific area on the display screen. The area-attribute-information acquiring means 213 acquires the area-attribute information 250 generated by the area-attribute-information generating means 201 of the application program 200.

In addition, the USB device driver 230 and the image displaying device driver 240 are included in the operating system 210. The USB device driver 230 converts area-attribute information 251 and image-displaying-apparatus information 260 into USB data packets and vice versa in accordance with USB standards, and exchanges image-displaying-apparatus information 261 between the information processing apparatus 100 and the image displaying apparatus 110. The image displaying device driver 240 stores data to be displayed in the display-memory unit 106.

The USB controller 107 is controlled by the USB device driver 230 so that the inquiry about the ability of the image displaying apparatus 110 to display an image on a specific area on the display screen thereof by changing a display attribute of the specific area is transmitted from the USB controller 107 to the image displaying apparatus 110, whereas the report indicating such an ability and transmitted by the image displaying apparatus 110 as a response to such an inquiry is also received by the USB controller 107.

The area judging means 3800 employed in the image displaying device driver 240 forms a judgment as to whether display data stored in the display memory unit 106 is in a specific area, a display attribute of which is to be changed, on a display screen of the image displaying apparatus 110 based on the area-attribute information 251. If the display data stored in the display memory unit 106 is in the specific area, the area judging means 3800 stores attribute data in a storage portion at a specific address in the display memory unit 106 associated with the data to be displayed. The display-attribute changing means 5200 employed in the display controller 105 reads out the data to be displayed and the attribute data from the display memory unit 106 at the same time, and changes a display attribute.

It should be noted that, in the area-attribute information 250 and the image-displaying-apparatus information 260 of the image displaying system implemented by the present embodiment, information similar to that shown in Tables 1 to 4 can be used. In addition, as a communication means for exchanging the area-attribute information 250 and the image-displaying-apparatus information 260 between the information processing apparatus 100 and the image displaying apparatus 110, a non-USB means such as a DDC means can be used, as is shown in the description of the first embodiment.

Initialization processing carried out by the operating system 210 is the same as that of the fourth embodiment, and the procedure carried out by the application program 200 to modify a display attribute is the same as that of the third embodiment.

First of all, in the case of an image displaying apparatus 110 capable of displaying an image signal with a modified display attribute in a specific area on a display screen thereof, the display-attribute-change control means 211 of the operating system 210 sets an attribute change flag to indicate that the image displaying apparatus 110 is so capable.

The display-attribute-change control means 211 of the operating system 210 receives the contrast-increasing instruction from the application program 200 by way of the area-attribute-information acquiring means 213. Receiving the instruction, the area-attribute-information acquiring means 213 references the attribute change flag set at the initialization and, if the image displaying apparatus 110 is capable of displaying an image signal with its display attribute changed in a specific area on a display screen thereof, area-attribute information 251 is supplied to the image displaying device driver 240, making a request to increase the contrast of the specific area to the image displaying device driver 240.

At the request described above, the area judging means 3800 of the image displaying device driver 240 determines a specific area on the display screen of the image displaying apparatus 110 for displaying dynamic-image data, develops attribute information indicating a contrast value of the specific area stored in the display memory unit 106 for the dynamic-image data, and stores the attribute data in the display memory unit 106. The display controller 105 reads out the dynamic-image data and the attribute data developed in the display memory unit 106. The display-attribute changing means 5200 changes the contrast value of a specific area on the display screen in which the dynamic-image data is to be displayed, and transmits an image signal with a display attribute thereof changed in the specific area to the image displaying apparatus 110.

The following is description of an operation to control the contrast by using attribute data 2202 stored in the display memory unit 106 in the image displaying system implemented by the present embodiment.

Figure 54:
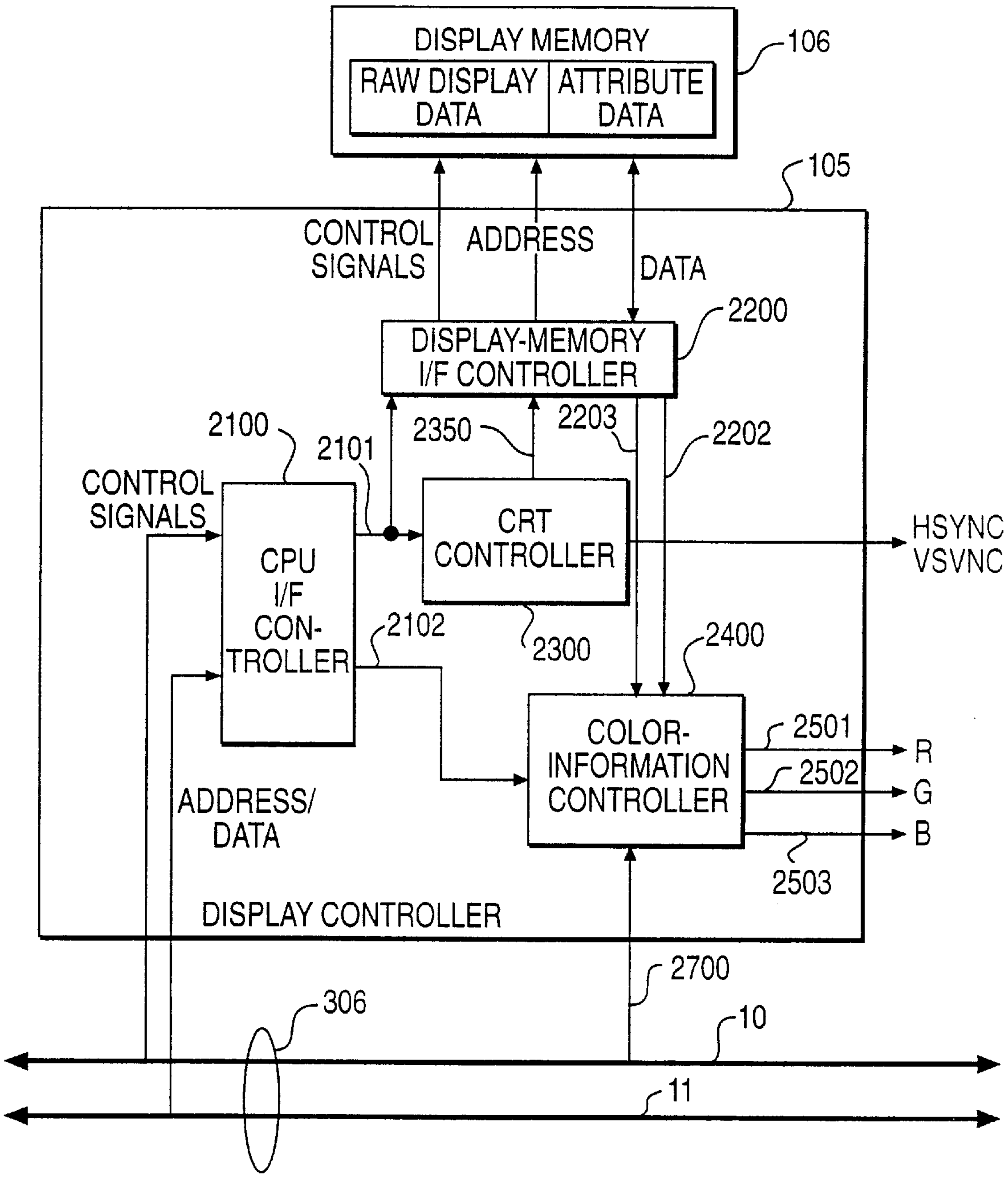
FIG. 54 is a diagram showing the internal configuration of the display controller provided by the fifth embodiment.

FIG. 54 is a diagram showing the internal configuration of the display controller 105 provided by the present embodiment. As shown in the figure, in the display controller 105, raw display data 2203 and the attribute data 2202 are supplied to the color-information controller 2400 corresponding to the display-attribute changing means 5200. In the color-information controller 2400, display attributes, such as the contrast can be adjusted. In addition, other display attributes, such as the brightness, the chromaticity, the γ characteristic, and the RGB levels, can also be adjusted.

The CRT controller 2300 generates a horizontal synchronization signal HSYNC and a vertical synchronization signal VSYNC. In addition, the CRT controller 2300 supplies the position information 2350 to the display-memory interface controller 2200 for reading out data to be displayed, and reads out raw display data 2203, which is required in displaying data, and the attribute data 2202 from the display memory unit 106.

Figure 55:
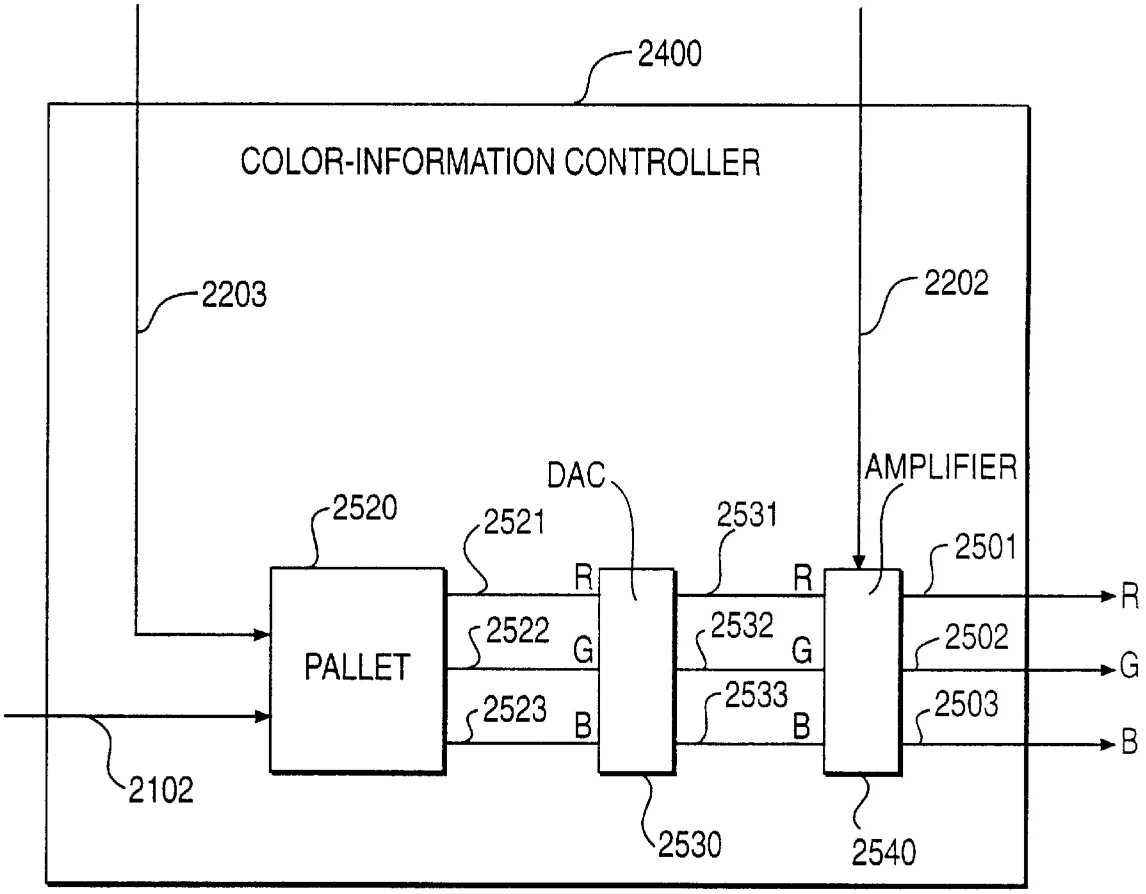
FIG. 55 is a diagram showing the internal configuration of the color-information controller employed in the fifth embodiment.

FIG. 55 is a diagram showing the internal configuration of the color-information controller 2400 employed in the present embodiment. As shown in the figure, the color-information controller 2400 is provided with a pallet 2520, a DAC 2530, and an amplifier 2540. The color-information controller 2400 corresponds to the display-attribute changing means 5200 for changing a display attribute of the raw display data 2203.

Pieces of digital data 2521 to 2523 output by the pallet 2520 are converted into analog signals 2531 to 2533 by a DAC 2530. The analog signals 2531 to 2533 are amplified into analog signals 2501 to 2503, respectively, by the amplifier 2540 which is controlled by an attribute signal 2202.

Depending upon the value of the attribute signal 2202, however, the analog signals 2531 to 2533 are merely passed on as analog signals 2501 to 2503, respectively, as they are by the amplifier 2540 without being amplified.

Figure 56:
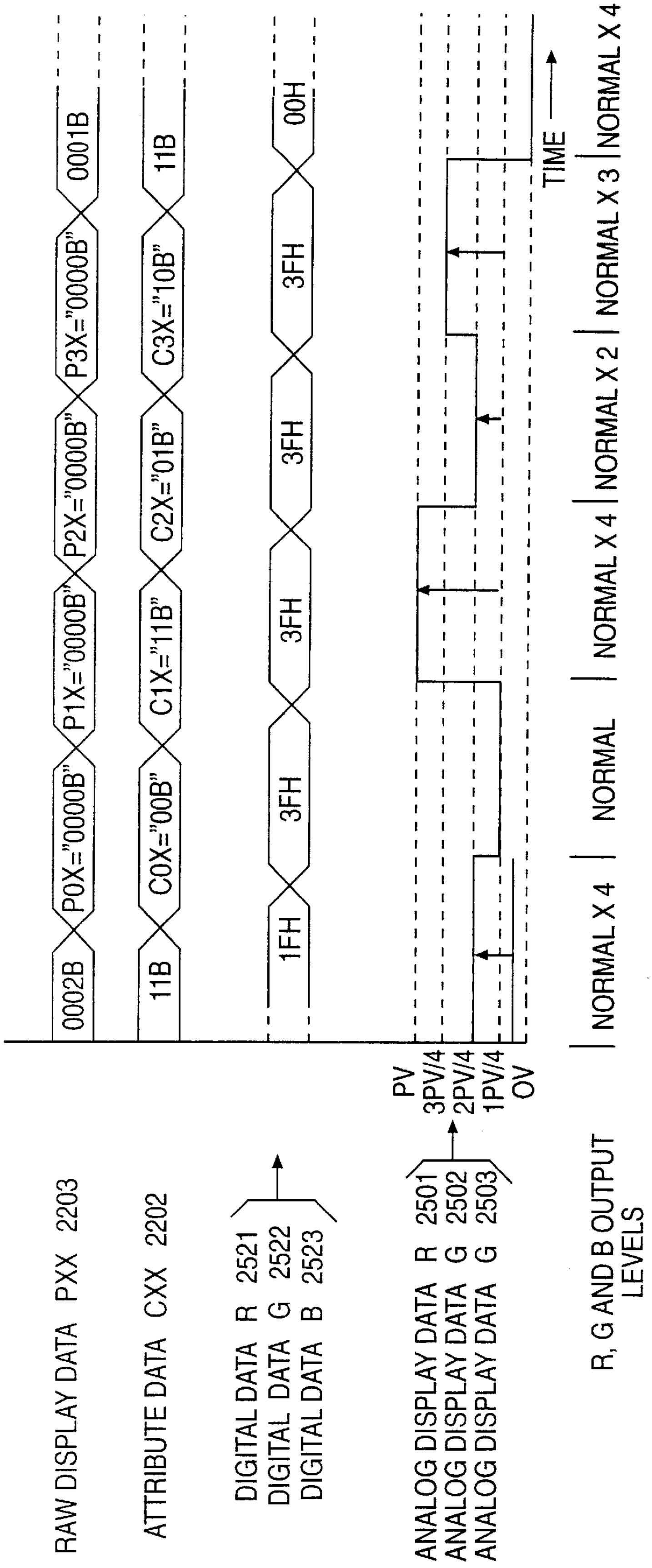
FIG. 56 is a timing chart showing operations of the color-information controller provided by the fifth embodiment.

FIG. 56 is a timing chart showing operations of the color-information controller 2400 provided by the present embodiment. As shown in the figure, in the operation of the color-information controller 2400, the analog signals 2531 to 2533 are amplified into analog signals 2501 to 2503, respectively, by the amplifier 2540 at an amplification factor of 1, 2, 3, and 4 for an attribute signal 2202 having a value of 00B, 01B, 10B, and 11B, respectively, where notation B indicates a binary expression.

Now, assume that the raw display data 2203 is 0002B, 0000B, 0000B, 0000B, 0000B, and 0001B, the attribute data

2202 is 11B, 00B, 11B, 01B, 10B, and 11B, and the digital data 2521 to 2523 output by the pallet 2520 is 1FH, 3FH, 3FH, 3FH, 3FH, and 00H. In this case, the analog display data 2501, 2502, and 2503 is 2PV/4, 1PV/4, PV, 2PV/4, 3PV/4, and PV/4, where notation PV is a peak voltage, indicating that the contrast can be adjusted for each picture element. In addition, other display attributes such as the brightness, the chromaticity, the γ characteristic, and the RGB levels can be adjusted as well.

According to the description given so far, the image-displaying-apparatus information 260 of the image displaying apparatus 110 stored in the ROM 112 is transferred to the information processing apparatus 100 when necessary, and a display attribute is changed. In addition to information stored in the ROM 112, however, dynamic information, such as a driving voltage which varies from time to time, can also be transferred through the USB controller 115.

Figure 57:
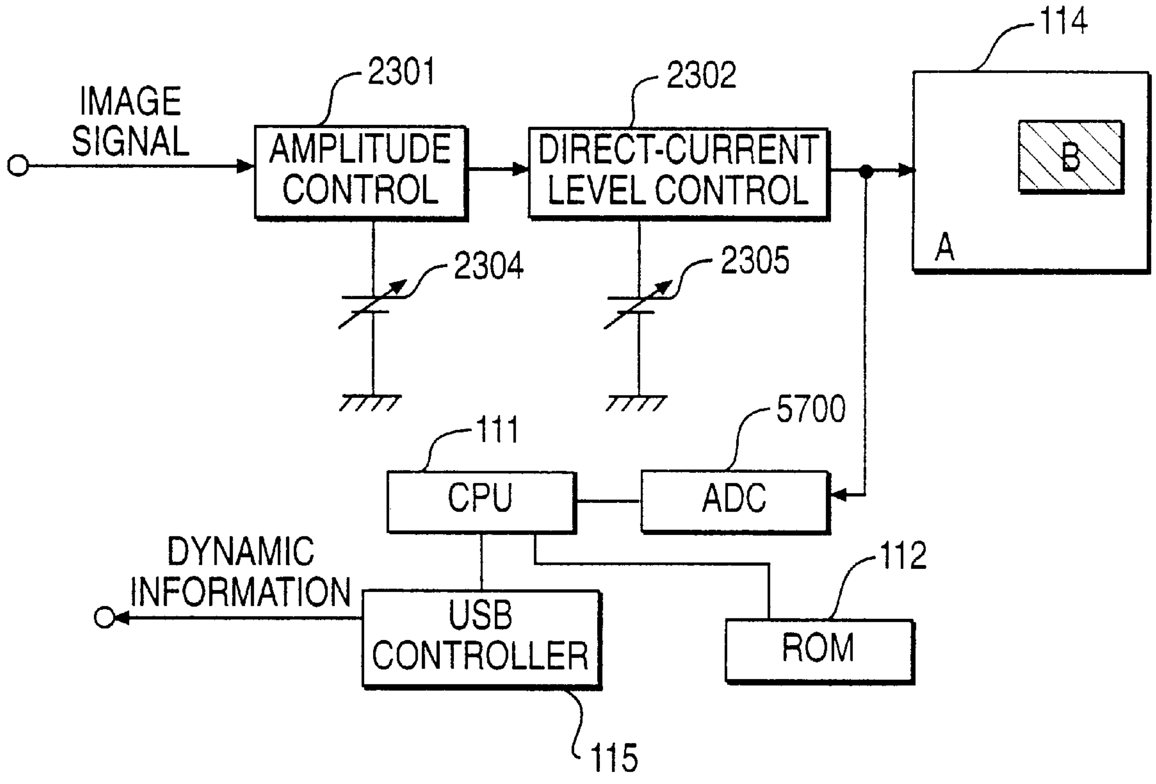
FIG. 57 is a diagram showing a preferred implementation of an image displaying apparatus provided by the fifth embodiment for transmitting image information.

FIG. 57 is a diagram showing a preferred implementation of an image displaying apparatus 110 provided by the present embodiment, for transmitting dynamic information to equipment such as an information processing apparatus 100. As shown in the figure, in the image displaying apparatus 110, which also transmits dynamic information to equipment such as the information processing apparatus 100, a voltage driving an image displaying device 114 is converted from an analog signal into a digital one by an ADC 5700. The digital data resulting from the A/D conversion is transmitted to the information processing apparatus 100 through the USB controller 115. In this way, in addition to information determined in advance, dynamic information, such as a driving voltage which varies from time to time, can also be transferred to the information processing apparatus 100.

In this way, the present driving state of the image displaying device 114 (for example, the average beam current in the case of a Braun tube) can be detected. By transmitting the result of the detection to equipment such as the information processing apparatus 100, a need for changing a display attribute of a specific area can be detected. In the event of an excessively large beam current, for example, a measure for countering such an abnormality can be taken by lowering the contrast level.

As described above, according to the image displaying system implemented by the present embodiment, the information processing apparatus 100 forms a judgment as to whether data to be displayed exists in a specific area on a display screen of the image displaying apparatus 110 and, after attribute data 2202 for the data to be displayed is stored in the display memory unit 106, a display attribute of a special area on a display screen of the image displaying apparatus 110 is modified by the information processing apparatus 100 prior to data transmission to the image displaying apparatus 110, making it possible to control a display attribute for each pixel, as is the case with a conventional image displaying apparatus 110. In addition, since the data to be displayed and the attribute data 2202 are treated on the same column, the amount of restriction on the expression of the designer who creates a raw image of the data to be displayed is decreased.

In addition, according to the image displaying system implemented by the present embodiment, when the position at which data is displayed is moved, the attribute data 2202 for the displayed data is just moved along with the displayed data without the need to form a judgment as to whether the displayed data exists in a specific area on a display screen of the image displaying apparatus 110, making it possible to move the data displayed in a specific area having the changed display attribute.

Further, according to the image displaying system implemented by the present embodiment, the attribute data 2202 for the data to be displayed is stored in the display memory unit 106. As a result, the attribute data 2202 can be stored without newly providing another storage means for the attribute data 2202.

As described above, the present invention has been described in concrete terms with reference to some preferred embodiments. It should be noted that the description is not to be construed in a limiting sense. That is to say, the scope of the present invention is not limited to the disclosed embodiments, but a variety of changes and modifications can be made to the embodiments without departing from the spirit of the present invention.

We claim:

1. An image displaying system, comprising:

an image displaying apparatus having a display screen on which a display can be provided, and a specific-area-display-attribute changing means for changing a display attribute of a specific area on the display; and an information processing apparatus having a display control means for generating an image signal and for transmitting said image signal to said image displaying apparatus so as to display a window at selectable coordinates and with a selectable size on the display;

wherein said information processing apparatus has a communication means for sending said image displaying apparatus an inquiry signal for making an inquiry into whether said image displaying apparatus has a capability of displaying an image signal on said specific area of said display by modifying a display attribute of said specific area; and wherein said display attribute is selected from the group consisting of contrast, brightness, average brightness level, chromaticity, γ characteristic, and RGB level.

2. An image displaying system, comprising:

an image displaying apparatus having a display screen on which a display can be provided, and a specific-area-display-attribute changing means for changing a display attribute of a specific area on said display; and an information processing apparatus having a display control means for generating an image signal and transmitting said image signal to said image displaying apparatus so as to display a window at selectable coordinates and with a selectable size on the display;

wherein said image displaying apparatus has a communication means for sending said information processing apparatus a report signal that indicates that said image displaying apparatus has a capability of displaying an image signal on said specific area of said display screen by modifying said display attribute of said specific area; and wherein said display attribute is selected from the group consisting of contrast, brightness, average brightness level, chromaticity, γ characteristic, and RGB level.

3. An image displaying system according to claim 2, wherein said image displaying apparatus receives an inquiry signal for making an inquiry into whether said image displaying apparatus has a capability of displaying an image signal on said specific area of said display, from said information processing apparatus through said communication means.

4. An image displaying system according to claim 1, wherein:

said information processing apparatus transmits, to said image displaying apparatus, area-attribute information for changing said display attribute of said specific area on said display screen of said image displaying apparatus; and said specific-area-display-attribute changing means changes said display attribute of said specific area on said display screen in accordance with said area-attribute information received from said information processing apparatus.

5. An image displaying system according to claim 4, wherein said area-attribute information includes area information for specifying the position of said specific area on said display screen of said image displaying apparatus, and attribute information for specifying said display attribute.

6. An image displaying system according to claim 1, wherein said communication means sends said inquiry signal in conformity with USB standards.

7. An image displaying system according to claim 1, wherein said communication means sends said inquiry signal in conformity with DDC standards.

8. An image displaying system, comprising:

an image displaying apparatus having a display screen on which a display can be provided, and specific-area-display-attribute changing means for changing a display attribute of a specific area on said display;

an information processing apparatus having display control means for generating an image signal and transmitting said image signal to said image displaying apparatus so as to display a window at selectable coordinates and with a selectable size on the display; and communication means for carrying out communication conforming to USB standards provided in said information processing apparatus and said image displaying apparatus, wherein:

said information processing apparatus transmits, to said image displaying apparatus through said communication means, area-attribute information for changing said display attribute of said specific area on said display;

said image displaying apparatus changes said display attribute of said specific area on said display by using said specific-area-display-attribute changing means in accordance with said area-attribute information received from said information processing apparatus through said communication means; and said display attribute is selected from the group consisting of contrast, brightness, average brightness level, chromaticity, γ characteristic, and RGB level.

9. An image displaying system according to claim 8, wherein said area-attribute information includes area information for specifying the position of said specific area on said display, and attribute information for specifying said display attribute.

10. An image displaying system, comprising:

an image displaying apparatus having a display on which a display can be provided, and specific-area-display-attribute changing means for changing a display attribute of a specific area on said display;

an information processing apparatus having display control means for generating an image signal and transmitting said image signal to said image displaying apparatus so as to display a window at selectable coordinates and with a selectable size on the display; and communication means for carrying out communication conforming to DDC standards provided in said information processing apparatus and said image displaying apparatus, wherein:

said information processing apparatus transmits, to said image displaying apparatus through said communication means, area-attribute information for changing said display attribute of said specific area on said display; and said image displaying apparatus changes said display attribute of said specific area on said display screen by using said specific-area-display-attribute changing means in accordance with said area-attribute information received from said information processing apparatus through said communication means; and said display attribute is selected from the group consisting of contrast, brightness, average brightness level, chromaticity, γ characteristic, and RGB level.

11. An image displaying system according to claim 10, wherein said area-attribute information includes area information for specifying the position of said specific area on said display, and attribute information for specifying said display attribute.

12. An image displaying system, comprising:

an image displaying apparatus, including a display screen on which a display data can be provided;

an information processing apparatus having a display memory for storing display data to be displayed on said displaying; and display control means for reading out display data from said display memory, generating an image signal representing said display data, and transmitting said image signal to said image displaying apparatus so as to display a window at selectable coordinates and with a selectable size on the display;

wherein said display control means has a storage means for storing area-attribute information for changing a display attribute of a specific area on said display of said image displaying apparatus; and wherein said display attribute is selected from the group consisting of contrast, brightness, average brightness level, chromaticity, γ characteristic, and RGB level.

13. An image displaying system according to claim 12, wherein said image signal generated and transmitted by said display control means includes an attribute control signal which is generated on the basis of said area-attribute information and used for changing said display attribute.

14. An image displaying system according to claim 12, wherein said image signal generated and transmitted by said display control means includes said display attribute which has been changed on the basis of said area-attribute information.

15. An image displaying system according to claim 12, wherein said information processing apparatus includes communication means for sending said image displaying apparatus an inquiry signal for making an inquiry into whether said image displaying apparatus has a capability of displaying an image based on said image signal on said specific area of said display.

16. An image displaying system according to claim 15, wherein said communication means sends said inquiry signal in conformity with USB standards.

17. An image displaying system according to claim 15, wherein said communication means sends said inquiry signal in conformity with DCC standards.

18. An image displaying system according to claim 12, wherein said image displaying apparatus includes communication means for sending said information processing apparatus a report signal that indicates that said image displaying apparatus has a capability of displaying an image based on said image signal on said specific area of said display by modifying said display attribute of said specific area.

19. An image displaying system according to claim 18, wherein said image displaying apparatus receives, from said information processing apparatus through said communication means, an inquiry signal for making an inquiry into whether said image displaying apparatus has a capability of displaying said image based on said image signal on said specific area of said display.

20. An image displaying system according to claim 19, wherein said communication means receives said inquiry signal and sends said report signal in conformity with USB standards.

21. An image displaying system according to claim 19, wherein said communication means receives said inquiry signal and sends said report signal in conformity with DCC standards.

22. An image displaying system, comprising:

an image displaying apparatus, including a display screen on which display data can be provided;

an information processing apparatus having a display memory for storing display data to be displayed on said display; and a display control means for reading out display data from said display memory, generating an image signal representing said display data, and transmitting said image signal to said image displaying apparatus so as to display a window at selectable coordinates and with a selectable size on the display;

wherein said display memory has a storage portion in which area-attribute information for modifying a display attribute of a specific area on said display is developed; and wherein said display attribute is selected from the group consisting of contrast, brightness, average brightness level, chromaticity, γ characteristic, and RGB level.

23. An image displaying system according to claim 22, wherein said image signal generated and transmitted by said display control means includes an attribute control signal which is generated on the basis of said area-attribute information and used for changing said display attribute.

24. An image displaying system according to claim 22, wherein said image signal generated and transmitted by said display control means includes said display attribute which has been changed on the basis of said area-attribute information.

25. An image displaying system according to claim 22, wherein said information processing apparatus includes communication means for sending said image displaying apparatus an inquiry signal for making an inquiry into whether said image displaying apparatus has a capability of displaying an image based on said image signal on said specific area of said display.

26. An image displaying system according to claim 25, wherein said communication means sends said inquiry signal in conformity with USB standards.

27. An image displaying system according to claim 25, wherein said communication means sends said inquiry signal in conformity with DCC standards.

28. An image displaying system according to claim 22, wherein said image displaying apparatus includes communication means for sending said information processing apparatus a report signal that indicates that said image displaying apparatus has a capability of displaying an image based on said image signal on said specific area of said display by modifying said display attribute of said specific area.

29. An image displaying system according to claim 28, wherein said image displaying apparatus receives, from said information processing apparatus through said communication means, an inquiry signal for making an inquiry into whether said image displaying apparatus has a capability of displaying said image based on said image signal on said specific area of said display.

30. An image displaying system according to claim 29, wherein said communication means receives said inquiry signal and sends said report signal in conformity with USB standards.

31. An image displaying system according to claim 29, wherein said communication means receives said inquiry signal and sends said report signal in conformity with DCC standards.

32. An information processing apparatus, comprising:

display control means for generating an image signal and transmitting said image signal to an image displaying apparatus so as to display a window at selectable coordinates and with a selectable size on a display of a display screen of said image displaying apparatus; and communication means for sending said image displaying apparatus an inquiry signal for making an inquiry into whether said image displaying apparatus has a capability of displaying said image signal on a specific area of a display by modifying a display attribute of said specific area;

wherein a display attribute is selected from the group consisting of contrast, brightness, average brightness level, chromaticity, γ characteristic, and RGB level.

33. An information processing apparatus according to claim 32, wherein said communication means sends said inquiry signal in conformity with USB standards.

34. An information processing apparatus according to claim 32, wherein said communication means sends said inquiry signal in conformity with DCC standards.

35. An information processing apparatus according to claim 32, wherein said communication means transmits area-attribute information for changing said display attribute of said specific area on said display to said image displaying apparatus.

36. An information processing apparatus according to claim 35, wherein said communication means sends said inquiry signal and transmits said area-attribute information in conformity with USB standards.

37. An information processing apparatus according to claim 35, wherein said communication means sends said inquiry signal and transmits said area-attribute information in conformity with DCC standards.

38. An information processing apparatus, comprising:

display control means for generating an image signal and transmitting said image signal to an image displaying apparatus so as to display a window at selectable coordinates and with selectable size on a display of a display screen of said image displaying apparatus; and communication means for receiving, from said image displaying apparatus, a report signal that indicates that said image displaying apparatus has a capability of displaying said image signal on a specific area of a display screen by modifying a display attribute of said specific area;

wherein said display attribute is selected from the group consisting of contrast, brightness, average brightness level, chromaticity, γ characteristic, and RGB level.

39. An information processing apparatus according to claim 38, wherein said communication means receives said report signal in conformity with USB standards.

40. An information processing apparatus according to claim 38, wherein said communication means receives said report signal in conformity with DCC standards.

41. An information processing apparatus according to claim 38, wherein said communication means transmits area-attribute information for changing said display attribute of said specific area on said display screen to said image displaying apparatus.

42. An information processing apparatus according to claim 41, wherein said communication means sends said image displaying apparatus an inquiry signal for making an inquiry into whether said image displaying apparatus has a capability of displaying said image signal on said specific area of said display by modifying said display attribute of said specific area.

43. An information processing apparatus according to claim 42, wherein said area-attribute information includes area information for specifying the position of said specific area of said display, and attribute information for specifying said display attribute.

44. An information processing apparatus according to claim 43, wherein said communication means sends said inquiry signal and transmits said area-attribute information in conformity with USB standards.

45. An information processing apparatus according to claim 43, wherein said communication means sends said inquiry signal and transmits said area-attribute information in conformity with DCC standards.

46. An information processing apparatus, comprising:

display control means for generating an image signal and transmitting said image signal to an image displaying apparatus so as to display a window at selectable coordinates and with a selectable size on a display of a display screen of said image displaying apparatus; and communication means for communicating with said image displaying apparatus in conformity with USB standards;

wherein said communication means transmits, to said image displaying apparatus, area-attribute information for changing a display attribute of a specific area said display; and wherein said display attribute is selected from the group consisting of contrast, brightness, average brightness level, chromaticity, γ characteristic, and RGB level.

47. An information processing apparatus according to claim 46, wherein said area-attribute information includes area information for specifying the position of said specific area, and attribute information for specifying said display attribute.

48. An information processing apparatus, comprising:

display control means for generating an image signal and transmitting said image signal to an image displaying apparatus so as to display a window at selectable coordinates and with a selectable size on a display of a display screen of said image displaying apparatus; and communication means for communicating with said image displaying apparatus in conformity with DDC standards;

wherein said communication means transmits, to said image displaying apparatus, area-attribute information for changing a display attribute of a specific area on a display; and wherein said display attribute is selected from the group consisting of contrast, brightness, average brightness level, chromaticity, γ characteristic, and RGB level.

49. An information processing apparatus according to claim 48, wherein said area-attribute information includes area information for specifying the position of said specific area, and attribute information for specifying said display attribute.

50. An information processing apparatus, comprising:

a display memory for storing display data to be displayed on a display of a display screen of an image displaying apparatus; and display control means for reading out display data from said display memory, generating an image signal representing said display data, and transmitting said image signal to said image displaying apparatus so as to display a window at selectable coordinates and with a selectable size on said display;

wherein said display control means has a storage means for storing area-attribute information for changing a display attribute of a specific area on a display; and wherein said display attribute is selected from the group consisting of contrast, brightness, average brightness level, chromaticity, γ characteristic, and RGB level.

51. An information processing apparatus according to claim 50, wherein said information processing apparatus includes communication means for sending said image displaying apparatus an inquiry signal for making an inquiry into whether said image displaying apparatus has a capability of displaying an image based on said image signal on said specific area of said display.

52. An information processing apparatus according to claim 51, wherein said communication means sends said inquiry signal in conformity with USB standards.

53. An information processing apparatus according to claim 51, wherein said communication means sends said inquiry signal in conformity with DDC standards.

54. An information processing apparatus according to claim 50, wherein said image signal generated and transmitted by said display control means includes an attribute control signal which is generated on the basis of said area-attribute information and used for changing said display attribute.

55. An information processing apparatus according to claim 54, further comprising communication means for sending said image displaying apparatus an inquiry signal for making an inquiry into whether said image displaying apparatus has a capability of displaying an image based on said image signal on said specific area of said display.

56. An information processing apparatus according to claim 55, wherein said communication means receives a report signal from said image displaying apparatus, said report signal indicating that said image displaying apparatus has a capability of displaying an image based on said image signal on said specific area of said display by modifying said display attribute of said specific area.

57. An information processing apparatus according to claim 56, wherein said communication means sends said inquiry signal and receives said report signal in conformity with USB standards.

58. An information processing apparatus according to claim 56, wherein said communication means sends said inquiry signal and receives said report signal in conformity with DDC standards.

59. An information processing apparatus according to claim 50, wherein said image signal generated and transmitted by said display control means includes said display attribute which has been changed on the basis of said area-attribute information.

60. An information processing apparatus according to claim 50, further comprising communication means for receiving a report signal from said image displaying apparatus, said report signal indicating that said image displaying apparatus has a capability of displaying an image based on said image signal on said specific area of said display by modifying said display attribute of said specific area.

61. An information processing apparatus according to claim 60, wherein said communication means sends said image displaying apparatus an inquiry signal for making an inquiry into whether said image displaying apparatus has a capability of displaying said image signal on said specific area of said display.

62. An information processing apparatus, comprising:

a display memory for storing display data to be displayed on a display of a display screen of an image displaying apparatus; and display control means for reading out display data from said display memory, generating an image signal representing said display data, and transmitting said image signal to said image displaying apparatus so as to display a window at selectable coordinates and with a selectable size on said display;

wherein said display memory has a storage portion in which area-attribute information for modifying a display attribute of a specific area on said display; and wherein said display attribute is selected from the group consisting of contrast, brightness, average brightness level, chromaticity, γ characteristic, and RGB level.

63. An information processing apparatus according to claim 62, further comprising communication means for sending said image displaying apparatus an inquiry signal for making an inquiry into whether said image displaying apparatus has a capability of displaying an image based on said image signal on said specific area of said display.

64. An information processing apparatus according to claim 63, wherein said communication means sends said inquiry signal in conformity with USB standards.

65. An information processing apparatus according to claim 63, wherein said communication means sends said inquiry signal in conformity with DDC standards.

66. An information processing apparatus according to claim 62, wherein said image signal generated and transmitted by said display control means includes an attribute control signal which is generated on the basis of said area-attribute information and used for changing said display attribute.

67. An information processing apparatus according to claim 66, further comprising communication means for sending said image displaying apparatus an inquiry signal for making an inquiry into whether said image displaying apparatus has a capability of displaying an image based on said image signal on said specific area of said display.

68. An information processing apparatus according to claim 67, wherein said communication means receives a report signal from said image displaying apparatus, said report signal indicating that said image displaying apparatus has a capability of displaying an image based on said image signal on said specific area of said display by modifying said display attribute of said specific area.

69. An information processing apparatus according to claim 68, wherein said communication means sends said inquiry signal and receives said report signal in conformity with USB standards.

70. An information processing apparatus according to claim 68, wherein said communication means sends said inquiry signal and receives said report signal in conformity with DDC standards.

71. An information processing apparatus according to claim 62, wherein said image signal generated and transmitted by said display control means includes said display attribute which has been changed on the basis of said area-attribute information.

72. An information processing apparatus according to claim 62, further comprising communication means for receiving a report signal from said image displaying apparatus indicating that said image displaying apparatus has a capability of displaying an image based on said image signal on said specific area of said display screen by modifying said display attribute of said specific area.

73. An information processing apparatus according to claim 72, wherein said communication means sends said image displaying apparatus an inquiry signal for making an inquiry into whether said image displaying apparatus has a capability of displaying said image signal on said specific area of said display.

74. An image displaying system according to claim 1, wherein said display attribute is selected from the group consisting of contrast, brightness, average brightness level, chromaticity, γ characteristic, and RGB level.

75. An image displaying system according to claim 2, wherein said display attribute is selected from the group consisting of contrast, brightness, average brightness level, chromaticity, γ characteristic, and RGB level.

76. An image displaying system according to claim 8, wherein said display attribute is selected from the group consisting of contrast, brightness, average brightness level, chromaticity, γ characteristic, and RGB level.

77. An image displaying system according to claim 10, wherein said display attribute is selected from the group consisting of contrast, brightness, average brightness level, chromaticity, γ characteristic, and RGB level.

78. An image displaying system according to claim 12, wherein said display attribute is selected from the group consisting of contrast, brightness, average brightness level, chromaticity, γ characteristic, and RGB level.

79. An image displaying system according to claim 22, wherein said display attribute is selected from the group consisting of contrast, brightness, average brightness level, chromaticity, γ characteristic, and RGB level.

80. An image displaying system according to claim 46, wherein said display attribute is selected from the group consisting of contrast, brightness, average brightness level, chromaticity, γ characteristic, and RGB level.

81. An image displaying system according to claim 48, wherein said display attribute is selected from the group consisting of contrast, brightness, average brightness level, chromaticity, γ characteristic, and RGB level.

82. An image displaying system according to claim 50, wherein said display attribute is selected from the group consisting of contrast, brightness, average brightness level, chromaticity, γ characteristic, and RGB level.

83. An image displaying system according to claim 62, wherein said display attribute is selected from the group consisting of contrast, brightness, average brightness level, chromaticity, γ characteristic, and RGB level.

* * * * *